United States Patent
Filter et al.

(10) Patent No.: US 12,387,204 B2
(45) Date of Patent: Aug. 12, 2025

(54) VALIDATION COMPUTING ENTITY NODE-STAKED DIGITAL ASSET-BASED INTERACTION SYSTEM

(71) Applicant: Flexa Inc., New York, NY (US)

(72) Inventors: Trevor Filter, New York, NY (US); Zachary Kilgore, Brooklyn, NY (US); Tyler Robert Spalding, New York, NY (US)

(73) Assignee: Flexa Inc., New York, NY (US)

( * ) Notice: Subject to any disclaimer, the term of this patent is extended or adjusted under 35 U.S.C. 154(b) by 126 days.

(21) Appl. No.: 18/198,343

(22) Filed: May 17, 2023

(65) Prior Publication Data

US 2023/0376949 A1     Nov. 23, 2023

Related U.S. Application Data

(60) Provisional application No. 63/364,907, filed on May 18, 2022.

(51) Int. Cl.
*G06Q 20/38*     (2012.01)
*G06Q 20/40*     (2012.01)

(52) U.S. Cl.
CPC ....... *G06Q 20/389* (2013.01); *G06Q 20/4037* (2013.01)

(58) Field of Classification Search
CPC .......... G06Q 20/389; G06Q 20/4037
USPC .................................................. 705/35–45
See application file for complete search history.

(56) References Cited

U.S. PATENT DOCUMENTS

| | | | |
|---|---|---|---|
| 10,540,639 B2 | 1/2020 | Brock | |
| 11,637,693 B2* | 4/2023 | Prokopenya | G06Q 20/4016 380/28 |
| 2020/0250633 A1* | 8/2020 | Vinson | G06Q 20/3676 |
| 2020/0394159 A1* | 12/2020 | Hurley | G06Q 20/0658 |
| 2023/0298016 A1* | 9/2023 | Osborn | H04L 63/12 705/41 |
| 2024/0135374 A1* | 4/2024 | Yip | G06Q 20/389 |

* cited by examiner

*Primary Examiner* — Robert R Niquette
(74) *Attorney, Agent, or Firm* — Garlick & Markison; Patricia M. Healy

(57) ABSTRACT

A digital asset-based interaction system includes a digital asset-based interaction computing entity that facilitates a digital asset based-interaction. The digital asset-based interaction involves a first computing entity providing digital assets and a second computing entity accepting assets in a desired asset format. The digital asset-based interaction system further includes at least one validation computing entity node associated with an off-main ledger layer of a multi-layer digital asset distributed ledger technology network associated with the digital assets. The at least one validation computing entity node verifies the obtaining the amount of the digital assets. The on-main ledger layer settles the offloaded verification of obtaining the amount of the digital assets. The digital asset-based interaction system further includes a digital asset backing computing entity operable to lock an amount of system digital assets in an account associated with the at least one validation computing entity node to back the offloaded verification.

22 Claims, 26 Drawing Sheets digital asset-based interaction system 10

FIG. 17 digital asset-based interaction system 10

VALIDATION COMPUTING ENTITY NODE-STAKED DIGITAL ASSET-BASED INTERACTION SYSTEM

CROSS-REFERENCE TO RELATED APPLICATIONS

The present U.S. Utility Patent Applications claims priority pursuant to 35 USC § 119(e) to U.S. Provisional Application Ser. No. 63/364,907, filed May 18, 2022, entitled "VALIDATION COMPUTING ENTITY NODE-STAKED DIGITAL ASSET-BASED INTERACTION SYSTEM," which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates generally to a digital asset-based interaction system and more specifically to a digital asset-based interaction system that includes a staked validation computing entity node associated with an off-main ledger layer of a multi-layer digital asset distributed ledger technology (DLT) network.

Description of Related Art

Current payment systems are vulnerable to security breaches, fraud, and identity theft. A typical payment card transaction with a merchant involves several steps (e.g., payment card authorization, clearing, and settlement) and the participation of various entities (e.g., financial institutions, payment card companies, and payment processing networks). Each step and each entity have their own varying security limitations.

The steps involved are also inconvenient, time consuming, and expensive. For example, payment card authorization (e.g., credit or debit card authorization) begins with the cardholder presenting the payment card to a merchant for goods or service. The payment card is issued by a particular financial institution (e.g., a bank) and is associated with a payment card network (e.g., Visa, Mastercard, etc.). The merchant uses a payment card machine, software, or gateway to transmit transaction data to their acquiring bank (or its processor). The acquiring bank routes the transaction data to a payment processing network and the payment processing network sends the transaction data to the cardholder's issuing bank. The issuing bank validates that the card has not been reported stolen or lost, confirms whether funds/credit is available, and sends a response code back through the payment processing network to the acquiring bank as to whether the transaction is approved.

The transaction data typically includes the payment card number, transaction amount, date, merchant's name, merchant's location, merchant category code, and an encrypted personal identification number (PIN) if entered. A response code reaches the merchant's terminal and is stored in a file until it is settled. The merchant sends the stored, approved transactions to its acquiring back (e.g., at the end of the day) and the acquiring bank reconciles and transmits approved transactions through the appropriate card-processing network. The acquiring bank deposits funds from sales into the merchant's account. The payment processing network debits the issuing bank account and credits the acquiring bank account for the amount of the transaction.

Merchants pay substantial payment card processing fees, and those costs are passed along to consumers in the form of higher prices. Most merchants pay an interchange rate on a total transaction and a flat fee to the payment card company involved (e.g., Visa, Mastercard, etc.). Rates vary based on the payment card company, the payment card type (e.g., credit, debit, business, etc.), processing type (e.g., online payment, swiped, through a mobile device, card not present, etc.), and a Merchant Category Code (MCC) that classifies a merchant's type of business. Further, merchants typically pay a commission and a flat fee to the payment processing network.

Traditional bank account-linked mobile wallet applications allow cardholders to store payment card data on a computing device via a digital wallet for more convenient transactions. For example, some mobile wallet apps use near field communication (NFC) for contactless payments (e.g., exchange of data by holding a device over a payment reader). NFC chips are specifically designed to manage financial security and only store data needed to initiate and complete a transaction. Mobile wallets use types of tokenization to assign a device account number (DAN) in place of an account or card number so that the DAN is passed to the merchant rather than the actual account/card number. As another security measure, digital wallets rely on digital certificates to verify identity. However, using a digital wallet on a device means data passes through not only the device's hardware and operating system but then also a specific payment app, and then finally the source of payment.

Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights. Distributed ledger technology (DLT) is a digital system that provides a consensus of replicated, shared, and synchronized digital data spread across several nodes. Unlike traditional databases, DLTs often lack central authority. The nodes of a DLT implement a consensus method to validate the authenticity of transactions recorded in the ledger.

Distributed ledger technology reduces the risk of fraudulent activity. For example, a blockchain is a type of DLT consisting of a continuously growing list of blocks (i.e., groups of transactions) that are securely linked, continually reconciled, and shared among all network participants (i.e., a decentralized network). Transactions are validated and added to blocks via hashing algorithms, and then permanently written to the chain via consensus of the network. Once recorded on the blockchain, transactions cannot be altered.

A cryptocurrency is a digital asset that is securely created and transferred via cryptography. Many cryptocurrencies exist on distributed networks based on distributed ledger technology (e.g., a blockchain). Decentralized networks like Bitcoin use pseudo-anonymous transactions that are open and public (i.e., anyone can join, create, and view transactions). To eliminate fraudulent transactions and deter malicious network activity, cryptocurrency transactions can be recorded by "miners" using "proof of work" secure hashing algorithms (SHA-256) that require significant computing power. While many cryptocurrencies are blockchain based, other distributed ledger technologies may be used. For example, asynchronous consensus algorithms enable a network of nodes to communicate with each other and reach consensus in a decentralized manner. This method does not need miners to validate transactions and uses directed acyclic graphs for time-sequencing transactions without bundling them into blocks.

Many current cryptocurrencies face issues that prevent them from being able to accommodate the world's commerce. For example, with Bitcoin, transactions take time to confirm, micropayments are not viable, and scalability is a problem. Because every node in Bitcoin must know about every single transaction that occurs globally, the Bitcoin network would need to support orders of magnitude higher transaction volume to meet the demand of automated payments (resulting in increased computational power demands, cost, storage, time, etc.).

Solutions to the scalability problem of cryptocurrencies such as Bitcoin involve impacting the core technology of the cryptocurrency (i.e., "layer 1" solutions) or by offloading computation and storage without impacting the core technology of the cryptocurrency (i.e., "layer 2" solutions). Some layer 1 solutions include improved consensus methods and sharding. For example, a consensus method known as proof-of-stake is a mechanism that features a decentralized consensus over a consensus network where users can authenticate transactions on the basis of their stake. In comparison to proof-of-work, proof-of-stake is faster and less resource intensive. However, proof-of-stake has security issues that proof-of-work does not have. Sharding is another solution in the blockchain space that involves breaking up the network into a series of separate database blocks known as shards to make the blockchain more manageable. All shards are processed in a parallel sequence allowing for greater processing capacities.

Some layer 2 solutions include nested blockchains, state channels, and sidechains. A nested blockchain is a blockchain nested within or on top of another blockchain. Multiple blockchain levels can be built upon a main chain with each level using a parent-child connection where the parent delegates work to the child. The underlying base blockchain does not take part in the network functions of secondary chains unless dispute resolution is necessary. State channels facilitate two-way communication between blockchain and off-chain transactional channels, where multi-signature smart contracts are used to verify transactions between nodes. When a transaction or a batch of transactions are completed on the state channel, the final state representing all the inherent transactions is recorded to the underlying blockchain.

A sidechain is a blockchain-adjacent transactional chain that is typically used for large batch transactions. Sidechains use an independent consensus mechanism which is optimized for speed and scalability. The main chain maintains overall security, confirms batched transactions, and resolves disputes. Unlike state channels, transactions on sidechains are not private between participants but are publicly recorded to an off-main chain ledger.

BRIEF DESCRIPTION OF THE SEVERAL VIEWS OF THE DRAWING(S)

DETAILED DESCRIPTION OF THE INVENTION

Figure 1:
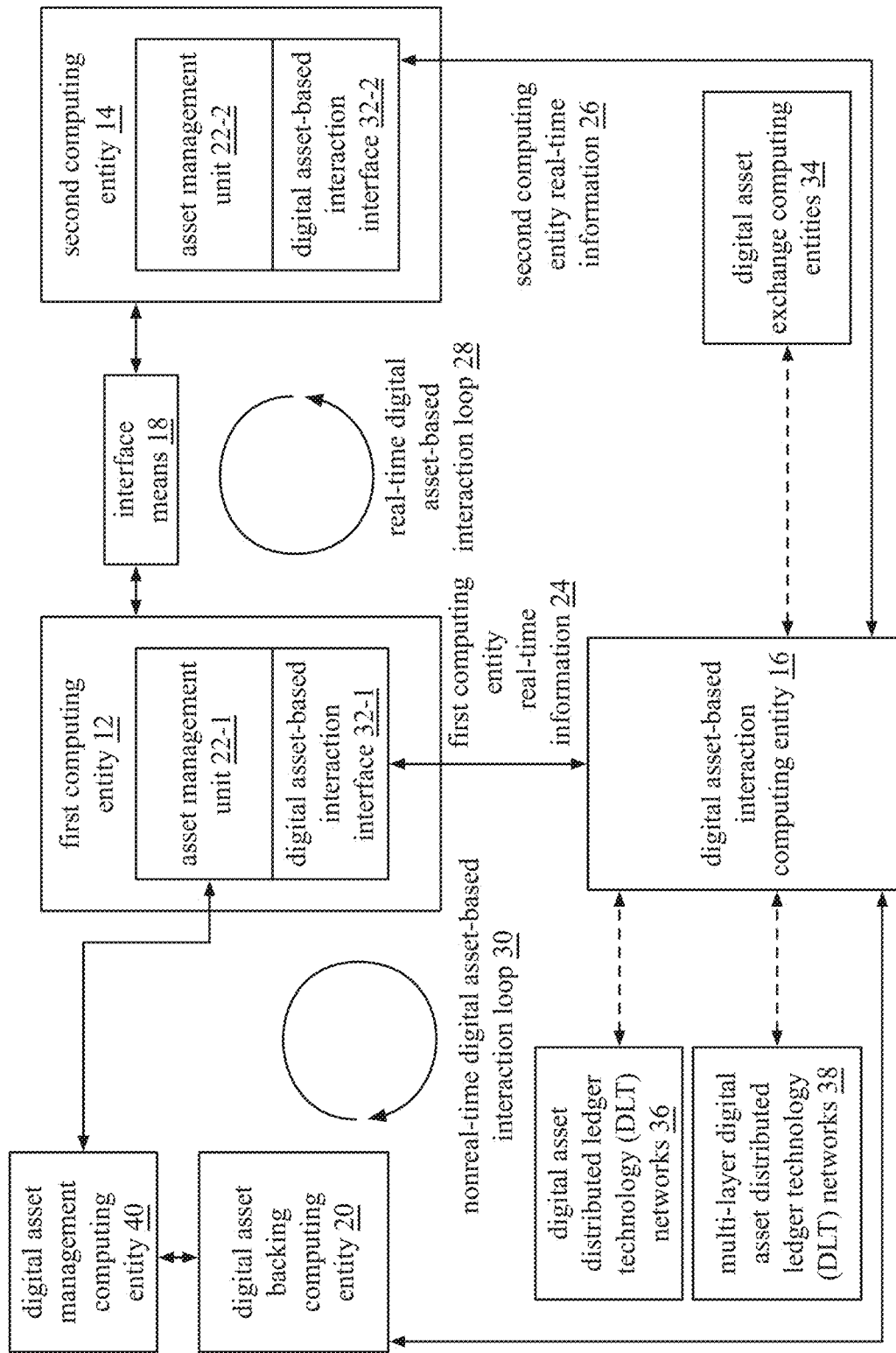
FIG. 1 is a schematic block diagram of an embodiment of a digital asset-based interaction system.

FIG. 1 is a schematic block diagram of an embodiment of a digital asset-based interaction system 10 that includes a first computing entity 12, a second computing entity 14, a digital asset-based interaction computing entity 16, an interface means 18, a digital asset backing computing entity 20, a digital asset management computing entity 40, one or more digital asset exchange computing entities 34, one or more digital asset distributed ledger technology (DLT) networks 36, and one or more multi-layer digital asset distributed ledger technology (DLT) networks 38. The digital asset-based interaction system 10 facilitates a digital asset-based interaction (e.g., a digital asset-based payment) between the first computing entity 12 and the second computing entity 14 where the first computing entity 12 provides a digital asset (e.g., cryptocurrency) and the second computing entity 14 (e.g., a merchant) accepts assets in a desired asset format (e.g., fiat currency, a specific digital asset) and overcomes the following issues.

At the filing of this application, digital assets such as cryptocurrency are not widely accepted by merchants as a form of payment for a variety of reasons. For one, many merchants do not want to hold cryptocurrency. Holding cryptocurrency involves several issues merchants are unfamiliar with and/or unequipped to deal with. These issues include holding private key information, legal compliance, government regulation, timing issues such as waiting for transaction confirmations, etc. Accepting digital assets such as cryptocurrency presents operational security issues and includes a level of technical complexity outside the scope of general merchant capabilities. Additionally, the value of cryptocurrency can be volatile, sometimes fluctuating dramatically in the course of one day. As another reason, merchants are reluctant to invest in expensive point-of-sale upgrades to accommodate cryptocurrency payments directly. As yet another reason, many cryptocurrency payments are public and expose sensitive merchant/customer information.

While some digital wallet applications enable retail blockchain payments, they are universally dependent on existing payment networks and thus are susceptible to the fraud attacks of the existing payment networks. For example, a cryptocurrency is linked to a payment card (e.g., a credit card, debit card, gift card, etc.), where a cryptocurrency payment is converted and conducted as a payment card transaction and, thus susceptible to the same fraud attacks as the payment card. Further, a billing address and/or other personal customer information may be required for a merchant to verify traditional payment card payments. A merchant may store this information which consumes data storage space and renders additional private customer information vulnerable to theft and fraud. Additionally, the costs of the existing payment network (e.g., payment transaction costs, fees, etc.) are maintained. Adding a digital asset payment option within an existing payment network only increases those costs.

Even though digital asset payments such as cryptocurrency payments significantly reduce fraudulent activity as compared to traditional payment systems, fraudulent digital asset transactions are possible. For example, malicious users can manipulate a cryptocurrency blockchain to "double spend" (e.g., create one transaction within a block to transfer an amount to a merchant and create another block without that transaction such that the transfer to the merchant does not exist). As another example, malicious or faulty digital wallet software can prevent a digital asset transaction from being authorized and completed correctly.

Additionally, digital assets such as cryptocurrencies are currently unable to meet the demand of automated payments due to scalability issues. For example, every node in a distributed ledger technology network such as a cryptocurrency like Bitcoin must keep a ledger of every single transaction that occurs globally which takes significant computational power, storage, cost, and time. Scalability solutions to the underlying distributed ledger technology are possible and include layer 1 solutions (e.g., improved consensus methods, sharding, etc.) and layer 2 solutions (e.g., nested blockchains, sidechains, and state channels).

However, scalability solutions are not without their own problems. For example, while scalability is improved with layer 2 solutions, security and/or decentralization may decrease. Further, new types of fraudulent activity are possible within these solutions. For example, state channels is a layer 2 solution where transactions between two parties are confirmed using multi-signature smart contracts in state channels. A malicious state channels participant may create many channels and force them to expire at once. These transactions may overwhelm block data capacity forcing expiration and broadcast to the underlying blockchain. This "spam" may delay transactions to the point where other locktimed transactions become valid. State channels will be discussed in more detail with reference to FIGS. 5-6. Other layer 2 issues and fraudulent activities will be discussed with reference to more or more of the following Figures.

As used herein, a computing entity may be one or more computing devices, one or more distributed computing devices, and/or one or more modules executing on one or more computing devices. Within the digital asset-based interaction system 10, the first computing entity 12, the second computing entity 14, the digital asset-based interaction computing entity 16, the digital asset backing computing entity 20, the digital asset management computing entity 40, and the one or more digital asset exchange computing entities 34 may be one or more computing devices, may be one or more distributed computing devices, and/or one or more modules executing on one or more computing devices.

As used herein, a computing device may be one or more portable computing devices and/or one or more fixed computing devices. The first computing entity 12, the second computing entity 14, the digital asset-based interaction computing entity 16, the digital asset backing computing entity 20, the digital asset management computing entity 40, and the one or more digital asset exchange computing entities 34 may be one or more portable computing devices and/or one or more fixed computing devices. A portable computing device may be a social networking device, a gaming device, a cell phone, a smart phone, a digital assistant, a digital music player, a digital video player, a laptop computer, a handheld computer, a tablet, a video game controller, a virtual reality (VR) computing device, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., attended cash register, unattended register, etc.), and/or any type of home or office computing equipment.

Digital assets are digitally stored content that comes with a right to use. As a few examples, digital assets include images, audio, videos, documents (e.g., contracts, legal documents, etc.), cryptocurrency, cryptocurrency tokens, digital fiat currency, stocks, and intellectual property rights.

The digital asset-based interaction computing entity 16 is operable to connect to the one or more digital asset exchange computing entities 34 to convert a digital asset to an asset in a second asset format (e.g., fiat currency, another digital asset, etc.), back digital asset-based interactions via the digital asset backing computing entity 20 such that digital asset-based interactions can be authorized and/or completed successfully in real-time, and connect to a digital asset distributed ledger technology (DLT) network of the one or more digital asset DLT networks 36 associated with the digital asset or a multi-layer digital asset DLT network of the one or more of the multi-layer digital asset distributed ledger technology (DLT) networks 38 associated with the digital asset to verify receipt of digital assets.

A digital asset DLT network 36 of the one or more digital asset DLT networks 36 is a digital system associated with particular digital asset. A digital asset DLT network 36 includes a plurality of consensus network computing entity nodes operable to implement a validation procedure to verify the authenticity of transactions recorded on a distributed ledger. For example, the validation procedure is a consensus method. Examples of consensus methods include proof-of-work, proof-of-stake, Practical Byzantine Fault Tolerance (PBFT), and Directed Acyclic Graph (DAG). The plurality of consensus computing entity nodes executes the validation procedure to validate and broadcast transactions to the distributed ledger stored by each consensus network computing entity node of the plurality of consensus network computing entity nodes.

A multi-layer digital asset DLT network 38 of the one or more multi-layer digital asset DLT networks 38 is a digital system associated with particular digital asset that includes an on-main ledger layer and one or more off-main ledger layers. For example, when an on-main ledger layer has a blockchain data structure, the additional layers to the on-main ledger layer (e.g., a main blockchain) may include one or more nested blockchains, state channels, and sidechains.

The on-main ledger layer includes a plurality of consensus network computing entity nodes operable to implement an on-main ledger validation procedure to verify the authenticity of transactions recorded on a distributed on-main ledger. For example, the validation procedure is a consensus method. The on-main ledger layer is also operable to offload verification of the authenticity of transactions to one or more of the off-main ledger layers. The plurality of consensus network computing entity nodes of the on-main ledger layer is operable to settle offloaded verification transactions by implementing the on-main ledger validation procedure to verify the offloaded transactions recorded on the distributed on-main ledger.

An off-main ledger layer of the one or more of the off-main ledger layers assist in improving the scalability of DLT networks such as cryptocurrencies. An off-main ledger layer includes a plurality of computing entity nodes where at least one computing entity of the plurality of computing entity nodes is a validation computing entity operable to implement an off-main ledger validation procedure to verify offloaded transactions from the on-main ledger layer. For example, the off-main ledger validation procedure includes one or more of a consensus method, a secure multi-signature communication, and a validation function. The secure multi-signature communication may be a multi-signature smart contract between two or more computing entity nodes. For example, in a state channels off-main ledger layer where the on-main ledger layer has a blockchain data structure, transactions between two parties are confirmed using multi-signature smart contracts and are not published on the main blockchain until the channel is closed. When a channel is closed, the final state of the channel is written to the main blockchain.

Examples of validation functions include one or more of a transaction hash, proof of fraud, and a validity proof. A validation computing entity performs one or more of these functions on off-main ledger layer transactions when fraud is suspected, as a matter of course, or some other time depending on the functionality of the layer. The multi-layer digital asset DLT network will be discussed in greater detail with reference to FIGS. 3-8.

The one or more digital asset exchange computing entities 34 are online platforms that allow users to trade digital assets for other forms of digital assets or other assets such as conventional government-issued fiat currency and/or other digital currencies. The one or more digital asset exchange computing entities 34 may be associated with one or more trusted third parties to that may be specially licensed to facilitate exchanges when licensing is required. In an embodiment, the digital asset-based interaction computing entity 16 is a digital asset exchange computing entity where the digital asset exchange computing entity 16 may be specially licensed for exchange when licensing is required.

In another embodiment, the one or more digital asset exchange computing entities 34 may form a decentralized marketplace that does not involve a trusted third party and facilitates peer-to-peer exchanges. In another embodiment, the digital asset-based interaction computing entity 16 and/or the one or more digital asset exchange computing entities 34 may be associated with one or more digital asset holding companies. A digital asset holding company stores sensitive materials and has insurance policies to protect against theft and fraud. A digital asset holding company may be specially licensed for holding digital assets when licensing is required.

The digital asset-based interaction computing entity 16 may be associated with a stored value account (SVA) device where the SVA device is associated with the second computing entity 14 (e.g., a second computing entity has an SVA account with the SVA device) such that an SVA is generated for payment. In another embodiment, the digital asset-based interaction computing entity 16 is operable to generate stored value accounts (SVAs). Generation of SVAs for transactions is described in co-pending patent application Ser. No. 16/376,911, entitled, "SECURE AND TRUSTED DATA COMMUNICATION SYSTEM," filed Apr. 5, 2019.

Each of the first and second computing entities 12 and 14 include an asset management unit 22-1 and 22-2 respectively. The asset management units 22-1 and/or 22-2 may be digital wallet applications or network enabled smart contract applications (e.g., smart contract digital asset management units) installed on or otherwise usable by the first and second computing entities 12 and 14 that function to facilitate the storage and management (e.g., buy, sell, trade, custody, etc.) of digital assets. Alternatively, an asset management unit may be an application that facilitates receiving assets during an interaction such as POS software and/or hardware that may or may not include a digital wallet function depending on the types of assets a computing entity wishes to accept and the desired method of receiving those assets.

The asset management units 22-1 and/or 22-2 may be custodial digital wallet applications associated with a digital asset management computing entity 40 that may be specially licensed and insured to hold digital assets (e.g., a digital asset holding and management company, a cryptocurrency holding company, a cryptocurrency holding and exchange company, etc.). Alternatively, the asset management units 22-1 and/or 22-2 may be non-custodial digital wallet applications associated with a non-custodial digital asset management computing entity 40 (e.g., a digital asset exchange company) where the asset management units 22-1 and/or 22-2 store digital assets and the first and second computing entities 12-14 manage private keys to the asset management units 22-1 and/or 22-2.

Alternatively, the asset management units 22-1 and/or 22-2 may be custodial or non-custodial digital wallet applications associated with the digital asset-based interaction computing entity 16 (e.g., where the digital asset-based interaction computing entity 16 is a digital asset management computing entity 40). Alternatively, the asset management units 22-1 and/or 22-2 are network enabled smart contract applications (e.g., smart contract digital asset management units). A network enabled smart contract application allows a user to upload digital assets to a network enabled smart contract using a private key (e.g., non-custodial) and eliminates double spending issues associated with non-custodial wallets.

To store and/or interact with a digital asset associated with a particular digital asset DLT network or multi-layer digital asset DLT network, the asset management units 22 are enabled to communicate with the corresponding digital asset DLT network or multi-layer digital asset DLT network (e.g., directly or through a digital asset holding company).

The digital asset backing computing entity 20 may be a part of or separate from the digital asset-based interaction computing entity 16. The digital asset backing computing entity stores (or otherwise has access to) system digital assets (e.g., system cryptocurrency, system tokens, etc.) as collateral to back digital asset-based interactions of the digital asset-based interaction system 10. The system digital assets may be any digital asset that the digital asset-based interaction system chooses to use. For example, the system digital asset is a token on the Ethereum blockchain specifically created for use in the digital asset-based interaction system. As another example, the system digital asset is an already established and trusted cryptocurrency.

The digital asset backing computing entity 20 is associated with the first computing entity 12, the second computing entity 14, a type of digital asset, and/or a validation computing entity node associated with an off-main ledger layer of a multi-layer digital asset DLT network. As an example, the digital asset backing computing entity 20 is associated with the asset management unit 22-1 of the first computing entity 12.

The digital asset management computing entity 40 is associated with the digital asset backing computing entity 20 via one or more accounts and is operable to deposit system digital assets into the one or more accounts to back digital asset-based interactions of users of an associated asset management unit (e.g., asset management unit 22-1). The digital asset management computing entity 40 is incentivized to back asset management unit interactions by receiving rewards from the digital asset backing computing entity 20 such as a percentage of system digital assets back on successful transactions. Additionally, the system digital asset provides payment utility such as lower foreign exchange rates.

As another example, the digital asset management computing entity 40 is associated with the digital asset backing computing entity 20 via one or more accounts and is operable to deposit system digital assets into an account to back digital asset-based interactions associated with a validation computing entity node of an off-main ledger layer of a multi-layer digital asset DLT network. Depositing system digital assets into an account to back digital asset-based interactions associated with a validation computing entity node of an off-main ledger layer of a multi-layer digital asset DLT network will be discussed in greater detail with reference to FIGS. 9-10 and 20.

The digital asset management computing entity 40 is also referred to as a staking entity and in this example, is associated with a developer of the asset management unit (e.g., a digital wallet developer). Because the digital asset management computing entity 40 is backing the asset management unit interactions or validation computing entity node verified interactions and is rewarded by successful transactions, the digital asset management computing entity 40 is incentivized to produce a quality asset management unit that prevents user fraud and to remedy faulty software that affects transaction success. In another embodiment, the asset management units 22 and/or the validation computing entity node may be backed by a different and/or additional type(s) of staking entities such as one or more user computing devices, one or more merchant computing entities, one or more computing entities associated with a corporation and/or business, etc. In another embodiment, a type of digital asset used in the interaction may be backed by one or more staking entities such as one or more user computing devices, one or more merchant computing entities, one or more computing entities associated with a corporation and/or business, etc.

When a computing entity functions to primarily receive assets (e.g., the computing entity is a merchant computing device; also referred to herein as a receiving computing entity), an asset management unit (e.g., asset management unit 22-2) is not necessarily associated with a digital asset management computing entity 40 if there is no need back digital assets (e.g., assets are received and not sent). For example, when the second computing entity 14 is a merchant computing entity, the asset management unit 22-2 may be merchant POS software enabled for use in the digital asset-based interaction system 10.

The asset management units 22-1 and 22-2 include digital asset-based interaction interfaces 25-1 and 25-2 operable to interface with the digital asset-based interaction computing entity 16. The digital asset-based interaction interfaces 25-1 and 25-2 are digital asset-based interaction computing entity application programming interfaces (APIs) integrated into asset management units 22-1 and 22-2 that allow the first and second computing entities 12 and 14 to connect to the digital asset-based interaction computing entity 16 for digital asset-based interactions.

A digital asset-based interaction interface may be included in an asset management unit when the digital asset management computing entity 40 deposits system digital assets to back interactions made by the asset management unit and/or the validation computing entity node or in an asset management unit that primarily receives assets (e.g., a merchant) via the digital asset-based interaction system 10. The first and second computing entities 12 and 14 are operable to establish an account with the digital asset-based interaction computing entity 16 to use the digital asset-based interaction interfaces 25-1 and 25-2. The first and second computing entities 12 and 14 are operable to access features of the digital asset-based interaction computing entity 16 via the digital asset-based interaction interfaces 25-1 and 25-2 (e.g., via a direct link or by signing in for temporary use).

The second computing entity 14 may be associated with a particular merchant that facilitates payments from the first computing entity 12 to the merchant. For example, the second computing entity may be a fixed POS computing device, a merchant e-commerce website, a merchant mobile application ("app"), etc. The second computing entity 14 may include payment features tailored to the type of second computing entity 14 involved in a payment. For example, when the second computing entity 14 is a fixed POS computing device (e.g., a register), the second computing entity includes features for an in-person payment interaction (e.g., a scanning device, a touchscreen, a receipt printer, etc.).

As another example, when the second computing entity 14 is an e-commerce website or merchant mobile application ("app") the second computing entity may include a variety of existing payment processing features (e.g., existing hardware and/or software) for processing online payments within existing payment networks (e.g., an Secure Socket Layers (SSL) certificate, e-commerce shopping cart software, order and product management features, customer profile management capabilities, a payment gateway, an e-commerce merchant account with a processing bank to accept credit and debit card payments, etc.).

The first computing entity 12 and the second computing entity 14 interact via the interface means 18. The interface means 18 is one or more of: a direct link and a network connection. The direct link includes one or more of: a scanning device (e.g., video, camera, infrared (IR), barcode scanner, etc.), radio frequency (RF), and/or near-field communication (NFC). The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

As an example, the first computing entity 12 is a smart phone, the second computing entity 14 is a fixed merchant POS device (e.g., a POS register) and the interface means 18 is the fixed merchant POS device's scanning device (e.g., camera, barcode scanner, etc.). As another example, the first computing entity 12 is a smart phone, the second computing entity 14 is a fixed merchant POS device (e.g., a POS register) and the interface means 18 is the smart phone's scanning device (e.g., a front or back camera).

As another example, the first computing entity 12 is a smart phone, the second computing entity 14 is an online POS connection device (e.g., an e-commerce website or e-commerce mobile app) and the interface means 18 is a network connection. For example, a smart phone uses an internet browser application (via cellular or wireless internet connection) to access a merchant's e-commerce website. As another example, a smart phone uses a network connection to connect to an installed merchant e-commerce mobile app.

As yet another example, a combination of interface means 18 is possible. For example, the first computing entity 12 is a smart phone and the second computing entity 14 is an online POS connection device (e.g., an e-commerce website). The e-commerce website is accessed via a network connection interface means 18 on a computing device associated with the user of the first computing entity 12 (e.g., a laptop or desktop computer). The computing device displays information for use by the first computing entity's scanning device (e.g., front or back camera).

In an example of operation, the first computing entity 12 and the second computing entity 14 interact via the interface means 18 to initiate a digital asset-based interaction (also referred to herein as "interaction"). A digital asset-based interaction involves providing digital assets from the first computing entity to the second computing entity (e.g., a loan from the first computing entity to the second computing entity, a payment from the first computing entity to the second computing entity, a gift from the first computing entity to the second computing entity, etc.) via the digital asset-based interaction computing entity where the second computing entity 14 accepts assets in a desired asset format (e.g., fiat currency or a desired digital asset that may differ from the digital asset the first computing entity 12 wishes to use in the interaction).

To initiate the interaction, the first computing entity 12 may display a unique scannable code to the second computing entity 14 when the interface means 18 is the second computing entity 14 scanning device. As another example, the first computing entity 12 may display and/or share an authorization key code when a code display interaction mode is disabled. As another example, the second computing entity 14 displays a unique scannable code for the first computing entity 12 when the interface means 18 is the first computing entity 12 scanning device. As another example, the second computing entity 14 may display and/or share an authorization key charge code when a code scan interaction mode is disabled. As another example, the first computing entity 12 connects to the second computing entity 14 via a network connection interface means 18 to initiate an interaction (e.g., when the second computing entity 14 is an e-commerce website).

During the interaction initiation, the first computing entity 12 sends first computing entity real-time information 24 to the digital asset-based interaction computing entity 16 via the digital asset-based interaction interface 25-1 and/or the second computing entity 14 sends second computing entity real-time information 26 to the digital asset-based interaction computing entity 16 via its digital asset-based interaction interface 25-2 (e.g., from requesting a scannable code, from scanning a scannable code, from receiving an authorization key code, from an e-commerce website checkout option selection, etc.).

The first computing entity real-time information 24 includes at least an identifier (e.g., a user ID) and an indication of a type of digital asset the user of the first computing entity wishes to use in a digital asset-based interaction with the second computing entity 14. The second computing entity real-time information 26 includes at least an identifier (e.g., a user ID, a merchant ID, etc.) and an indication of a desired asset format (e.g., a fiat currency, a cryptocurrency, etc.) for receiving assets in the digital asset-based interaction. One or more of the first computing entity real-time information 24 and the second computing entity real-time information 26 includes the amount involved in the digital asset-based interaction. The first computing entity real-time information 24 and the second computing entity real-time information 26 may include further information and/or metadata such as loyalty information, personal information (address, name, etc.), shipping details, bill splitting information, a request for additional information, etc.

When the digital asset-based interaction computing entity 16 receives the first and second computing entity real-time information, the digital asset-based interaction computing entity 16 initiates: 1) a real-time digital asset-based interaction process (e.g., the real-time digital asset-based interaction loop 28) and 2) a nonreal-time digital asset-based interaction process to reconcile the digital asset-based interaction with the digital asset backing computing entity 20 (e.g., the nonreal-time digital asset-based interaction loop 30). The reconciliation of the digital asset-based interaction with the digital asset backing computing entity 20 occurs within a time frame that is longer than the time frame of the real-time digital asset-based interaction. For example, the reconciliation of the digital asset-based interaction with the digital asset backing computing entity 20 occurs over the course of minutes whereas the time frame of the real-time digital asset-based interaction takes a few seconds.

Within the nonreal-time digital asset-based interaction loop 30, when at least the first computing entity real-time information is received, the digital asset-based interaction computing entity 16 instructs the digital asset backing computing entity 20 to lock an amount of system digital asset associated with the digital asset-based interaction. When the digital asset-based interaction computing entity 16 locks the system digital asset, a rate quote for the amount of digital asset used by the first computing entity 12 is locked. An exchange rate is a price at which one digital asset will be exchanged for another. A rate quote is an exchange rate at a given point in time as determined by a digital asset exchange (e.g., cryptocurrency exchange) based on the buying and selling activity of the digital assets within the exchange.

Within the real-time digital asset-based interaction loop 28, when the digital asset-based interaction computing entity 16 receives an amount of digital asset from the first computing entity 12 to use in the digital asset-based interaction, a network acknowledgment (ACK) of the receipt of the amount of the digital asset is generated.

In an alternative embodiment, the ACK is generated after the system digital asset is locked and prior to receiving the amount of the digital asset from the first computing entity 12. For example, locking the system digital asset implies authorization of the interaction and the digital asset-based interaction computing entity 16 allows a time period (e.g., up to five minutes) prior to pulling digital assets from the first computing entity 12 (e.g., the first computing entity has time to add tip, split payment with another user, adjust type of digital asset used, etc.). The second computing entity 14 is provided a confirmation of this ACK. For example, when the second computing entity 14 is a POS computing device such as an attended register, this ACK may successfully end the in-person transaction such that a merchant and customer can part ways. However, the second computing entity 14 receives the payment up to a few minutes later.

If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28 (e.g., exchanging the digital asset to the desired asset format and sending the amount in the desired asset format to the second computing entity), the ACK is not generated, and the digital asset-based interaction is terminated. Within the nonreal-time digital asset-based interaction loop 30, when the ACK is not generated, the digital asset-based interaction computing entity 16 instructs the digital asset backing computing entity 20 to release the amount of locked system digital asset.

When the digital asset is managed by a digital asset distributed ledger technology network (e.g., is a cryptocurrency), sending the amount of digital asset to the digital asset-based interaction computing entity 16 is a transaction added to the distributed ledger associated with the digital asset used by the first computing entity 12 (e.g., this information is published). However, other details related to the interaction (e.g., the identity of the second computing entity 14, transaction fees owed by the second computing entity 14, etc.) may be managed privately by the digital asset-based interaction computing entity 16 off-ledger (i.e., off-chain when the distributed ledger technology is blockchain). Therefore, the digital asset-based interaction system 10 is operable to keep confidential second computing entity 14 related information (e.g., revenue, consumer spending behavior, etc.) and confidential first computing entity 12 related information (e.g., consumer identity of purchases, amount spent at a particular merchant, payees/merchants frequented, etc.) private (i.e., not published on a blockchain for anyone to see).

When the digital asset is managed by a multi-layer digital asset distributed ledger technology network that includes one or more off-main ledger layers, some information pertaining to sending the amount of digital asset to the digital asset-based interaction computing entity 16 (e.g., opening an interaction channel digital asset-based interaction computing entity 16, transaction data of sending the amount of the digital assets, etc.) may be a transaction added to the on-main distributed ledger associated with the digital asset used by the first computing entity 12 (e.g., this information is published). However, other information pertaining to the sending the amount of digital asset to the digital asset-based interaction computing entity 16 may be verified off-main ledger.

Continuing with the real-time digital asset-based interaction loop 28, when the ACK is generated and receipt of the amount of digital asset is received, the digital asset-based interaction computing entity 16 connects to the one or more digital asset exchange entities 34 to exchange the amount of the digital asset received from the first computing entity 12 to an amount in the desired asset format. Digital asset exchange is done quickly (e.g., 30 seconds to a few minutes) to account for exchange rate volatility. The exchange can also be performed immediately on a credit-based account to eliminate any pricing volatility. The digital asset-based interaction computing entity 16 sends the amount in the desired asset format to the second computing entity 14 to complete the real-time portion of the digital asset-based interaction.

Continuing with the nonreal-time digital asset-based interaction loop 30, the digital asset-based interaction computing entity 16 verifies the amount of the digital asset received from the first computing entity 12. For example, when the digital asset is associated with a digital asset DLT network 36, the digital asset-based interaction computing entity 16 connects to the digital asset DLT network 36 to verify the amount of the digital asset received from the first computing entity 12. The digital asset DLT network 36 implements a validation procedure that may take minutes to hours of time.

For example, in the Bitcoin blockchain, miners record new transactions into blocks that verify all previous transactions within the blockchain. At the filing of this application, it takes a miner ten minutes, on average, to write a block on the Bitcoin blockchain. The average block time depends on a total hash power of the Bitcoin network. Once a block is created and a new transaction is verified and included in a block, the transaction will have one confirmation. Each subsequent block (which verifies the previous state of the blockchain) provides one additional network confirmation.

Typically, between 5-10 transaction confirmations (depending on the monetary value of the transaction) are acceptable for cryptocurrency exchanges to avoid losses due to potential fraud. Therefore, if the first computing entity 12 is using Bitcoin, the digital asset-based interaction computing entity 16 seeks a desired number of confirmations of the amount of the cryptocurrency received by the first computing entity 12 from the consensus network 16 (e.g., via Bitcoin miners). The transaction may not be verified by the digital asset-based interaction computing entity 16 for an hour or more. As such, the nonreal-time digital asset-based interaction loop 30 takes longer than the real-time digital asset-based interaction loop 28.

As another example, when the digital asset is associated with a multi-layer digital asset DLT network, the digital asset-based interaction computing entity 16 connects to the on-main ledger layer of the multi-layer digital asset DLT network 36 to verify the amount(s) of the digital assets received from the first computing entity 12 during a settlement time-period. The settlement time-period includes one or more of a dispute resolution time-period, a default time-period, a predetermined time-period, a time-period to reach a predetermined number of digital asset-based interactions, a time-period based on an amount of one or more digital asset-based interactions, a time-period based on a request by the digital asset-based interaction computing entity, and a time-period based on a request by the first computing entity.

The settlement time-period may occur after minutes to weeks of time and last for minutes to weeks of time. For example, an optimistic roll-up is a type of sidechain off-main ledger layer of the Ethereum network. With optimistic roll-ups, transaction data is written to the main blockchain while transaction execution is "rolled-up" and occurs off-chain. Periodically, the system publishes a Merkle root of transactions that happen within the rollup in order to update the state of the rollup to the main underlying blockchain. Transaction results submitted back to the main blockchain are assumed to be valid. If an inconsistency is detected, a validator can publish a fraud proof during a dispute period which can cause the state of the system to be rolled back to the previous valid state. To allow for proper fraud detection, there needs to be a sufficient amount of time for validators to perform fraud proofs which extends the time it takes for transactions to be settled on the main blockchain.

When the digital asset-based interaction computing entity 16 verifies the amount of the digital assets received by the first computing entity 12, the digital asset-based interaction computing entity 16 instructs the digital asset backing computing entity 20 to release the amount of system digital assets associated with the real-time digital asset interaction. When the digital asset-based interaction computing entity 16 does not verify the amount of the digital asset received by the first computing entity 12, the digital asset-based interaction computing entity 16 instructs the digital asset backing computing entity 20 to consume the amount of system digital assets associated with the real-time digital asset interaction.

For example, if fraudulent activity occurs (e.g., the first computing entity acts maliciously to spend at two merchants simultaneously, software of the asset management unit 22-1 is corrupted, etc.) the digital asset-based interaction computing entity 16 consumes the amount of system digital assets associated with the real-time digital asset interaction. As a specific example, if the first computing entity 12 attempts to double spend a transaction, the verification (e.g., the desired number of confirmations in a Bitcoin blockchain example) will not be received and the digital asset-based interaction computing entity 16 will not be able to verify the amount of the digital asset received by the first computing entity 12.

As another example, if off-main ledger layer fraudulent activity or failure occurs (e.g., an offline transaction scam, a stuck payment, etc.) such that the settlement on the on-main ledger layer is incorrect and/or not produced when expected, the digital asset-based interaction computing entity 16 consumes the amount of system digital asset associated with one or more digital asset-based interactions. As a specific example, in a state channels off-main ledger layer example, if the first computing entity 12 chooses to close an interaction channel while the other party is offline, the first computing entity 12 can steal the funds. When the channel state is written to the on-main ledger layer, the balance will be incorrect and the digital asset-based interaction computing entity 16 will not be able to verify the amount of the digital asset received by the first computing entity 12. In that situation, the digital asset-based interaction computing entity 16 consumes the amount of system digital asset in accordance with the balances expected in the closed channel.

Consuming the amount of system digital asset means that the amount of system digital asset (or digital assets used to borrow system digital assets) is transferred (e.g., via an on-chain transaction) from an address associated with the digital asset management computing entity 50 to an address associated with the digital asset-based interaction computing entity 16.

In the event that several digital asset-based interactions are represented in a final on-main ledger layer settlement, the total amount of the digital asset-based interactions will be verified by the digital asset-based interaction computing entity 16. Based on the verification, some or all of the system digital assets could be released and/or consumed. Releasing and/or consuming system digital assets based on an on-main ledger layer settlement will be discussed in more detail with reference to FIGS. 14-16.

Figure 2:
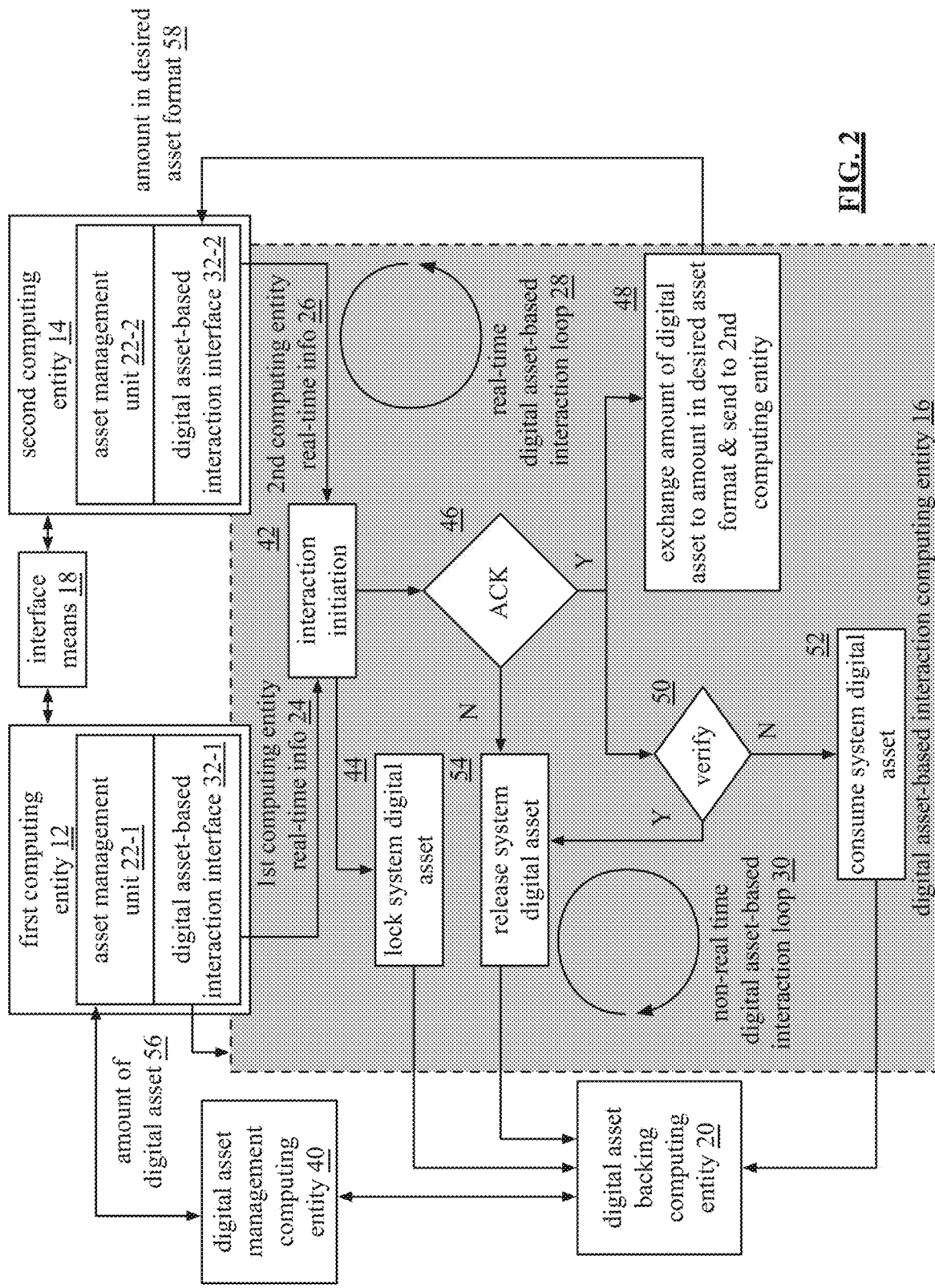
FIG. 2 is a flowchart of an example of a method for execution by a digital asset-based interaction computing entity of the digital asset-based interaction system.

FIG. 2 is a flowchart of an example of a method for execution by a digital asset-based interaction computing entity 16 of the digital asset-based interaction system 10 of FIG. 1. FIG. 2 includes a first computing entity 12, a second computing entity 14, a digital asset-based interaction computing entity 16, an interface means 18, a digital asset backing computing entity 20, and a digital asset management computing entity 40. The first and second computing entities 12 and 14 include asset management units 22-1 and 22-2 respectively that interface with the digital asset-based interaction computing entity 16 to facilitate digital asset-based interactions (also referred to herein as "interactions") and operate as discussed with reference to FIG. 1.

The second computing entity 14 may be a merchant computing entity that is operable to process payments from a computing entity and includes features tailored to the type of second computing entity 14 it is (e.g., a scanning device, a touchscreen, mobile payment features, online payment features, etc.). The first computing entity 12 and the second computing entity 14 interact via the interface means 18 as discussed with reference to FIG. 1. For example, the interface means 18 is a scanning device of the first computing entity 12 and/or the second computing entity 14.

The digital asset management computing entity 40 is associated with the digital asset backing computing entity 20 via an account and is operable to deposit system digital assets into its account to back digital asset-based interactions made by users of its associated asset management unit (e.g., asset management unit 22-1). In an alternative example, the digital asset management computing entity 40 is associated with the digital asset backing computing entity 20 via an account and is operable to deposit system digital assets into one or more accounts to back one or more validation computing entity nodes of one or more off-main ledger layer of a multi-layer digital asset distributed ledger technology (DLT) networks associated with one or more digital assets.

In another example, one or more other staking entities (e.g., a user computing device, a digital asset management computing entity not associated with the asset management unit 22-1, etc.) are associated with the digital asset backing computing entity 20 via an account and are operable to deposit system digital assets into one or more accounts to back one or more validation computing entity nodes of one or more off-main ledger layer of a multi-layer digital asset distributed ledger technology (DLT) networks associated with one or more digital assets.

The method begins with step 42 where an interaction is initiated. An interaction is any activity involving sending digital asset-based value from the first computing entity 12 to the second computing entity 14 (e.g., a loan from the first computing entity to the second computing entity, a payment from the first computing entity to the second computing entity, a gift from the first computing entity to the second computing entity, etc.) where the second computing entity 14 accepts assets in a desired asset format (e.g., fiat currency or a desired digital asset that differs from the digital asset the first computing entity 12 wishes to use in the interaction) and the first computing entity provides a digital asset. An interaction is initiated when the first and second computing entities interact via the interface means 18 as discussed with reference to FIG. 1.

During the interaction initiation, the digital asset-based interaction computing entity 16 receives first computing entity real-time information 24 and second computing entity real-time information 26 regarding the digital asset-based interaction between the first computing entity 12 that sends digital assets and the second computing entity 14 that accepts assets in a desired asset format.

For example, the first computing entity 12 sends first computing entity real-time information 24 to the digital asset-based interaction computing entity 16 via the digital asset-based interaction interface 32-1 of the asset management unit 22-1 and the second computing entity 14 sends second computing entity real-time information 26 to the digital asset-based interaction computing entity 16 via the digital asset-based interaction interface 32-2 (e.g., from either requesting or scanning a scannable code) of asset management unit 22-2. As another example, the digital asset-based interaction interface of the first computing entity 12 or the second computing entity 14 may send the first and second computing entity real-time information 24 and 26 to the digital asset-based interaction computing entity 16 (e.g., the first computing entity 12 sends the second computing entity and the first computing entity real-time information 24 and 26).

The first computing entity real-time information 24 includes an identifier (e.g., a user ID) and a type of digital asset (e.g., a cryptocurrency) it wishes to use in a real-time digital asset-based interaction with the second computing entity 14. The second computing entity real-time information 26 includes an identifier (e.g., a merchant ID) and a type of desired/selected asset format (e.g., a fiat currency, another cryptocurrency) for receiving value from the first computing entity 12. One or more of the first computing entity real-time information 24 and the second computing entity real-time information 26 includes the amount of the real-time digital asset-based interaction. The first computing entity real-time information 24 and the second computing entity real-time information 26 may include further information and/or metadata such as loyalty information, personal information (address, name, etc.), shipping details, bill splitting information, a request for additional information, etc.

When the digital asset-based interaction computing entity 16 receives the real-time information 24-26, the digital asset-based interaction computing entity 16 initiates 1) a real-time digital asset-based interaction process (e.g., the real-time digital asset-based interaction loop 28) and 2) a nonreal-time digital asset-based interaction process to reconcile the digital asset-based interaction with the digital asset backing computing entity 20 (e.g., the nonreal-time digital asset-based interaction loop 30). The reconciliation of the digital asset-based interaction with the digital asset backing computing entity 20 occurs within a time frame that is longer than the time frame of the real-time digital asset-based interaction.

The method continues with step 44 where, within the nonreal-time digital asset-based interaction loop 30, the digital asset-based interaction computing entity 16 instructs the digital asset backing computing entity 20 to lock an amount of system digital asset associated with the digital asset-based interaction. The amount of system digital asset locked may be based on one or more of an amount involved in the interaction, a type of interaction, a type of item involved in the interaction, the first computing entity 12 (e.g., a typical amount the first computing entity 12 spends, an account balance, etc.), and the second computing entity 14 (e.g., the type of merchant the second computing entity 14 is associated with, a type of goods the merchant sells, a default amount set by the merchant, etc.).

When the digital asset-based interaction computing entity 16 locks the system digital asset, a rate quote for the amount of digital asset used by the first computing entity 12 may be locked as discussed with reference to FIG. 1. The method continues with step 46 where a network acknowledgment (ACK) of the receipt of the amount of the digital asset is or is not generated. For example, when the digital asset-based interaction computing entity 16 receives an amount of digital asset 56 from the first computing entity 12 to use in the real-time digital asset-based interaction, the ACK is generated and the method continues to steps 48 and 50.

If the interaction initiation is terminated (e.g., interaction initiation fails and/or is cancelled by the first and/or the second computing entity) within a certain amount of time prior to the digital asset-based interaction computing entity 16 continuing with the following steps of the real-time digital asset-based interaction loop 28, the ACK is not generated, and the digital asset-based interaction terminates. Within the nonreal-time digital asset-based interaction loop 30, when the ACK is not generated, the method continues with step 54 where the digital asset-based interaction computing entity 16 instructs the digital asset backing computing entity 20 to release the amount of locked system digital asset.

Within the real-time digital asset-based interaction loop 28, when the ACK is generated, the method continues with step 48 where the digital asset-based interaction computing entity 16 exchanges (or connects to a digital asset exchange to exchange) the amount of the digital asset 56 received from the first computing entity 12 to an amount of assets in a desired asset format (e.g., fiat currency, a particular digital asset, etc.). Digital asset exchange is done quickly (e.g., 30 seconds to a few minutes) to account for exchange rate volatility. The digital asset-based interaction computing entity 16 sends the amount in the desired asset format 58 to the second computing entity 14 to complete the real-time digital asset-based interaction.

Within the nonreal-time digital asset-based interaction loop 30, when the ACK is generated at step 46, the method continues with step 50 where the digital asset-based interaction computing entity 16 verifies the amount of the digital asset 56 received from the first computing entity 12. For example, when the digital asset is associated with a digital asset distributed ledger technology (DLT) network, the digital asset-based interaction computing entity 16 connects to a digital asset DLT network that verifies the amount of the digital asset received from the first computing entity 12. The digital asset DLT network implements a validation procedure (e.g., a consensus method) that may take minutes to hours of time.

When the digital asset is associated with a multi-layer digital asset DLT network, the digital asset-based interaction computing entity 16 connects to the multi-layer digital asset DLT network during a settlement time-period (i.e., multiple off-main ledger digital asset-based interactions may be verified prior to settlement on the main ledger layer) to confirm the interaction on the on-main ledger layer. Other digital asset validation procedures are possible and are based on the type of digital asset involved.

When the digital asset-based interaction computing entity 16 verifies the amount (or amounts) of the digital asset received by the first computing entity 12 at step 50, the method continues to step 54 where the digital asset-based interaction computing entity 16 instructs the digital asset backing computing entity 20 to release the amount of system digital asset locked for the digital asset-based interaction.

When the digital asset-based interaction computing entity 16 does not verify the amount of the digital asset received by the first computing entity 12 at step 50, the method continues to step 52 where the digital asset-based interaction computing entity 16 instructs the digital asset backing computing entity 20 to consume the amount of system digital asset locked for the digital asset-based interaction. Consuming the amount of system digital asset means that the digital asset backing computing entity 20 transfers the amount of system digital asset to an address controlled by the digital asset-based interaction computing entity 16 in order to cover the amount of the real-time digital asset-based interaction.

When verifying a digital asset-based interaction on an on-main ledger layer of a multi-layer digital asset DLT network, multiple digital asset-based interactions may have been verified on an off-main ledger layer prior to the settlement time period. When the total amount of digital assets for the one or more digital asset-based interactions received by the first computing entity 12 at step 50 is not verified, at least a portion of the amount of system digital assets locked for the digital asset-based interactions is consumed. The at least a portion of the amount of system digital assets is based on the discrepancy between the amount of digital asset confirmed on the on-main ledger layer and an internal accounting of the amount of digital assets owed to the digital asset-based interaction computing entity 16.

Figure 3:
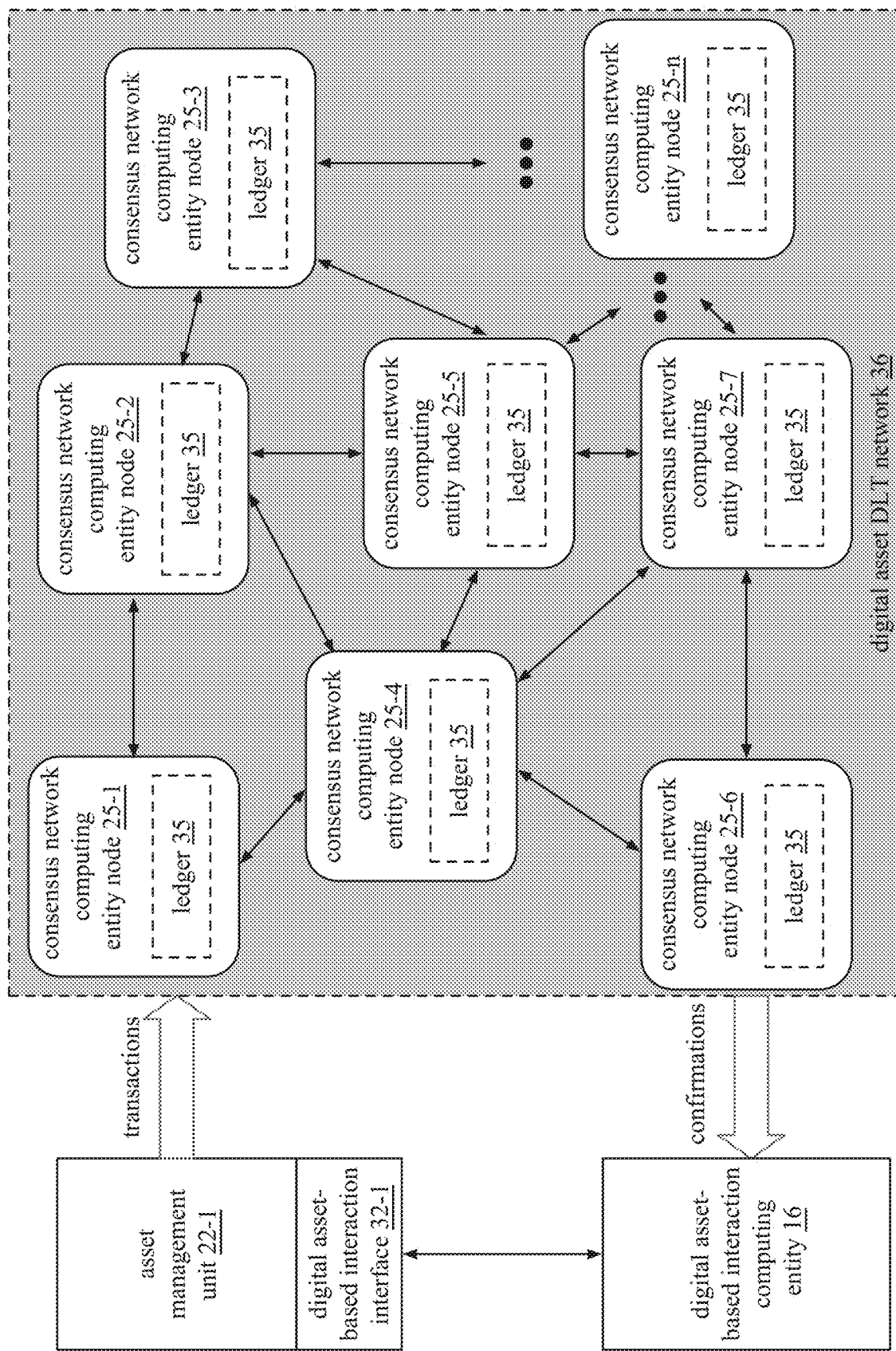
FIG. 3 is a schematic block diagram of an embodiment of a portion of the digital asset-based interaction system.

FIG. 3 is a schematic block diagram of an embodiment of a portion of the digital asset-based interaction system that includes an asset management unit 22-1 (e.g., of the first computing entity), a digital asset-based interaction computing entity 16, and a digital asset distributed ledger technology (DLT) network. The asset management unit 22-1 includes a digital asset-based interaction interface 32-1 associated with the digital asset-based interaction computing entity 16.

The digital asset DLT network 36 includes a plurality of consensus network computing entity nodes 25-1 through 25-n (also referred to herein as nodes) that each store a distributed and replicated ledger 35 and use validation procedures (e.g., consensus methods) to ensure replication across the plurality of consensus network computing entity nodes 25-1 through 25-n is undertaken. Distributed ledgers 35 may be permissioned, permissionless, or hybrid. Consensus methods include proof of work, proof of stake, delegated proof of stake, Byzantine Fault Tolerance, voting systems, etc.

When a new transaction on the ledger 35 occurs, each of the consensus network entity nodes 25-1 through 25-n construct the new transaction and vote by a consensus methods on which copy of the ledger 35 is correct. Once consensus is determined, all consensus network computing entity nodes 25-1 through 25-n update the ledger 35 with the correct copy. Blockchain is a form of digital asset DLT network that uses cryptographic and algorithmic approaches to create and verify a continuously expanding, append-only data structure that gradually turns into a chain of transaction blocks that serve the role of the ledger 35.

In the Bitcoin blockchain, nodes validate transactions and specialized nodes known as miners (or a collective of miners) pick up the transactions and compete to confirm pending transactions. Going from pending to confirmed means that the transaction has been added to the ledger (blockchain). Bitcoin miners batch pending transactions into what are known as blocks. The confirmed block is propagated across the entire network back to all nodes. Once validated, the nodes add the block to the previous block thus creating a blockchain. Some blockchain networks do not require mining such as blockchains that use proof of stake consensus method where participants must have a stake in the blockchain to select, verify, and validate transactions.

Non-blockchain forms of digital asset DLT networks store transactions in data architectures that differ from blockchains. For example, a hashgraph data structure stores all transactions in a parallel structure. Hashgraphs do not use miners to validate transactions and instead use a "gossip about gossip" consensus method where individual nodes on the network "gossip" about transactions to create directed acyclic graphs that time-sequence transactions without bundling them into blocks.

In this example, the asset management unit 22-1 is adding one or more transactions (e.g., a digital asset-based interaction may include one or more transactions) to the digital asset DLT network 36. For example, a digital asset-based interaction involving a digital asset associated with the digital asset DLT network 36 is added as a transaction on the ledger 35. The on-ledger transaction includes information related to the asset management unit 22-1 sending an amount of the digital assets to the digital asset-based interaction computing entity 16. The digital asset-based interaction computing entity 16 communicates with the digital asset DLT network 36 to obtain a desired amount of confirmations regarding the digital asset-based interaction transaction added via the asset management unit 22-1. Based on the type of digital asset DLT network 36 and the validation procedures used by the digital asset DLT network 36, the desired amount of confirmations may take minutes to hours of time to obtain.

Figure 4:
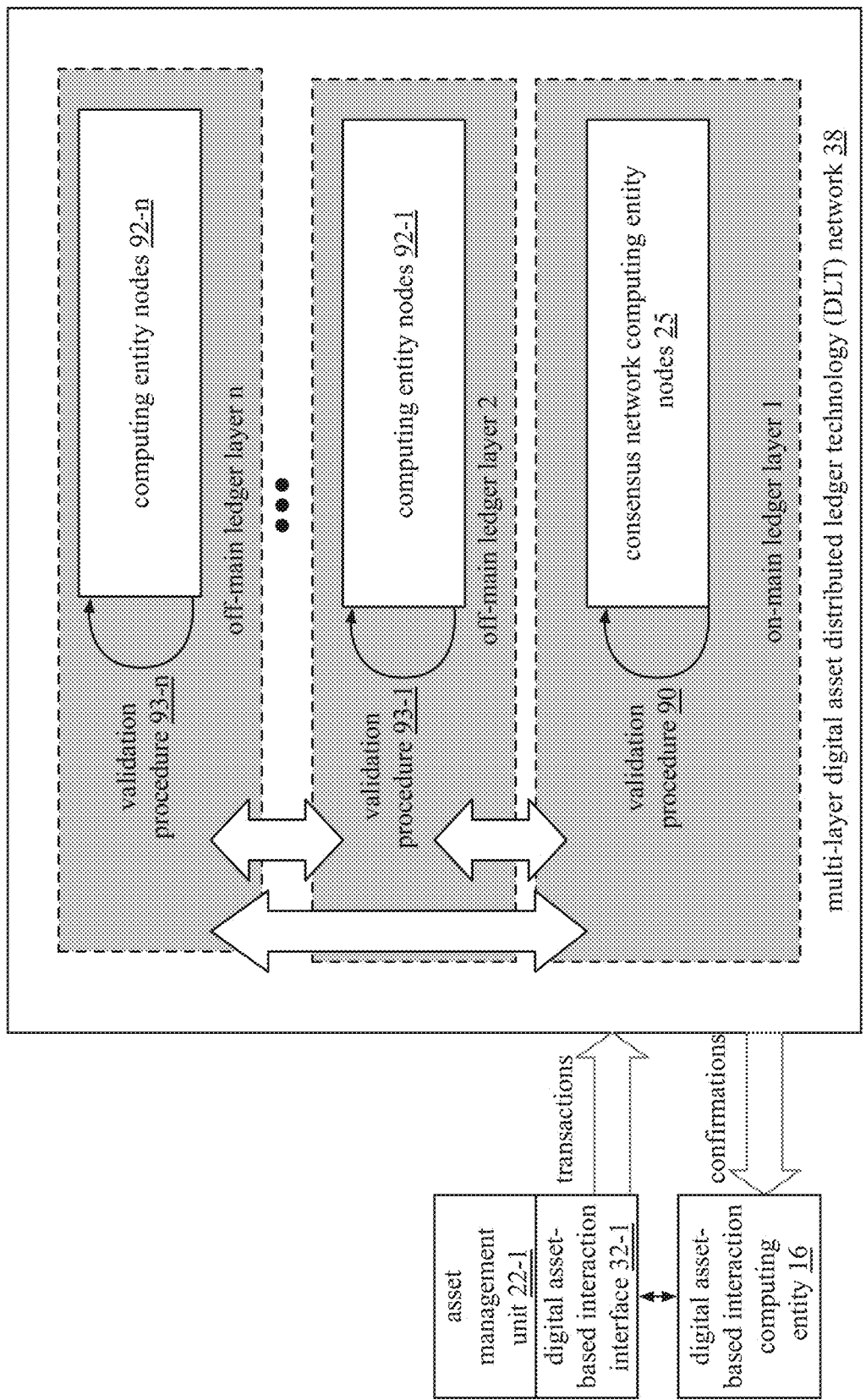
FIG. 4 is a schematic block diagram of an embodiment of a portion of the digital asset-based interaction system.

FIG. 4 is a schematic block diagram of an embodiment of a portion of the digital asset-based interaction system that includes an asset management unit 22-1 (e.g., of the first computing entity), a digital asset-based interaction computing entity 16, and a multi-layer digital asset distributed ledger technology (DLT) network 38. The asset management unit 22-1 includes a digital asset-based interaction interface 32-1 associated with the digital asset-based interaction computing entity 16.

The multi-layer digital asset distributed ledger technology (DLT) network 38 includes an on-main ledger layer 1 and a set of off-main ledger layers 1-n. The first layer of the multi-layer digital asset DLT network 38 (e.g., the on-main ledger layer 1) operates similarly to the digital asset DLT network of FIG. 3 and includes a plurality of consensus network computing entity nodes 25. The plurality of consensus network computing entity nodes 25 use an on-main ledger validation procedure 90 (e.g., consensus methods) to verify transactions on a main ledger. The on-main ledger validation procedure 90 may be any consensus method such as proof of work, proof of stake, delegated proof of stake, Byzantine Fault Tolerance, voting systems, etc.

An off-main ledger layer 1 of the set of off-main ledger layers 1-n improves an aspect of the first layer and/or of a neighboring layer of the multi-layer digital asset DLT network 38. For example, an off-main ledger layer may improve the scalability, transaction speed, and/or security of the first layer of the multi-layer digital asset DLT network. The off-main ledger layers 1-n each include a plurality of computing entity nodes 92-1 through 92-n where one or more of the plurality of computing entity nodes 92-1 through 92-n are validation computing entity nodes. Validation computing entity nodes implement validation procedures 93-1 through 93-n to verify off-main ledger transactions and communicate results to the on-main ledger layer 1. The off-main ledger validation procedures 93-1 through 93-n include consensus methods, secure multi-signature communications, and validation functions.

Off-main ledger layers can have many different formats and off-main ledger validation procedures 93 depending on the data structure and functionality of the on-main ledger layer 1. When the on-main ledger layer 1 includes a blockchain ledger data structure, additional layer solutions include nested blockchains, state channels, sidechains, etc.

A nested blockchain is a blockchain nested within or on top of another blockchain. Multiple nested blockchain levels can be built upon the first layer of the multi-layer digital asset DLT network with each level using a parent-child connection where the parent delegates work to the child. Nested blockchains use a validation procedure such as consensus method and/or validation function as its off-main ledger validation procedure 93. The OMG Foundation is an example of a nested blockchain that is utilized atop the first layer of the Ethereum blockchain. The OMG Foundation utilizes an update of Plasma to increase transaction throughput. Plasma is a series of smart contracts that run over the main chain. Transactions are bundled and compressed into one transaction and verified on the Plasma child chain. The child chain returns confirmed transactions to the main chain. The child chain is controlled by a single block-producing node called an Operator which sends a transaction hash of all the individual transactions to the main chain for validation. A network of computers known as watchers monitor the Operator and the network for suspicious activity.

A sidechain is a blockchain-adjacent transactional chain that is typically used for large batch transactions. Sidechains use an independent consensus method as its off-main ledger validation procedure 93 which is optimized for speed and scalability. The first layer of the multi-layer digital asset DLT network maintains overall security, confirms batched transactions, and resolves disputes. Roll-ups such as optimistic rollups and ZK (zero knowledge proof) rollups have a sidechain construction but keep some information on-chain. For example, transaction data is posted to the main chain but transaction execution is batched and takes place off-main chain. Optimistic rollups assume transactions are valid and validation computing entities only run computation via a fraud proof in the event of a challenge. ZK rollups run computation off-chain and submit validity proofs to the main chain.

State channels facilitate two-way communication between a first layer of the multi-layer digital asset DLT network and off-chain transactional channels, where secure multi-signature communications (e.g., multi-signature smart contracts) are used as its off-main ledger validation procedure 93 to verify transactions between nodes. When a transaction or a batch of transactions are complete on the state channel, the final state representing all the inherent transactions is recorded to the first layer of the multi-layer digital asset DLT network. Bitcoin's Lightning network is an example of a state channels layer atop of the main blockchain of Bitcoin.

Multi-layer digital asset DLT networks may include a variety of layers having different structures, validation procedures, and functions. For example, a main blockchain may include a state channels layers and/or sidechain layers on top of a nested blockchain layer. As another example, the multi-layer digital asset DLT network may only have one off-main ledger layer.

In this example, the asset management unit 22-1 is adding one or more transactions to the multi-layer digital asset DLT network 38. At least some transaction information (e.g., transaction data, an opening of an interaction channel, etc.) regarding a digital asset-based interaction involving a digital asset associated with the multi-layer digital asset DLT network may be added on the on-main ledger layer 1. The on-main ledger layer 1 offloads verification of the at least some transaction information to one or more other layers of the multi-layer digital asset DLT network 38.

The verification of transactions occurs on the off-main chain ledger layers until a settlement time period occurs that requires the transactions to be settled on the main ledger layer. The settlement time period includes when a dispute arises, when fraud is detected, a pre-determined time (e.g., as determined by contracted terms), a default time, upon request by the digital asset-based interaction computing entity and/or the first computing entity.

Once settlement occurs, the digital asset-based interaction computing entity 16 communicates with the on-main ledger layer 1 to obtain a desired amount of confirmations regarding the transactions added by the asset management unit 22-1. Based on the validation procedures (e.g., consensus methods) used by the on-main ledger layer 1, the desired amount of confirmations may take minutes to hours of time to obtain. Further, the time prior to the settlement time period may takes hours to days of time.

Figure 5:
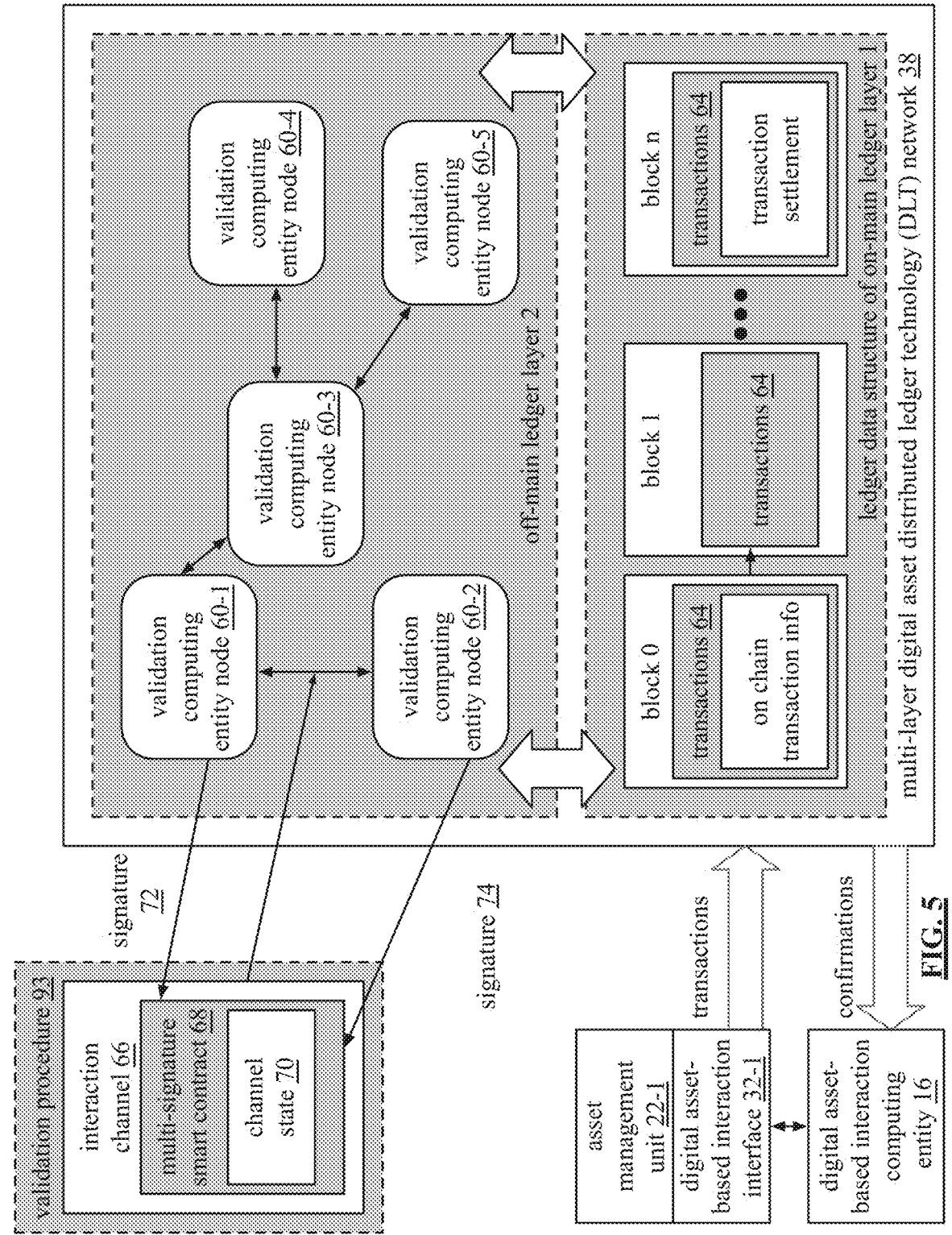
FIG. 5 is a schematic block diagram of an embodiment of a portion of the digital asset-based interaction system.

FIG. 5 is a schematic block diagram of an embodiment of a portion of the digital asset-based interaction system that includes an asset management unit 22-1 (e.g., of the first computing entity), a digital asset-based interaction computing entity 16, and a multi-layer digital asset distributed ledger technology (DLT) network. The asset management unit 22-1 includes a digital asset-based interaction interface 32-1 associated with the digital asset-based interaction computing entity 16.

The multi-layer digital asset DLT network 38 operates similarly to the multi-layer digital asset DLT network 38 of FIG. 4 except that in FIG. 5, a blockchain data structure of the on-main ledger layer 1 is shown and a single off-main ledger layer 2 is shown with a state channels structure. The off-main ledger layer 2 includes a plurality of validation computing entity nodes 60-1 through 60-5 that are operable to verify off-chain transactions via a validation procedure 93. The validation procedure 93 includes a secure multi-signature communication (e.g., multi-signature smart contract 68) that enforces pre-defined rules for off-chain transactions. The secure multi-signature communication is also referred to as an interaction channel 66.

In this example, the asset management unit 22-1 has initiated a digital asset-based interaction with another computing entity and sends digital assets to the digital asset-based computing entity 16 via the digital asset-based interaction interface 32-1. The digital assets are associated with the multi-layer digital asset DLT network 38. Sending the digital assets opens an interaction channel 66 between a validation computing entity node 60-1 associated with the digital asset-based interaction computing entity 16 and a validation computing entity node 60-2 associated with the asset management unit 22-1. For example, the digital asset-based interaction computing entity 16 opens an interaction channel 66 upon receipt of the digital assets.

As another example, the asset management unit 22-1 opens the interaction channel 66 via the digital asset-based interaction interface 32-1 to send digital assets to the digital asset-based interaction computing entity 16. As another example, a third party opens the interaction channel 66 on behalf of one or more of the asset management unit 22-1 and the digital asset-based interaction computing entity 16. A third party is also operable to fund an interaction channel on behalf of one or more of the asset management unit 22-1 and the digital asset-based interaction computing entity 16 where the third party implements certain procedures to ensure that it won't be cheated.

Each party signs (signatures 72 and 74) an initial opening interaction channel transaction and at least one party deposits funds to "fund" the interaction channel 66. In this example, the digital assets sent from the asset management unit 22-1 to the digital asset-based interaction computing entity 16 fund the interaction channel 66. The asset management unit 22-1 may send an amount equal to an amount of the digital asset-based interaction or more than the digital asset-based interaction to fund the interaction channel 66. Opening the interaction channel 66 is a transaction added to a block of the ledger data structure of layer 1 of the multi-layer digital asset DLT network 38 (e.g., on-chain transaction information).

With the interaction channel 66 opened, the validation computing entity node 60-1 and the validation computing entity node 60-2 can interact bilaterally as many times as they like or are allowed to by pre-defined rules. Transactions on the off-main ledger layer 2 are commitment transactions that are valid, signed transactions that are not broadcast. The interaction channel can be closed mutually (e.g., both parties agree to close the interaction channel), unilaterally (e.g., one of the parties broadcasts the current channel state to the main layer), or by revocation (e.g., if one party cheats the other, the other party can claim the entire balance by fulfilling a multi-signature spending condition). Closing the interaction channel is a transaction added to the blockchain. The balances provided in the transaction added to the blockchain can be referred to as a transaction settlement.

Instead of opening a new interaction channel on the off-main ledger layer 2, transactions can be routed (similar to IP packets in a network) via open interaction channels between other validation computing entity nodes 60. For example, if the asset management unit 22-1 is associated with the validation computing entity node 60-1 and the digital asset-based interaction computing entity 16 is associated with a validation computing entity node 60-5, the transaction could be routed through validation computing entity node 60-3's open interaction channel with validation computing entity node 60-5.

To connect several interaction channels, another type of contract is needed such as a hashed time lock contract or HTLC. HTLCs rely on cryptographic hash functions where a transaction is structured such that another party can only accept it if the party knows the secret whose hash has been shared with them. To forward interactions through the network, users must be live and must have locked funds in a greater quantity than the payment they are forwarding. HTLCs use hashlocks and timelocks to ensure payment security. Hashlocks restrict the spending of an output until a specified piece of data is publicly revealed. Timelocks are restrictions on transactions or outputs that only allow spending after a point in time. Timelocks ensure the routed payments cannot be claimed by intermediate nodes. Timelocks require the productions of a verifiable digital signature before a certain time. If the secret is not revealed, the payer of the HTLC can get a refund after some time.

Figure 6:
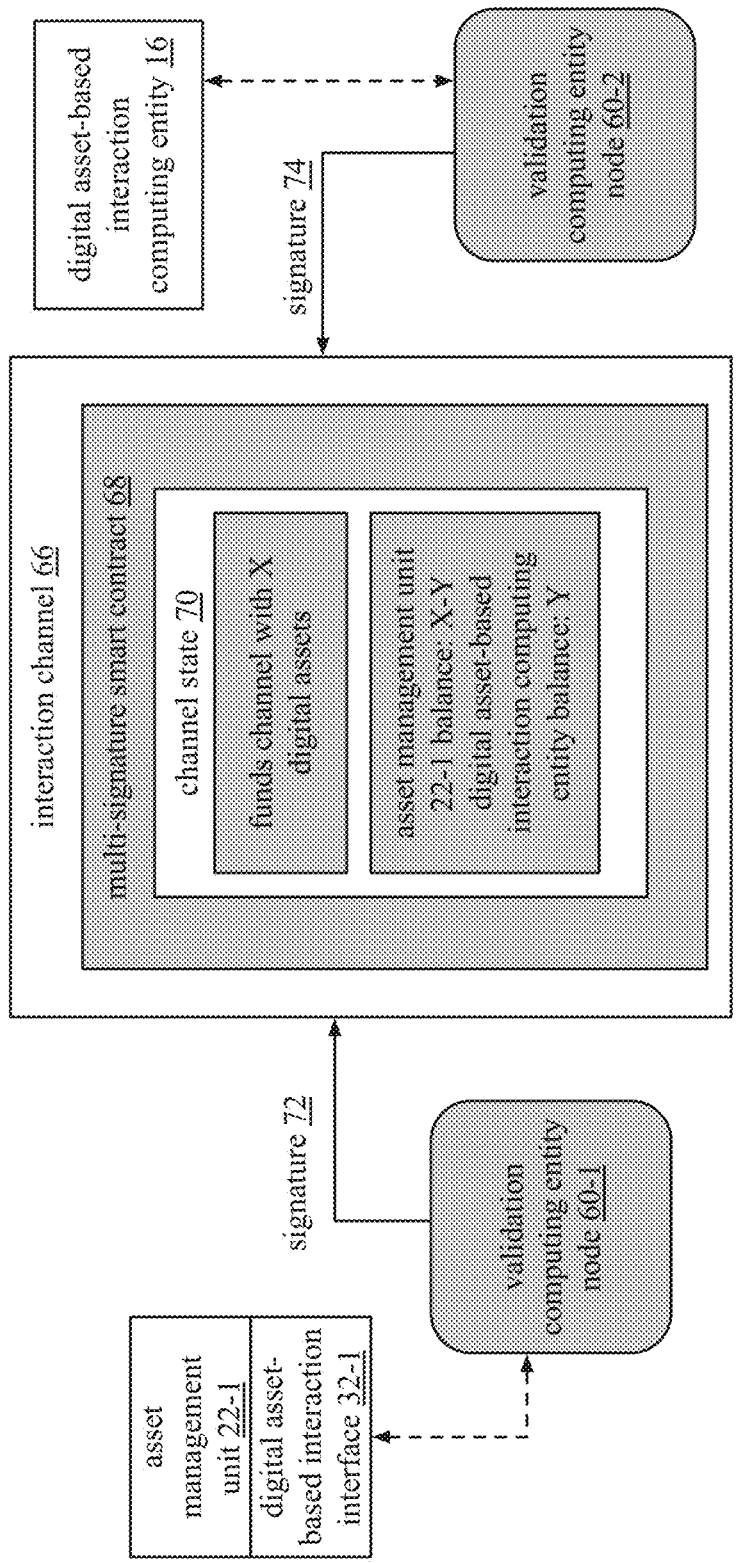
FIG. 6 is a schematic block diagram of an embodiment of a portion of a digital asset-based interaction system.

FIG. 6 is a schematic block diagram of an embodiment of a portion of a digital asset-based interaction system that includes an asset management unit 22-1 (e.g., of the first computing entity), a digital asset-based interaction computing entity 16, and validation computing entity nodes 60-1 and 60-2 of an off-main ledger layer of a multi-layer digital asset distributed ledger technology (DLT) network 38. The asset management unit 22-1 includes a digital asset-based interaction interface 32-1 associated with the digital asset-based interaction computing entity 16.

FIG. 6 operates similarly to FIG. 5 except that the interaction channel 66 is shown in more detail. An interaction channel 66 is a multi-signature smart contract 68 such as a 2-of-2 MultiSig account or a Pay to Script Hash (P2SH) address. The multi-signature smart contract 68 controls the funds (the channel balance) and defines the conditions under which funds can be spent. The channel state 70 contains the balances and actions of the parties. A 2-of-2 MultiSig account is based on two private keys both of which need to sign (signatures 72 and 74) a transaction for it to be valid.

The validation computing entity node 60-1 is associated with the asset management unit 22-1. For example, the first computing entity 12 associated with the asset management unit 22-1 includes hardware and/or software providing it with the operability to connect to the multi-layer digital asset DLT network 38 as a validation computing entity node 60-1. As another example, a third party computing entity acting on behalf of the asset management unit 22-1 includes the hardware and/or software providing it with the operability to connect to the multi-layer digital asset DLT network 38 as a validation computing entity node 60-1.

The validation computing entity node 60-2 is associated with the digital asset-based interaction computing entity 16. For example, the digital asset-based interaction computing entity 16 includes hardware and/or software providing it with the operability to connect to the multi-layer digital asset DLT network 38 as a validation computing entity node 60-1. As another example, a third-party computing entity acting on behalf of the asset management unit 22-1 includes the hardware and/or software providing it with the operability to connect to the multi-layer digital asset DLT network 38 as a validation computing entity node 60-1.

In this example, the asset management unit 22-1 has initiated a digital asset-based interaction with another computing entity and sends digital assets to the digital asset-based computing entity 16 via the digital asset-based interaction interface 32-1. Sending the digital assets opens an interaction channel 66 (or takes advantage of one or more already opened interaction channels) between the validation computing entity node 60-1 associated with the asset management unit 22-1 and the validation computing entity node 60-2 associated with the digital asset-based interaction computing entity 16.

The interaction channel 66 opened is the multi-signature smart contract 68 that requires a signature from both parties to confirm an interaction. For example, the validation computing entity node 60-1 funds the interaction channel with X digital assets and indicates an output balance for itself (e.g., X-Y digital assets) and the validation computing entity node 60-2 (Y digital assets). The channel state 70 includes these terms and to confirm the interaction, the validation computing entity node 60-1 provides signature 72 and the validation computing entity node 62 provides signature 74.

Figure 7:
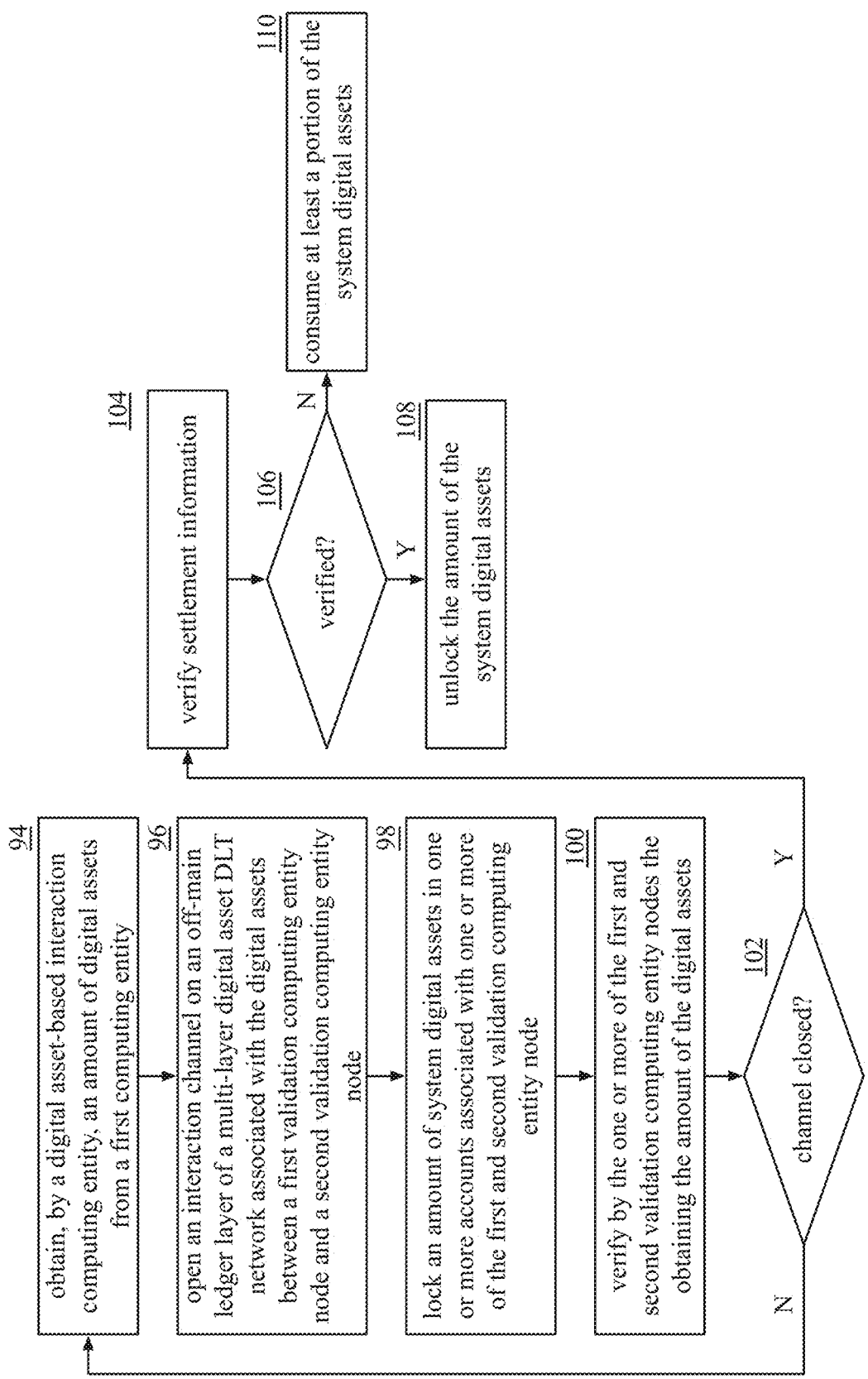
FIG. 7 is a flowchart of an example of a method of a digital asset-based interaction.

FIG. 7 is a flowchart of an example of a method of a digital asset-based interaction where a validation computing entity node of a state channels off-main ledger layer of a multi-layer digital asset distributed ledger technology (DLT) network is staked to back the digital asset-based interaction. The method of FIG. 7 is similar to the method of FIG. 2 except that a specific example of a state channel type of off-main ledger layer is discussed.

The method begins with step 94 where a digital asset-based interaction computing entity of a digital asset-based interaction system obtains an amount of digital asset from a first computing entity for a digital asset based-interaction between the first computing entity and a second computing entity. The second computing entity accepts assets in a desired asset format (e.g., a fiat currency, another type of digital asset, etc.).

The method continues with step 96 where an interaction channel on an off-main ledger layer of a multi-layer digital asset DLT network associated with the digital asset is opened for the digital asset-based interaction. The off-main ledger layer includes a plurality of validation computing entity nodes. A validation computing entity node is operable to verify off-main ledger transactions via one or more off-main ledger validation procedures. In the example of state channels the off-main ledger validation procedure is a secure multi-signature communication (e.g., a multi-signature smart contract) also referred to an interaction channel.

The interaction channel is opened between a first validation computing entity node associated with the first computing entity and a second validation computing entity node associated with the digital asset-based computing entity and the interaction channel may take advantage of already open interaction channels to route data between the first and second validation computing entity nodes. One or more of the first computing entity, the digital asset-based interaction computing entity, and a third-party computing entity is operable to open the interaction channel on behalf of one or more of the first computing entity and the digital asset-based interaction computing entity. Opening the interaction channel is an on-main ledger transaction on an on-main ledger layer of the multi-layer digital asset DLT network.

The method continues with step 98 where a digital asset backing computing entity of the digital asset-based interaction system locks an amount of system digital assets in one or more accounts associated with one or more of the first validation computing entity node and the second validation computing entity node. The method continues with step 100 where the one or more of the first and second validation computing entity node verify the obtaining the amount of the digital assets using an off-main ledger validation procedure of the secure, multi-signature communication and more specifically a multi-signature smart contract.

The multi-signature smart contract, such as a 2-of-2 MultiSig account or a Pay to Script Hash (P2SH) address, controls funds (the interaction channel balance) and defines the conditions under which funds can be spent. The channel state contains the balances and actions of the parties. A 2-of-2 MultiSig account is based on two private keys both of which need to sign a transaction for it to be valid. While the transaction is confirmed off-main ledger using this validation procedure, this confirmation is not broadcast to the on-main ledger layer. The first and second validation computing entity nodes may interact via this two-way communication as many times as desired until a settlement time-period occurs. The settlement time-period includes when a dispute arises, when fraud is detected, a pre-determined time as set by contracted terms, a default time, and/or upon request by the digital asset-based interaction computing entity and/or the first computing entity, etc.

When the settlement time-period occurs, the interaction channel is closed, and the channel state is recorded to the main-ledger layer. The method continues with step 102 where the digital asset-based interaction computing entity determines whether the interaction channel is closed (e.g., it receives a data input, receives a response from an inquiry, etc.). When the interaction channel is not closed, the first computing entity and digital asset-based interaction computing entity continue to interact as desired on the off-main ledger layer and the method loops back to step 94.

When the interaction channel is closed at step 102, the method continues with step 104 where the digital asset-based interaction computing entity connects to a plurality of consensus network computing entity nodes of the on-main ledger layer to verify settlement information pertaining to the digital asset based-interaction. The settlement information includes information related to a final channel state of the interaction channel such as a final balance representative of all transactions that occurred while the interaction channel was open. The plurality of consensus network computing entity nodes use an on-main ledger validation procedure (e.g., a consensus method) to confirm the final state of the interaction channel (e.g., the interaction settlement).

The method continues with step 106 where the digital asset-based interaction computing entity determines whether the settlement information is verified. To verify the settlement information, the digital asset-based interaction computing entity compares the settlement information with an internal accounting of the digital asset-based interactions executed via the interaction channel. For example, while the interaction channel is open, the first computing entity sends the digital asset-based interaction computing entity a first amount of a digital asset for a first digital asset-based interaction and a second amount of digital assets for a second digital asset-based interaction. The internal accounting keeps track of the first and second amounts. The digital asset-based interaction computing entity verifies (via a digital asset backing computing entity) that the final channel state shows that the digital asset-based computing entity's balance includes the first and second amounts of digital assets.

When the settlement information is verified, the method continues with step 108 where the digital asset backing computing entity unlocks the amount of system digital assets. Using the example above where the first computing entity sends the digital asset-based interaction computing entity the first and second amounts of a digital assets while the channel is open, a first and second amount of system digital assets would be locked for the first and second digital asset-based interactions. When the settlement information is verified (e.g., the first and second amounts of digital assets are represented in the final channel state), the digital asset backing computing entity unlocks the first and second amounts of system digital assets.

When the settlement information is not verified, the method continues with step 110 where the digital asset backing computing entity consumes at least a portion of the amount of system digital assets. Continuing the example above where the first computing entity sends the digital asset-based interaction computing entity the first and second amounts of a digital assets while the channel is open, a first and second amount of system digital assets would be locked for the first and second digital asset-based interactions. When the settlement information is not verified (e.g., the first and second amounts of digital assets are not represented in the final channel state), the digital asset backing computing entity unlocks either or both of the first and second amounts of system digital assets depending on the discrepancy between the internal accounting and the final channel state.

Figure 8:
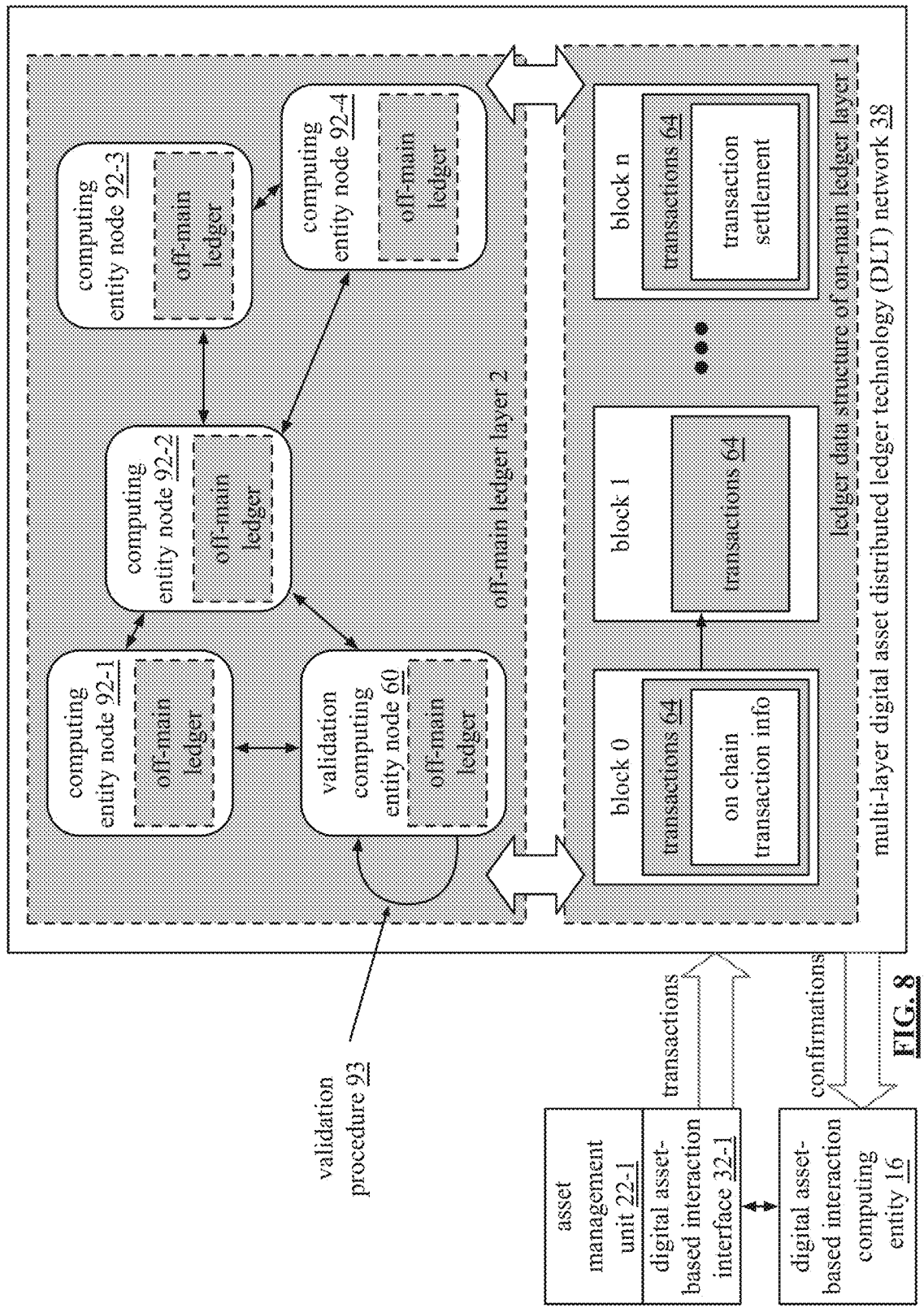
FIG. 8 is a schematic block diagram of an embodiment of a portion of the digital asset-based interaction system.

FIG. 8 is a schematic block diagram of an embodiment of a portion of the digital asset-based interaction system that includes an asset management unit 22-1 (e.g., of the first computing entity), a digital asset-based interaction computing entity 16, and a multi-layer digital asset distributed ledger technology (DLT) network. The asset management unit 22-1 includes a digital asset-based interaction interface 32-1 associated with the digital asset-based interaction computing entity 16.

The multi-layer digital asset DLT network 38 operates similarly to the multi-layer digital asset DLT network 38 of FIG. 5 except that the off-main ledger layer 2 in FIG. 8 depicts a nested blockchain or sidechain off-main ledger layer example. The off-main ledger layer 2 includes a plurality of computing entity nodes 92-1 through 92-4 and at least one validation computing entity node 60.

In this example, the asset management unit 22-1 has initiated a digital asset-based interaction with another computing entity and sends digital assets to the digital asset-based computing entity 16 via the digital asset-based interaction interface 32-1. The digital assets are associated with the multi-layer digital asset DLT network 38. At least a portion of the transaction information involved in sending the digital assets may be posted to the on-main ledger layer 1 (e.g., on chain transaction information). At least a portion of the transaction information involved in sending the digital assets is offloaded to the off-main ledger layer 2 for verification. Each computing entity node 92 and validation computing entity node 60 maintain an off-main ledger of transactions and the validation computing entity node performs a validation procedure 93 to verify the transactions.

In a nested blockchain example, the off-main ledger is a child chain ledger where the validation computing entity node 60 is an operator node that performs a validation procedure on the transactions prior to sending transactions back to the on-main ledger layer for validation. For example, the operator node performs a transaction hash on all the individual transactions of the child chain ledger and sends the transaction hash to the on-main ledger layer 1 for validation (e.g., transaction settlement information).

In a roll-up type sidechain example, the off-main ledger is a sidechain ledger that uses an independent consensus method from the on-main ledger layer. Transaction data is written to the on-main ledger layer and transaction execution is "rolled-up" to the off-main ledger layer 2. For example, in optimistic roll-ups, transactions are assumed to be valid thus no computations are run for a consensus (e.g., an optimistic consensus validation procedure). During a settlement period, (e.g., a dispute arises, fraud is suspected, a withdrawal is requested, etc.) one or more validation computing entity nodes are operable to run the computations on the transactions using a fraud proof (e.g., a validation function validation procedure 93) and submit the result to the on-main ledger layer for validation.

As another example, in zero-knowledge (ZK) roll-ups one or more validation computing entity nodes run the computations off-chain using validity proofs (e.g., a validation function validation procedure 93) and submit the results to the on-main ledger layer for validation. Other methods of validation procedures and how validation computing entity nodes interact with other computing entity nodes to verify transactions are possible.

Figure 9:
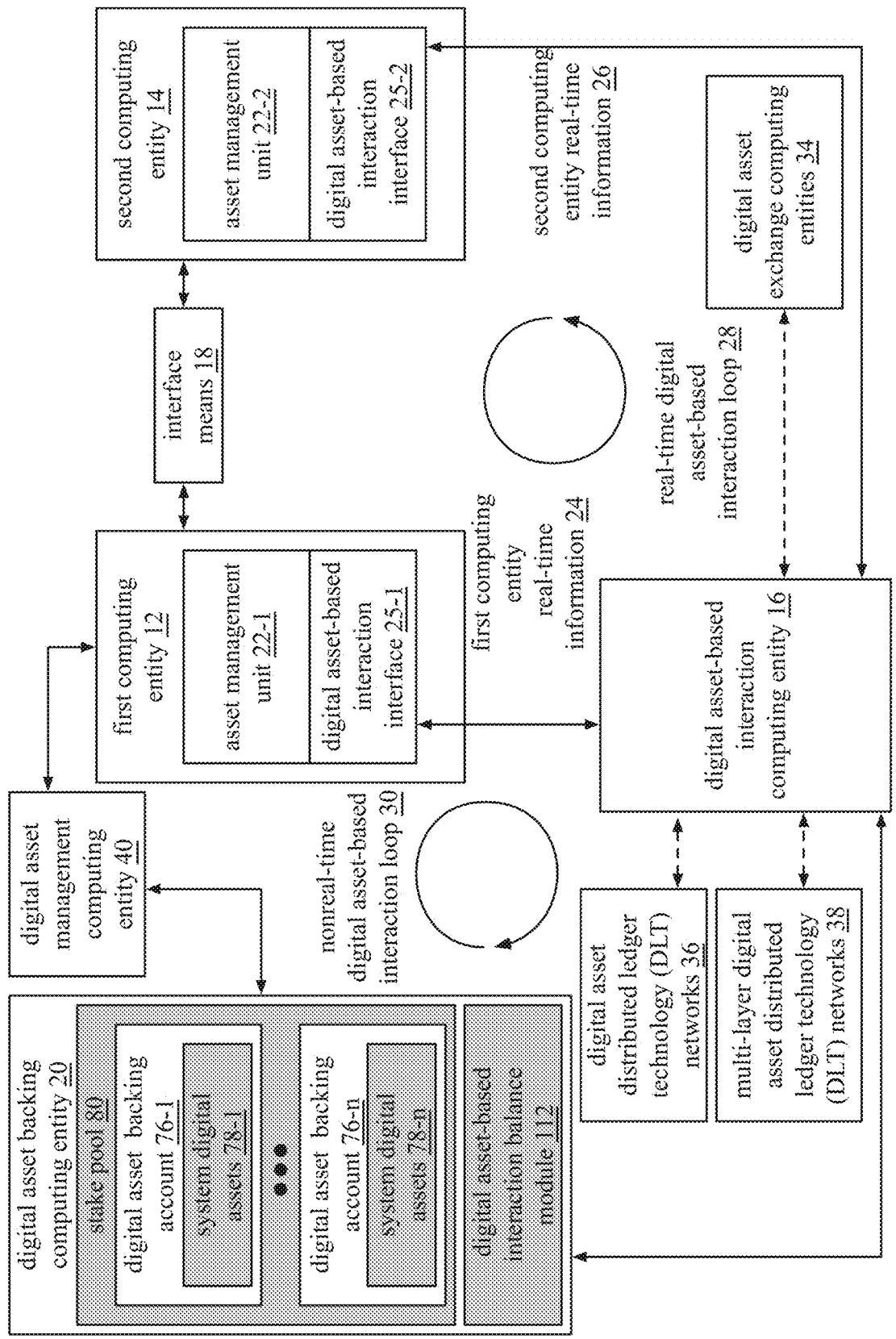
FIG. 9 is a schematic block diagram of an embodiment of a digital asset-based interaction system.

FIG. 9 is a schematic block diagram of an embodiment of a digital asset-based interaction system 10 that includes a first computing entity 12, a second computing entity 14, a digital asset-based interaction computing entity 16, an interface means 18, a digital asset backing computing entity 20, a digital asset management computing entity 40, one or more digital asset exchange computing entities 34, one or more digital asset distributed ledger technology (DLT) networks 36, and one or more multi-layer digital asset distributed ledger technology (DLT) networks 38. The digital asset-based interaction system 10 of FIG. 9 operates similarly to the digital asset-based interaction system 10 of FIG. 1 except that the digital asset backing computing entity 20 is shown in more detail.

The digital asset backing computing entity 20 includes a plurality of digital asset backing accounts 76-1 through 76-$n$ that store system digital assets 78-1 through 78-$n$ respectively to form a stake pool 80 and a digital asset-based interaction balance module 112. The system digital assets 78-1 through 78-$n$ serve as collateral to back digital asset-based interactions of the digital asset-based interaction system 10. The system digital assets may be any digital asset that the digital asset-based interaction system chooses to use. For example, the system digital asset is a token on the Ethereum blockchain specifically created for use in the digital asset-based interaction system. As another example, the system digital asset is an already established and trusted crypto currency.

The plurality of digital asset backing accounts 76-1 through 76-$n$ is associated with the first computing entity 12, the second computing entity 14, a type of digital asset, and/or a validation computing entity node associated with an off-main ledger layer of a multi-layer digital asset DLT network 38. As an example, the digital asset backing account 76-1 is associated with the asset management unit 22-1 of the first computing entity 12. The digital asset management computing entity 40 is associated with the digital asset backing computing entity 20 via one or more accounts and is operable to deposit system digital assets into the one or more accounts to back digital asset-based interactions of users of an associated asset management unit (e.g., asset management unit 22-1). The digital asset management computing entity 40 is incentivized to back asset management unit interactions by receiving rewards from the digital asset backing computing entity 20 such as a percentage of system digital asset back on successful transactions. Additionally, the system digital asset provides payment utility such as lower foreign exchange rates.

The digital asset management computing entity 40 is also referred to as a staking entity and in this example, is associated with a developer of the asset management unit (e.g., a digital wallet developer). Because the digital asset management computing entity 40 is backing the asset management unit interactions and is rewarded by successful transactions, the digital asset management computing entity 40 is incentivized to produce a quality asset management unit that prevents user fraud and to remedy faulty software that affects transaction success. In another embodiment, the asset management units 22 may be backed by a different and/or additional type(s) of staking entities such as one or more user computing devices, one or more merchant computing entities, one or more computing entities associated with a corporation and/or business, etc.

In another example, the digital asset backing account 76-*n* may be associated with a validation computing entity node of an off-main ledger layer of a multi-layer digital asset DLT network 38. One or more staking entities are operable to deposit system digital assets into the digital asset backing account 76-*n* to back digital asset-based interactions associated with the validation computing entity node. The validation computing entity node may be backed by any type of staking entity such as one or more user computing devices, one or more merchant computing entities, one or more computing entities associated with a corporation and/or business, the digital asset management computing entity 40, etc.

The one or more staking entities are incentivized to back digital asset-based interactions associated with the validation computing entity node by receiving rewards from the digital asset backing computing entity 20 such as a percentage of system digital asset back on successful transactions. The risk of staking the digital asset backing account 76-*n* is mitigated by actions taken and procedures followed by the digital asset-based interaction computing entity 16. For example, the digital asset-based interaction computing entity primarily transacts with trusted parities (e.g., users of trusted asset management units, known users (e.g., that provide personal information), etc.).

The digital asset-based interaction balance module 112 keeps track of the amounts of digital asset-based interactions that are verified via an off-main ledger of a multi-layer digital asset DLT network 38. The digital asset-based interaction balance module 112 keeps track of the amounts of digital asset-based interactions to lock the appropriate amounts of system digital assets for each digital asset-based interaction and reconciles an internal accounting of amounts of digital asset-based interactions with settlement information from an on-main ledger layer of a multi-layer digital asset DLT network 38. The reconciliation of the internal accounting with the settlement information informs the digital asset backing computing entity when to unlock and/or consume system digital assets. The digital asset-based interaction balance module 112 will be discussed in more detail with reference to FIGS. 11-16.

Figure 10:
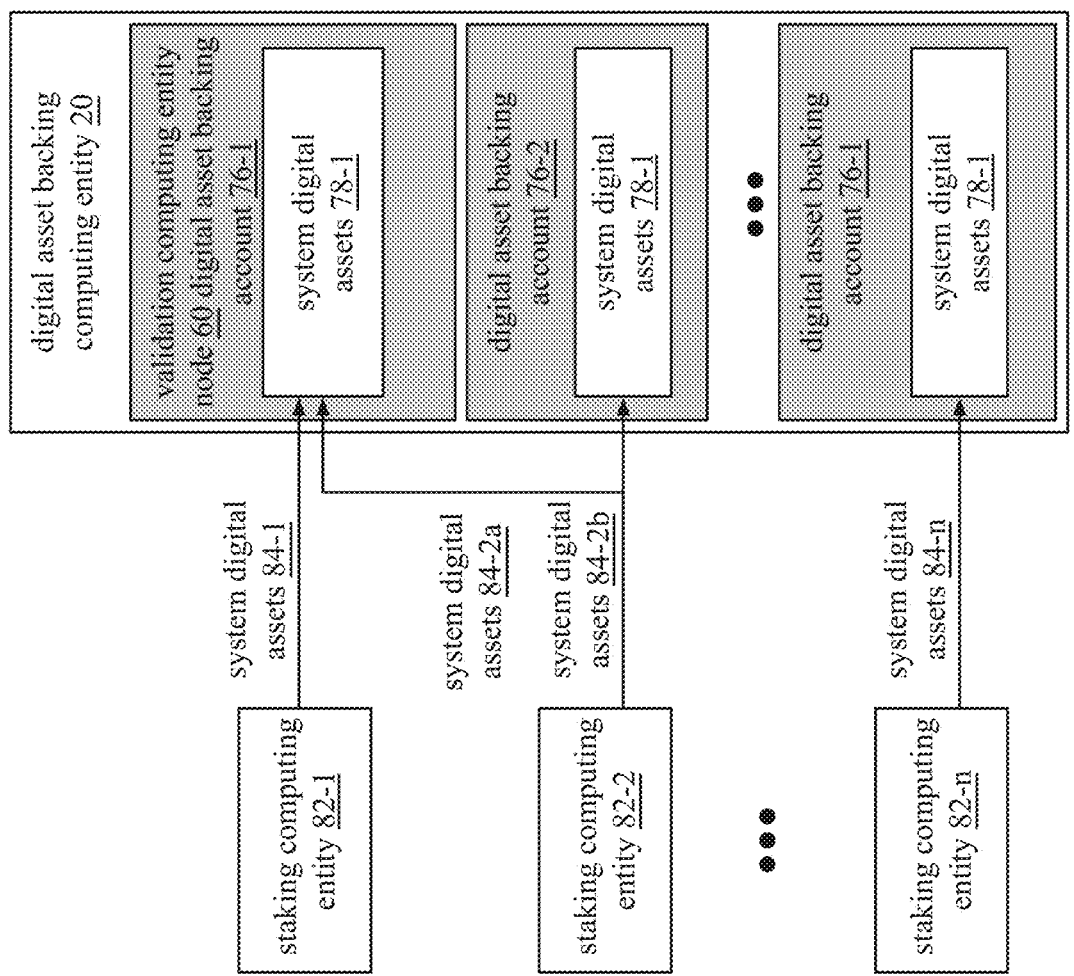
FIG. 10 is a schematic block diagram of an embodiment of staking computing entities and a digital asset backing computing entity of a digital asset-based interaction system.

FIG. 10 is a schematic block diagram of an embodiment of staking computing entities 82-1 through 82-*n* and a digital asset backing computing entity 20 of a digital asset-based interaction system. The staking computing entities 82-1 through 82-*n* may include a digital asset management computing entity and/or any computing entity such as a user computing device. To become staking entities of the digital asset-based interaction system, a computing entity deposits system digital assets 84-1 through 84-*n* in an associated digital asset backing account 76-1 through 76-*n* of the digital asset backing computing entity 20 to back digital asset-based interactions of the digital asset-based interaction system.

In this example, the staking computing entity 82-1 deposits system digital assets 84-1 into a validation computing entity node 60 digital asset backing account 76-1 of the digital asset backing computing entity 20 to back interactions associated with the validation computing entity node 60 (i.e., a validation computing entity node of an off-main ledger layer of a multi-layer digital asset distributed ledger technology (DLT) network). The staking computing entity 82-2 deposits system digital assets 84-2*a* into the validation computing entity node 60 digital asset backing account 76-1 of the digital asset backing computing entity 20 to back interactions associated with the validation computing entity node 60 and deposits system digital assets 84-2*b* into digital asset backing account 76-2 of the digital asset backing computing entity 20 to back interactions associated with that account. The staking computing entity 82-*n* deposits system digital assets 84-*n* into digital asset backing account 76-*n* of the digital asset backing computing entity 20 to back interactions associated with that account.

Figure 11:
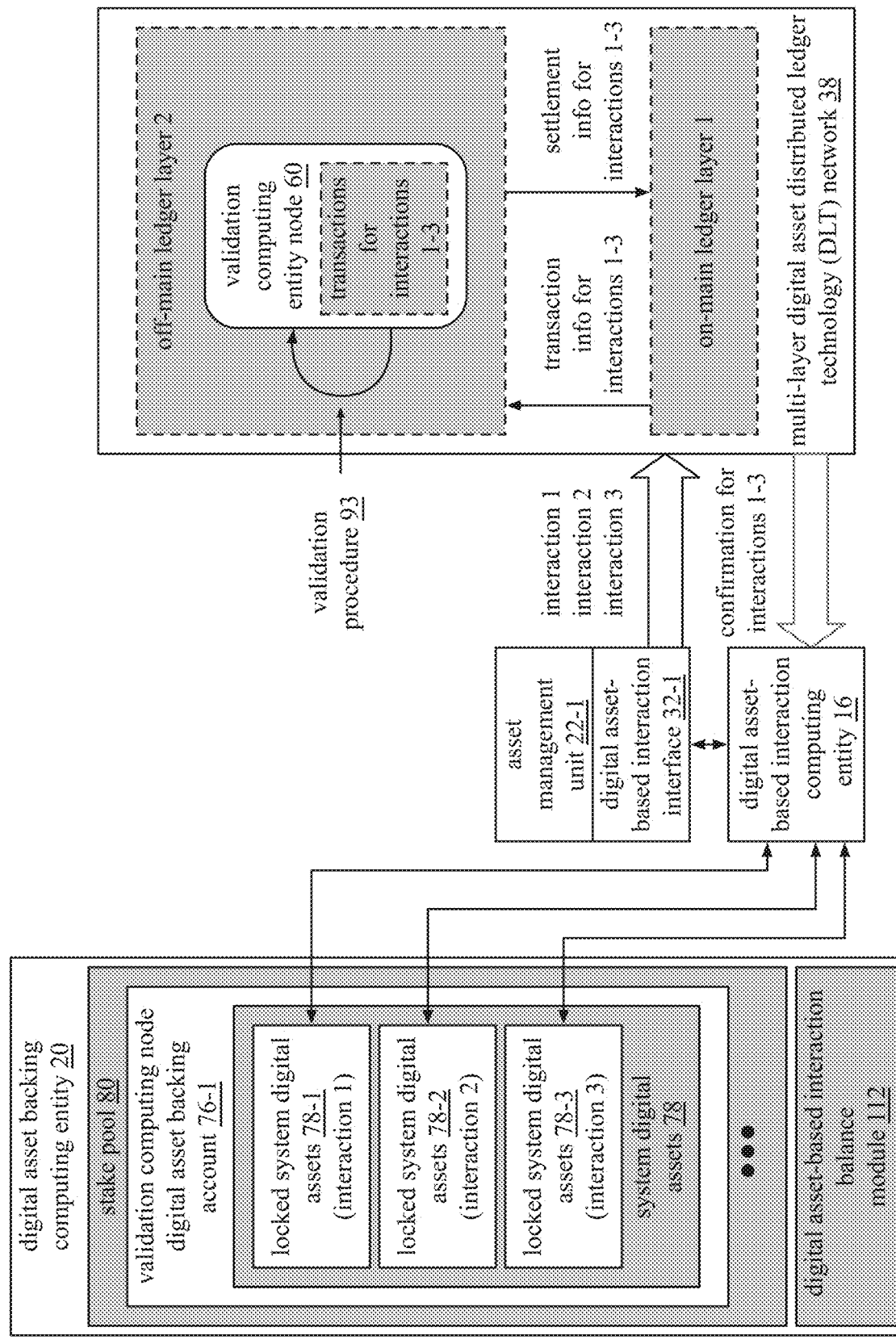
FIG. 11 is a schematic block diagram of an embodiment of a portion of the digital asset-based interaction system.

FIG. 11 is a schematic block diagram of an embodiment of a portion of the digital asset-based interaction system that includes a digital asset backing computing entity 20, an asset management unit 22-1, a digital asset-based interaction computing entity 16, and a multi-layer digital asset distributed ledger technology (DLT) network 38. The asset management unit 22-1 includes a digital asset-based interaction interface 32-1 associated with the digital asset-based interaction computing entity 16.

In this example, the asset management unit 22-1 (e.g., of a first computing entity) sends transaction information pertaining to three digital asset-based interactions involving a particular digital asset to a multi-layer digital asset distributed ledger technology (DLT) network associated with that particular digital asset. The transaction information related to the three digital asset-based interactions is offloaded from an on-main ledger layer 1 for verification on an off-main ledger layer of a multi-layer digital asset DLT network. The transaction information related to the three digital asset-based interactions is not verified on the on-main ledger layer until a settlement time period occurs (e.g., when a dispute arises, when fraud is detected, a pre-determined time, a default time, upon request by the digital asset-based interaction computing entity and/or the first computing entity, etc.).

In an example, the first computing entity interacts with a second computing entity as a first interaction ("interaction 1") to send a first amount of digital assets to the second computing entity where the second computing entity accepts assets in a desired asset format. The first amount of digital assets is sent to the digital asset-based interaction computing entity which may be a transaction (i.e., "interaction 1" transaction data) on the multi-layer digital asset DLT network. To back the first interaction, the digital asset backing computing entity 20 locks a first amount of system digital assets (e.g., locked system digital assets 78-1) in an account associated with a validation computing node 60 of an off-main ledger layer 2 of the multi-layer digital asset DLT network. The validation computing entity node 60 implements an off-main ledger validation procedure 93 to verify the transactions for interaction 1. Transaction data regarding interaction 1 may or may not be added to the on-main ledger layer depending on the structure of the off-main ledger layer.

The first computing entity interacts with the second computing entity again as a second interaction ("interaction 2") to send a second amount of digital assets to the second computing entity where the second computing entity accepts assets in a desired asset format. The second amount of digital assets is sent to the digital asset-based interaction computing entity which may be a transaction (i.e., "interaction 2" transaction data) on the multi-layer digital asset DLT network. To back the second interaction, the digital asset backing computing entity 20 locks a second amount of system digital assets (e.g., locked system digital assets 78-2) in the account associated with the validation computing node 60. The validation computing entity node 60 implements an off-main ledger validation procedure 93 to verify the transactions for interaction 2. Transaction data regarding interaction 2 may or may not be added to the on-main ledger layer depending on the structure of the off-main ledger layer.

The first computing entity interacts with a third computing entity as a third interaction ("interaction 3") to send a third amount of digital assets to the third computing entity where the third computing entity accepts assets in a desired asset format. The third amount of digital assets is sent to the digital asset-based interaction computing entity which may be a transaction (i.e., "interaction 3" transaction data) on the multi-layer digital asset DLT network. To back the third interaction, the digital asset backing computing entity 20 locks a third amount of system digital assets (e.g., locked system digital assets 78-3) in the account associated with the validation computing node 60. The validation computing entity node 60 implements an off-main ledger validation procedure 93 to verify the transactions for interaction 3. Transaction data regarding interaction 3 may or may not be added to the on-main ledger layer 1 depending on the structure of the off-main ledger layer.

During a settlement time period (e.g., when a dispute arises, when fraud is detected, a pre-determined time, a default time, upon request by the digital asset-based interaction computing entity and/or the first computing entity, etc.), the settlement information for the interactions 1-3 is included on the on-main ledger layer 1. When the settlement information for the interactions 1-3 is included on the on-main ledger layer 1, the digital asset-based interaction computing entity 16 is operable to connect to the on-main ledger layer 1 to obtain confirmations for the interactions 1-3. When the confirmations are received and the settlement information is correct for each interaction 1-3, the digital asset backing computing entity 20 unlocks the locked system digital assets 78-1 through 78-3. When the settlement information is not correct for an interaction of the interactions 1-3, the digital asset backing computing entity 20 consumes at least a portion of the locked system digital assets 78-1 through 78-3 to cover the discrepancy.

Figure 12:
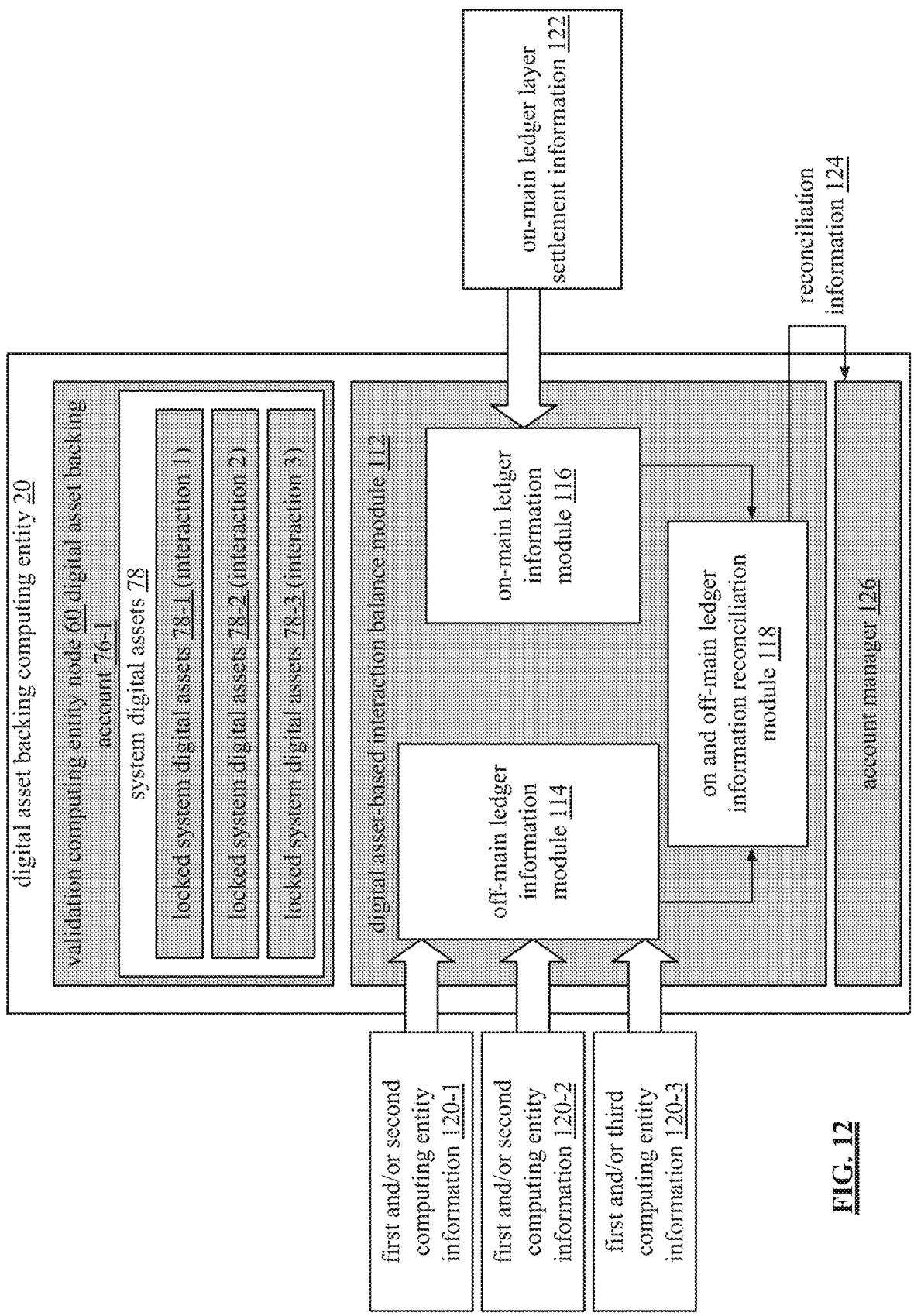
FIG. 12 is a schematic block diagram of an embodiment of a digital asset backing computing entity.

FIG. 12 is a schematic block diagram of an embodiment of a digital asset backing computing entity 20 that includes a validation computing entity node 60 digital asset backing account 76 associated with a validation computing entity node of an off-main ledger layer of a multi-layer distributed ledger technology (DLT), a digital asset-based interaction balance module 112, and an account manager 126. FIG. 12 continues the example of FIG. 11 where the validation computing entity node 60 digital asset backing account 76-1 stores locked system digital assets 78-1 through 78-3 for digital asset-based interactions 1-3 and shows the digital asset-based interaction balance module 112 in more detail.

The account manager 126 manages the digital asset backing accounts of the digital asset backing computing entity 20. For example, the account manager 126 distributes rewards, locks and unlocks system digital assets, and manages the personal information of the staking entities associated with the digital asset backing accounts.

The digital asset-based interaction balance module 112 includes an off-main ledger information module 114, an on-main ledger information module 116, and an on and off-main ledger information reconciliation module 118. The off-main ledger information module 114 obtains off-main ledger information directly from the computing entities (e.g., the first and/or second real time computing entity information of previous Figures) involved in the digital asset-based interaction or via the digital asset-based interaction computing entity. The first and/or second computing entity information 120-1 includes an amount of the first digital asset-based interaction ("interaction 1"). The first and/or second computing entity information 120-2 includes an amount of the second digital asset-based interaction ("interaction 2"). The first and/or third computing entity information 120-3 includes an amount of the third digital asset-based interaction ("interaction 3"). The off-main ledger information module 114 maintains an accounting of each of these amounts.

The on-main ledger information module 116 obtains on-main ledger settlement information 122 directly from the on-main ledger layer of the multi-layer digital asset DLT network or via the digital asset-based interaction computing entity. The on-main ledger settlement information 122 includes interaction 1-3 information as it was verified by the off-main ledger layer (e.g., the balances associated with the parties to the digital asset-based interactions, a proof proving the transactions are correct, etc.).

The on and off-main ledger information reconciliation module 118 is operable to compare the accounting of the interaction 1-3 amounts of the off-main ledger information module 144 with the on-main ledger layer settlement information 122 as provided by the on-main ledger information module 116 to determine whether there are any discrepancies. The on and off-main ledger information reconciliation module 118 generates reconciliation information 124 (e.g., whether the discrepancies exist and to want extent) and sends it to the account manager 126. The account manager 126 is then operable to send an unlock and/or consume instruction to the validation computing entity node digital asset backing account 76-1 in accordance with the reconciliation information 124.

Figure 13:
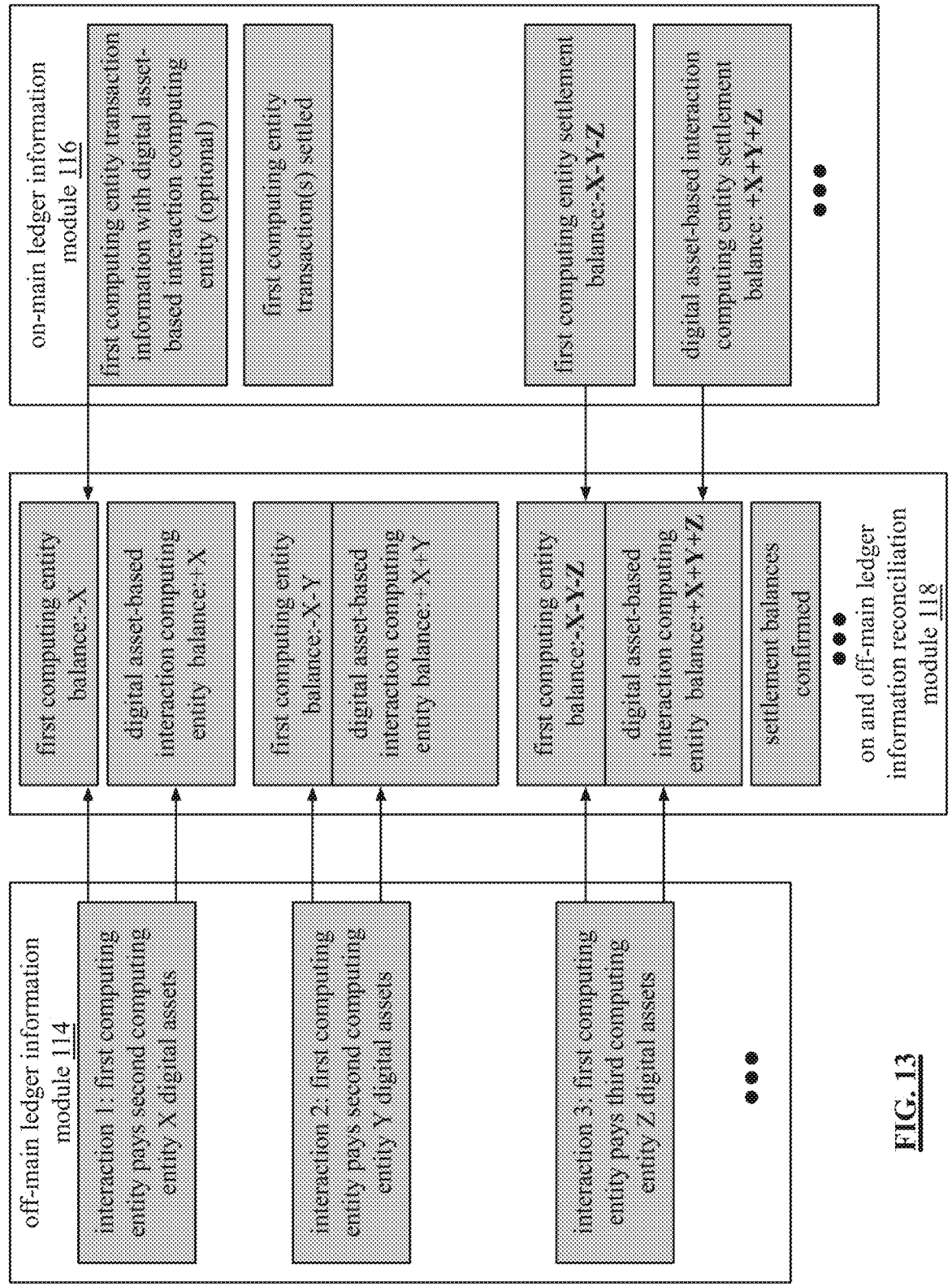
FIG. 13 is a schematic block diagram of an example of an on and off-main ledger information reconciliation module generating reconciliation data.

FIG. 13 is a schematic block diagram of an example of an on and off-main ledger information reconciliation module generating reconciliation data. FIG. 13 continues the examples of FIG. 11-12 and includes the off-main ledger information module 114, the on-main ledger information module, and the on and off-main ledger information reconciliation module 118 of a digital asset backing computing entity.

The off-main ledger information module 114 obtains off-main ledger information directly from the computing entities involved in the digital asset-based interaction or via the digital asset-based interaction computing entity. The first and/or second computing entity information includes an amount of the first digital asset-based interaction ("interaction 1"). For example, for interaction 1, the first computing entity pays the second computing entity X digital assets.

The first and/or second computing entity information includes an amount of the second digital asset-based interaction ("interaction 2"). For example, for interaction 2, the first computing entity pays the second computing entity Y digital assets. The first and/or third computing entity information includes an amount of the third digital asset-based interaction ("interaction 3"). For example, for interaction 3, the first computing entity pays a third computing entity Z digital assets. The digital assets involved in the interactions 1-3 are associated with a multi-layer distributed ledger technology (DLT) network. The off-main ledger information module 114 maintains an accounting of each of these amounts as shown.

The on-main ledger information module 116 obtains on-main ledger settlement information directly from the on-main ledger layer of the multi-layer digital asset DLT network or via the digital asset-based interaction computing entity. The on-main ledger settlement information includes the fact that the interactions 1-3 were settled as well as the ending balances (or a proof of the correctness of the ending balances) of the parties involved (e.g., the first computing entity and the digital asset-based interaction computing entity). For example, the first computing entity settlement balance is −X−Y−Z and the digital asset-based interaction computing entity settlement balance is +X+Y+Z.

The on and off-main ledger information reconciliation module 118 is operable to compare the accounting of the interaction 1-3 amounts by the off-main ledger information module 144 with the on-main ledger layer settlement information as provided by the on-main ledger information module 116 to determine whether there are any discrepancies. For example, the on and off-main ledger information reconciliation module 118 notes that the first computing entity balance after interaction 1 is −X and the digital asset-based interaction computing entity balance after interaction 1 is +X. The on and off-main ledger information reconciliation module 118 notes that the first computing entity balance after interaction 2 is −X−Y and the digital asset-based interaction computing entity balance after interaction 2 is +X+Y. The on and off-main ledger information reconciliation module 118 notes that the first computing entity balance after interaction 3 is −X−Y−Z and the digital asset-based interaction computing entity balance after interaction 3 is +X+Y+Z.

The on and off-main ledger information reconciliation module 118 compares the noted balances with the first computing entity settlement balance (or a proof of the balance) and the digital asset-based interaction computing entity settlement balance (or a proof of the balance) and determines that the balances are confirmed.

The on and off-main ledger information reconciliation module 118 generates reconciliation information 124 that the balances are confirmed and sends it to the account manager 126. The account manager 126 is then operable to send an unlock instruction to the validation computing entity node digital asset backing account 76-1 in accordance with the reconciliation information 124.

Figure 14:
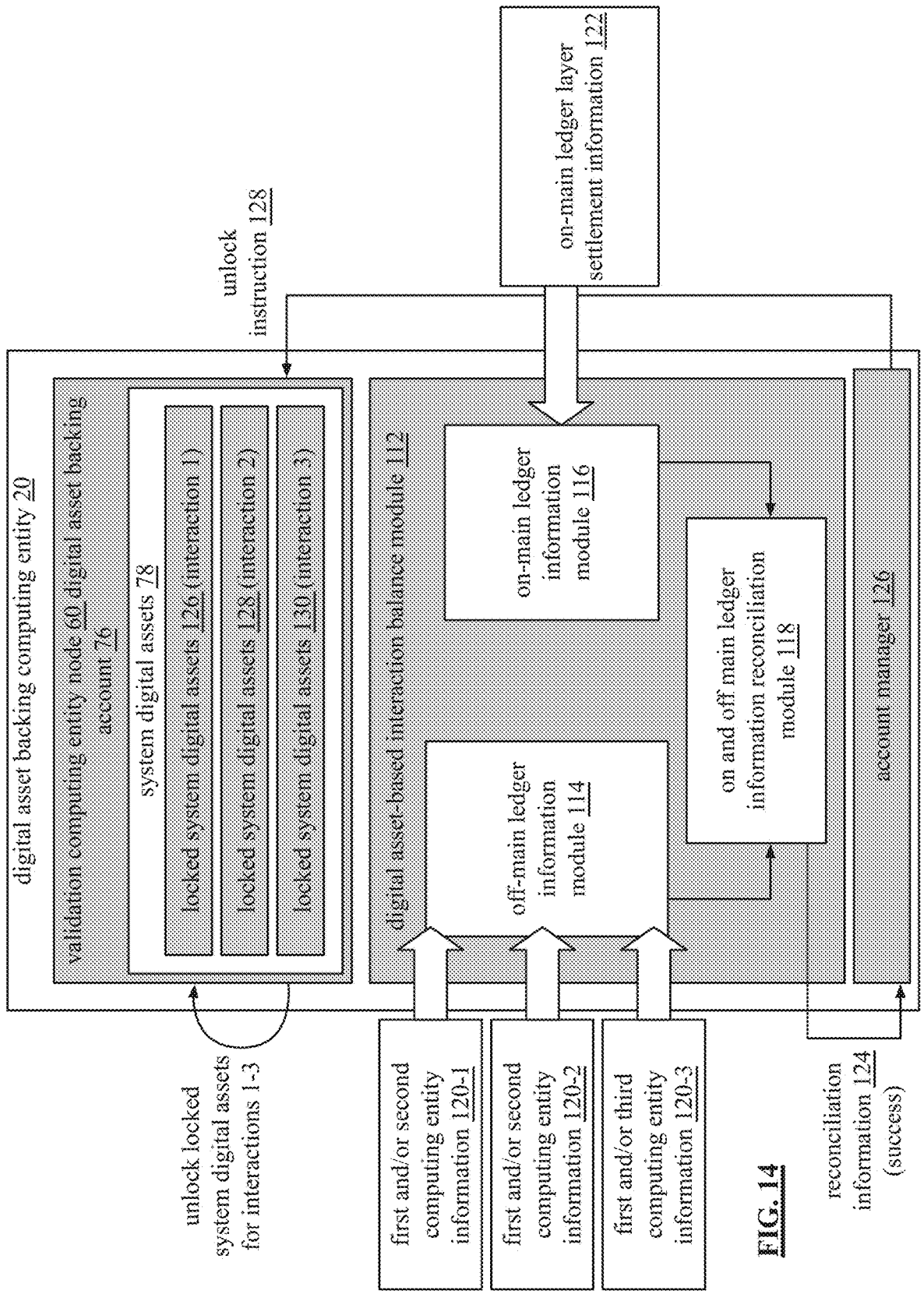
FIG. 14 is a schematic block diagram of an embodiment of a digital asset backing computing entity.

FIG. 14 is a schematic block diagram of an embodiment of a digital asset backing computing entity 20 that includes a validation computing entity node 60 digital asset backing account 76 associated with a validation computing entity node of an off-main ledger layer of a multi-layer distributed ledger technology (DLT), a digital asset-based interaction balance module 112, and an account manager 126. FIG. 14 continues the example of FIG. 13 where the on and off-main ledger information reconciliation module 118 compares the noted balances with the first computing entity settlement balance and the digital asset-based interaction computing entity settlement balance and determines that the balances are confirmed.

The on and off-main ledger information reconciliation module 118 generates reconciliation information 124 that the balances are confirmed and sends it to the account manager 126. The account manager 126 sends an unlock instruction 128 to the validation computing entity node digital asset backing account 76-1 in accordance with the reconciliation information 124. Based on the unlock instruction 128, the validation computing entity node digital asset backing account 76-1 releases the locked system digital assets for interactions 1-3.

Figure 15:
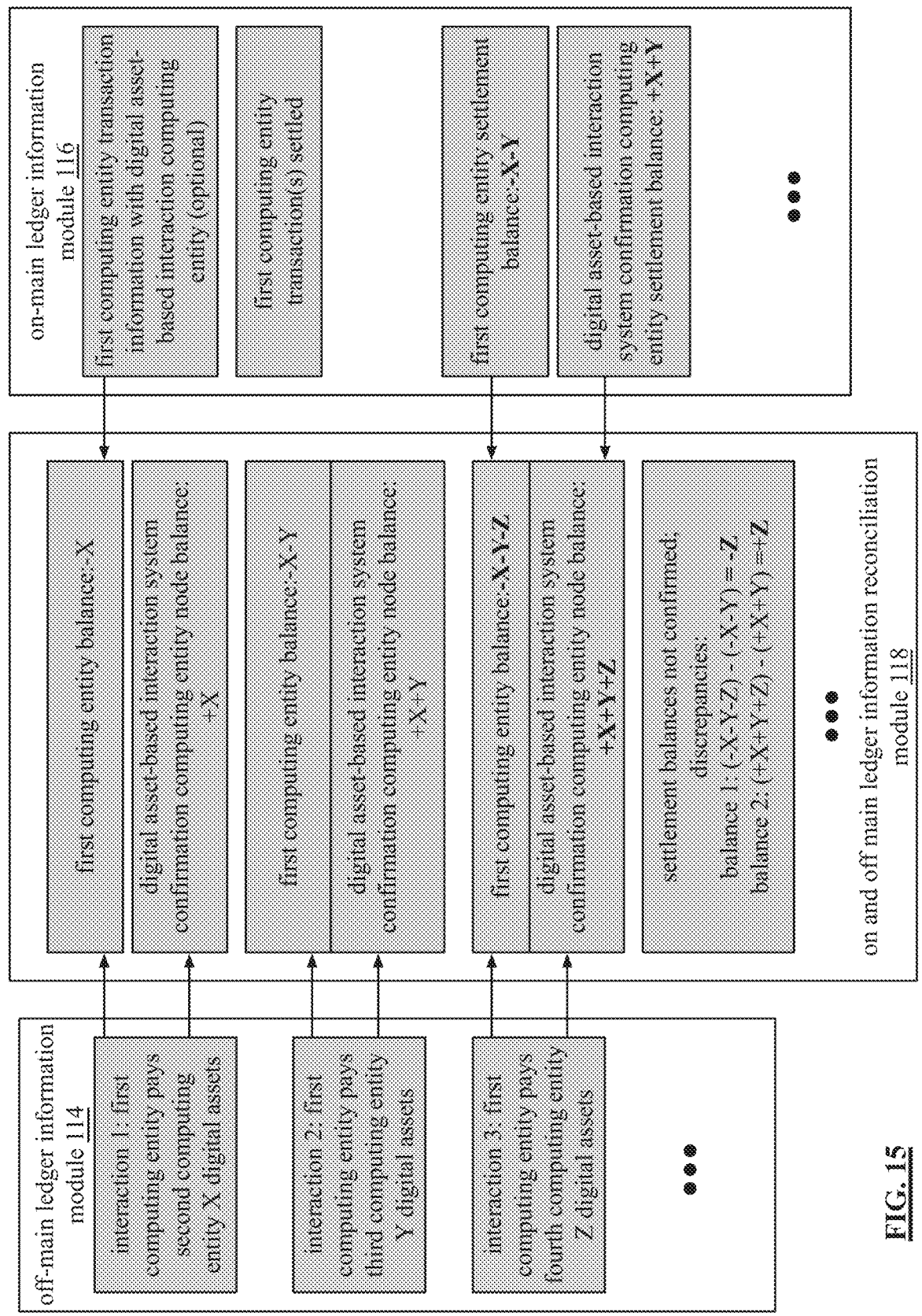
FIG. 15 is a schematic block diagram of an example of an on and off-main ledger information reconciliation module generating reconciliation data.

FIG. 15 is a schematic block diagram of an example of an on and off-main ledger information reconciliation module generating reconciliation data. FIG. 15 continues the examples of FIG. 11-12 and includes the off-main ledger information module 114, the on-main ledger information module 116, and the on and off-main ledger information reconciliation module 118 of a digital asset backing computing entity.

The off-main ledger information module 114 obtains off-main ledger information directly from the computing entities involved in the digital asset-based interaction or via the digital asset-based interaction computing entity. The first and/or second computing entity information includes an amount of the first digital asset-based interaction ("interaction 1"). For example, for interaction 1, the first computing entity pays the second computing entity X digital assets.

The first and/or second computing entity information includes an amount of the second digital asset-based interaction ("interaction 2"). For example, for interaction 2, the first computing entity pays the second computing entity Y digital assets. The first and/or third computing entity information includes an amount of the third digital asset-based interaction ("interaction 3"). For example, for interaction 3, the first computing entity pays a third computing entity Z digital assets. The digital assets involved in the interactions 1-3 are associated with a multi-layer distributed ledger technology (DLT) network. The off-main ledger information module 114 maintains an accounting of each of these amounts as shown.

The on-main ledger information module 116 obtains on-main ledger settlement information directly from the on-main ledger layer of the multi-layer digital asset DLT network or via the digital asset-based interaction computing entity. The on-main ledger settlement information includes the fact that the interactions 1-3 were settled as well as the ending balances (or a proof of the balances) of the parties involved (e.g., the first computing entity and the digital asset-based interaction computing entity). In this example, the first computing entity settlement balance is indicated as −X−Y and the digital asset-based interaction computing entity settlement balance is indicated as +X+Y.

The on and off-main ledger information reconciliation module 118 is operable to compare the accounting of the interaction 1-3 amounts by the off-main ledger information module 144 with the on-main ledger layer settlement information as provided by the on-main ledger information module 116 to determine whether there are any discrepancies. The on and off-main ledger information reconciliation module 118. For example, the on and off-main ledger information reconciliation module 118 notes that the first computing entity balance after interaction 1 is −X and the digital asset-based interaction computing entity balance after interaction 1 is +X. The on and off-main ledger information reconciliation module 118 notes that the first computing entity balance after interaction 2 is −X−Y and the digital asset-based interaction computing entity balance after interaction 2 is +X+Y. The on and off-main ledger information reconciliation module 118 notes that the first computing entity balance after interaction 3 is −X−Y−Z and the digital asset-based interaction computing entity balance after interaction 3 is +X+Y+Z.

The on and off-main ledger information reconciliation module 118 compares the noted balances with the first computing entity settlement balance and the digital asset-based interaction computing entity settlement balance and determines that the balances are not confirmed and calculates the discrepancy. For example, the on and off-main ledger information reconciliation module 118 subtracts the first computing entity settlement balance of −X−Y from the first computing entity balance −X−Y−Z to determine a discrepancy of −Z. The on and off-main ledger information reconciliation module 118 subtracts the digital asset-based interaction computing entity settlement balance of +X+Y from the digital asset-based interaction computing entity balance of +X+Y+Z to determine a discrepancy of +Z. In another example, the on and off-main ledger information reconciliation module 118 performs a function on a proof of the balances (when the settlement information includes a proof) in order to determine discrepancies.

The on and off-main ledger information reconciliation module 118 generates reconciliation information 124 that the balances are not confirmed and to consume an amount of system digital assets to cover the +Z amount of interaction 3 and sends it to the account manager 126. The account manager 126 is then operable to send a consume instruction to the validation computing entity node digital asset backing account 76-1 in accordance with the reconciliation information 124.

Figure 16:
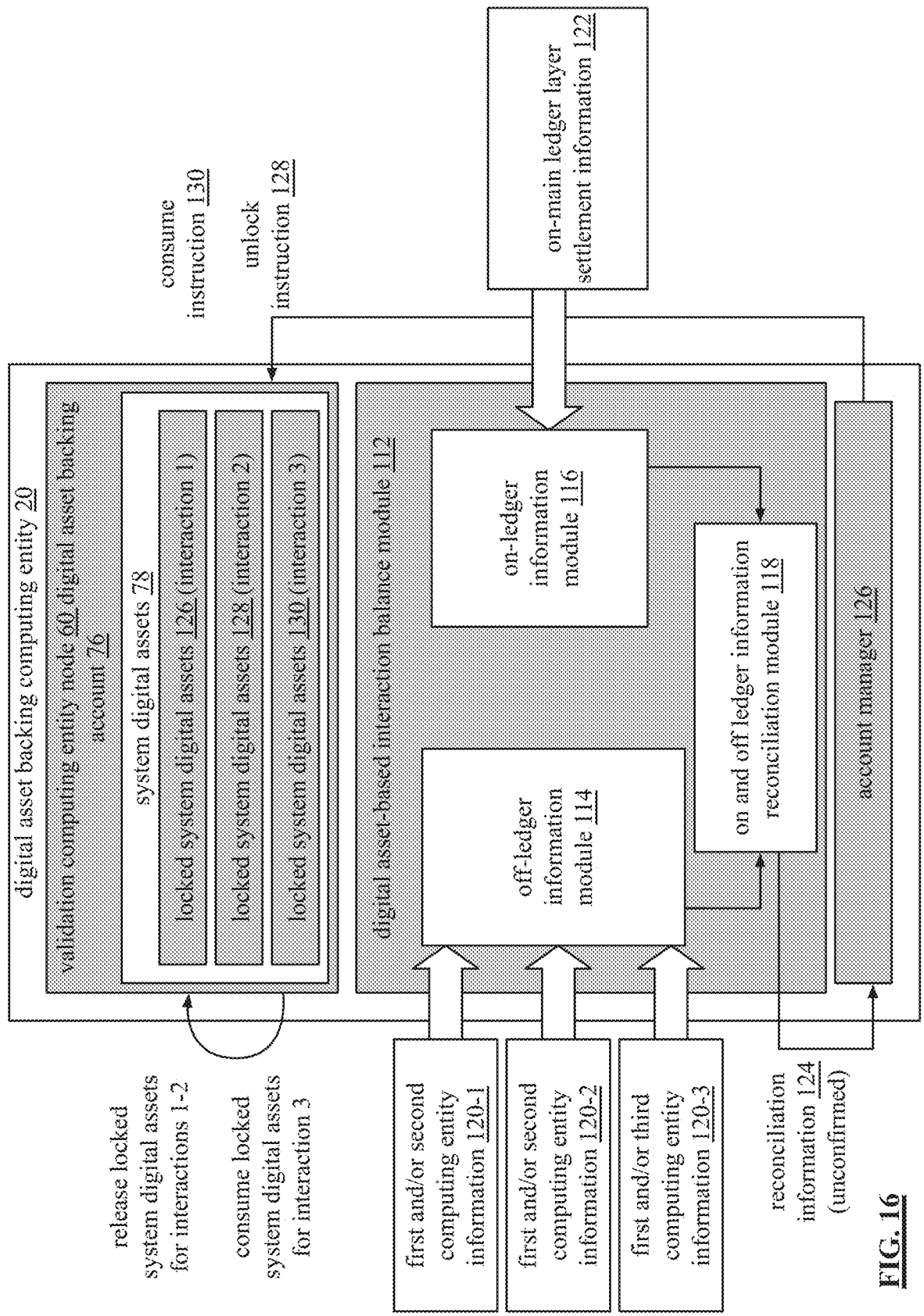
FIG. 16 is a schematic block diagram of an embodiment of a digital asset backing computing entity.

FIG. 16 is a schematic block diagram of an embodiment of a digital asset backing computing entity 20 that includes a validation computing entity node 60 digital asset backing account 76 associated with a validation computing entity node of an off-main ledger layer of a multi-layer distributed ledger technology (DLT), a digital asset-based interaction balance module 112, and an account manager 126. FIG. 16 continues the example of FIG. 15 where the on and off-main ledger information reconciliation module 118 compares the noted balances with the first computing entity settlement balance and the digital asset-based interaction computing entity settlement balance and determines that the balances are not confirmed and are off by Z amount (e.g., the amount of interaction 3).

The on and off-main ledger information reconciliation module 118 generates reconciliation information 124 that the balances are not confirmed and are off by Z amount (e.g., the amount attributable to interaction 3) and sends it to the account manager 126. The account manager 126 sends a consume instruction 130 to the validation computing entity node digital asset backing account 76-1 to consume the amount of system digital assets locked to back interaction 3 in accordance with the reconciliation information 124. The account manager 126 also sends an unlock instruction 128 to the validation computing entity node digital asset backing account 76-1 to unlock the amount of system digital assets locked to back interactions 1-2. Based on the unlock and consume instructions 128-130, the validation computing entity node digital asset backing account 76-1 unlocks the locked system digital assets for interactions 1-2 and consumes the locked system digital assets for interactions 3.

Figure 17:
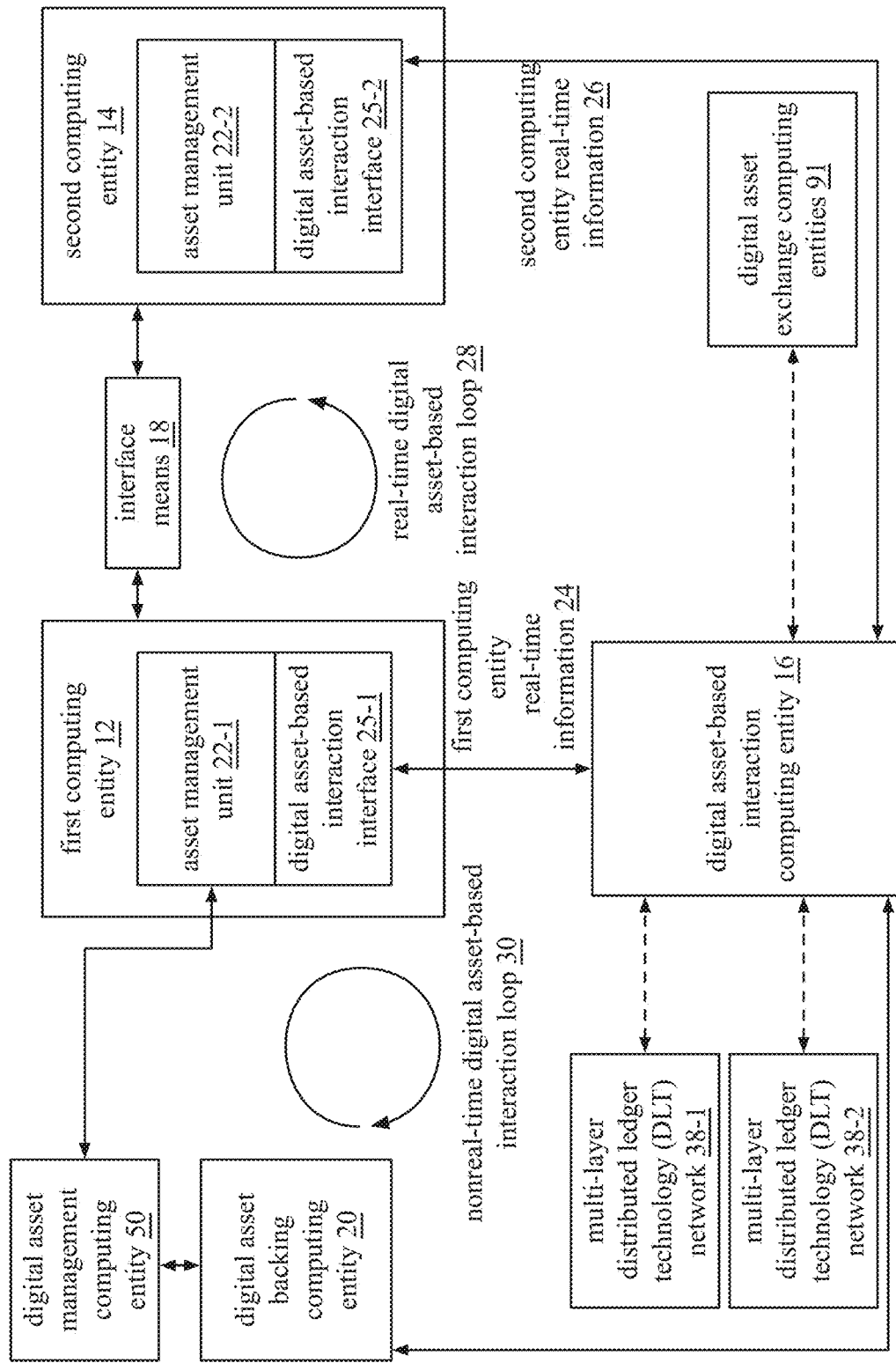
FIG. 17 is a schematic block diagram of an embodiment of a digital asset-based interaction system.

FIG. 17 is a schematic block diagram of an embodiment of a digital asset-based interaction system 10 that includes a first computing entity 12, a second computing entity 14, a digital asset-based interaction computing entity 16, an interface means 18, a digital asset backing computing entity 20, a digital asset management computing entity 40, one or more digital asset exchange computing entities 34, a first multi-layer digital asset distributed ledger technology (DLT) network 38-1, and a second multi-layer digital asset DLT network 38-2. The digital asset-based interaction system 10 of FIG. 17 operates similarly to the digital asset-based interaction system 10 of FIG. 1 except that specific a multi-layer digital asset distributed ledger technology (DLT) networks are shown: the first multi-layer digital asset DLT network 38-1 and the second multi-layer digital asset DLT network 38-2 are included.

The first computing entity 12 is operable to use different digital assets in one digital asset-based interaction (e.g., the first computing entity 12 pays in half Bitcoin and half Ethereum). In this situation, the digital asset-based interaction computing entity 16 connects to the digital asset DLT network associated with each digital asset to verify the portions of digital assets.

In this example, the first multi-layer digital asset DLT network 38-1 is associated with a first digital asset and the second multi-layer digital asset DLT network 38-2 is associated with a second digital asset. The first multi-layer digital asset DLT network 38-1 offloads verification of transactions pertaining to the first digital asset of a digital asset-based interaction from an on-main ledger layer of to an off-main ledger layer. The digital asset backing computing entity 20 is operable to lock system digital assets in an account associated with a first validation computing entity node of the off-main ledger layer to back off-main ledger verifications and ensure they are recorded (e.g., settled) to the on-main ledger layer.

The second multi-layer digital asset DLT network 38-2 offloads verification of transactions pertaining to the second digital asset of a digital asset-based interaction from an on-main ledger layer of to an off-main ledger layer. The digital asset backing computing entity is operable to lock system digital assets in an account associated with a second validation computing entity node of the off-main ledger layer to back off-main ledger verifications and ensure they are recorded (e.g., settled) to the on-main ledger layer.

Figure 18:
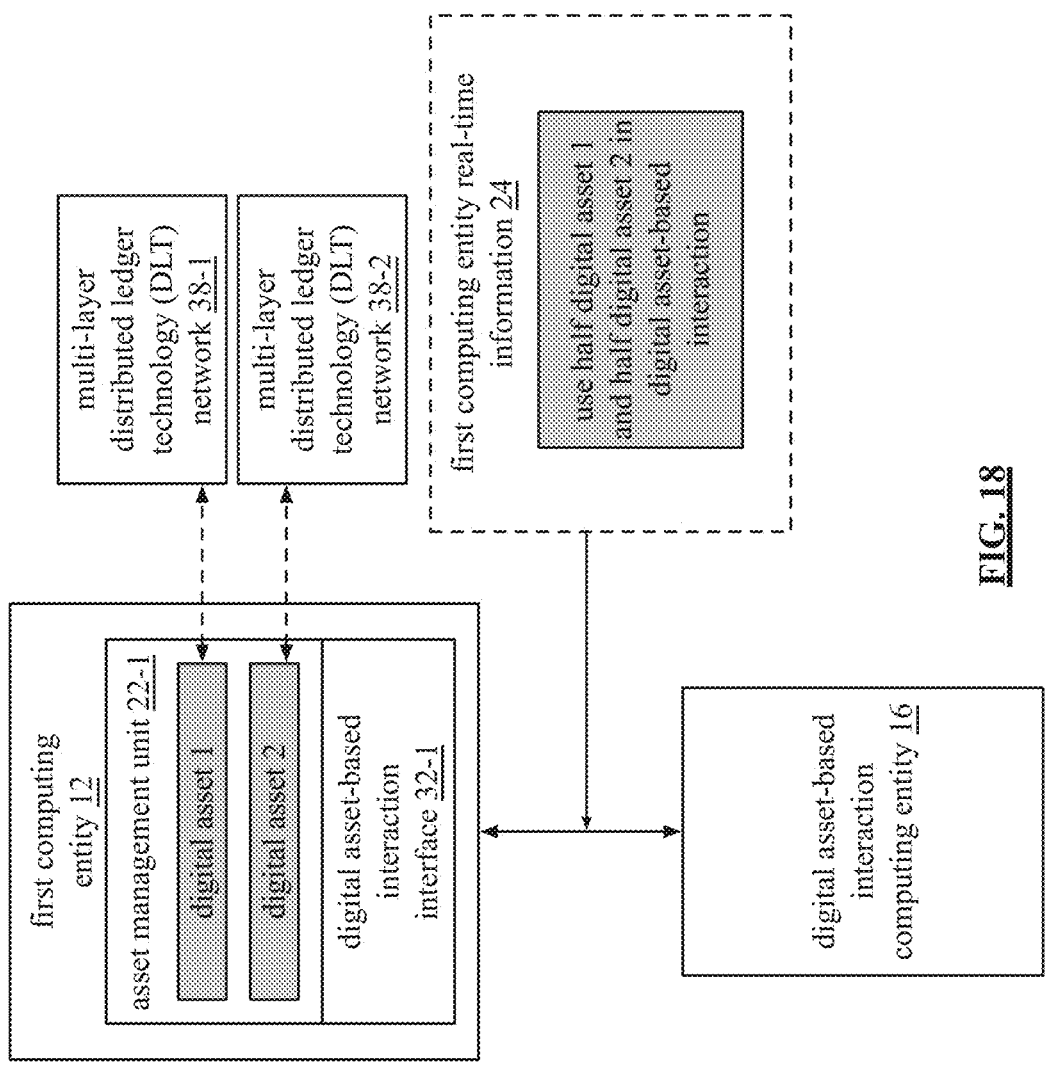
FIG. 18 is a schematic block diagram of an embodiment of a portion of a digital asset-based interaction system.

FIG. 18 is a schematic block diagram of an embodiment of a portion of a digital asset-based interaction system that includes a first computing entity 12, a digital asset-based interaction computing entity 16, a first multi-layer digital asset distributed ledger technology (DLT) network 38-1, and a second multi-layer digital asset DLT network 38-2. The first computing entity 12 and digital asset-based interaction computing entity 16 of FIG. 18 operate similarly to the first computing entity 12 and the digital asset-based interaction computing entity 16 of previous Figures. The first computing entity 12 includes an asset management unit 22-1. The asset management unit 22-1 includes a digital asset-based interaction interface 32-1 associated with the digital asset-based interaction computing entity 16.

The asset management unit 22-1 stores a digital asset 1 (first digital asset) and a digital asset 2 (second digital asset). The first digital asset is associated with a first multi-layer digital asset DLT network 38-1 and the second digital asset is associated with a second multi-layer digital asset DLT network 38-2. The first multi-layer digital asset DLT network 38-1 includes an on-main ledger layer and at least one off-main ledger layer where the on-main ledger layer offloads verification of transactions to the at least one off-main ledger layer. The second multi-layer digital asset DLT network 38-2 includes an on-main ledger layer and at least one off-main ledger layer where the on-main ledger layer offloads verification of transactions to the at least one off-main ledger layer.

In this example, the first computing entity 12 has initiated a digital asset-based interaction and sent first computing entity real-time information 24 to the digital asset-based interaction computing entity 16 regarding a digital asset-based interaction. The first computing entity real-time information 24 includes at least an identifier (e.g., a user ID) and an indication of a type of digital asset the user of the first computing entity wishes to use in a digital asset-based interaction with a second computing entity 14. For example, the first computing entity real-time information 24 includes an indication that the first computing entity 12 wishes to use half digital assets 1 and half digital assets 2 in the digital asset-based interaction (e.g., the first computing entity 12 wishes to pay a second computing entity with half Bitcoin and half Ethereum). Many other percentages are possible (e.g., ⅓ digital assets 1 and ⅔ digital assets 2) and many other digital asset combinations are possible (e.g., ⅓ digital assets 1, ⅓ digital assets 2, and ⅓ digital assets 3) depending on the digital assets recognized by the digital asset-based interaction computing entity 16.

Figure 19:
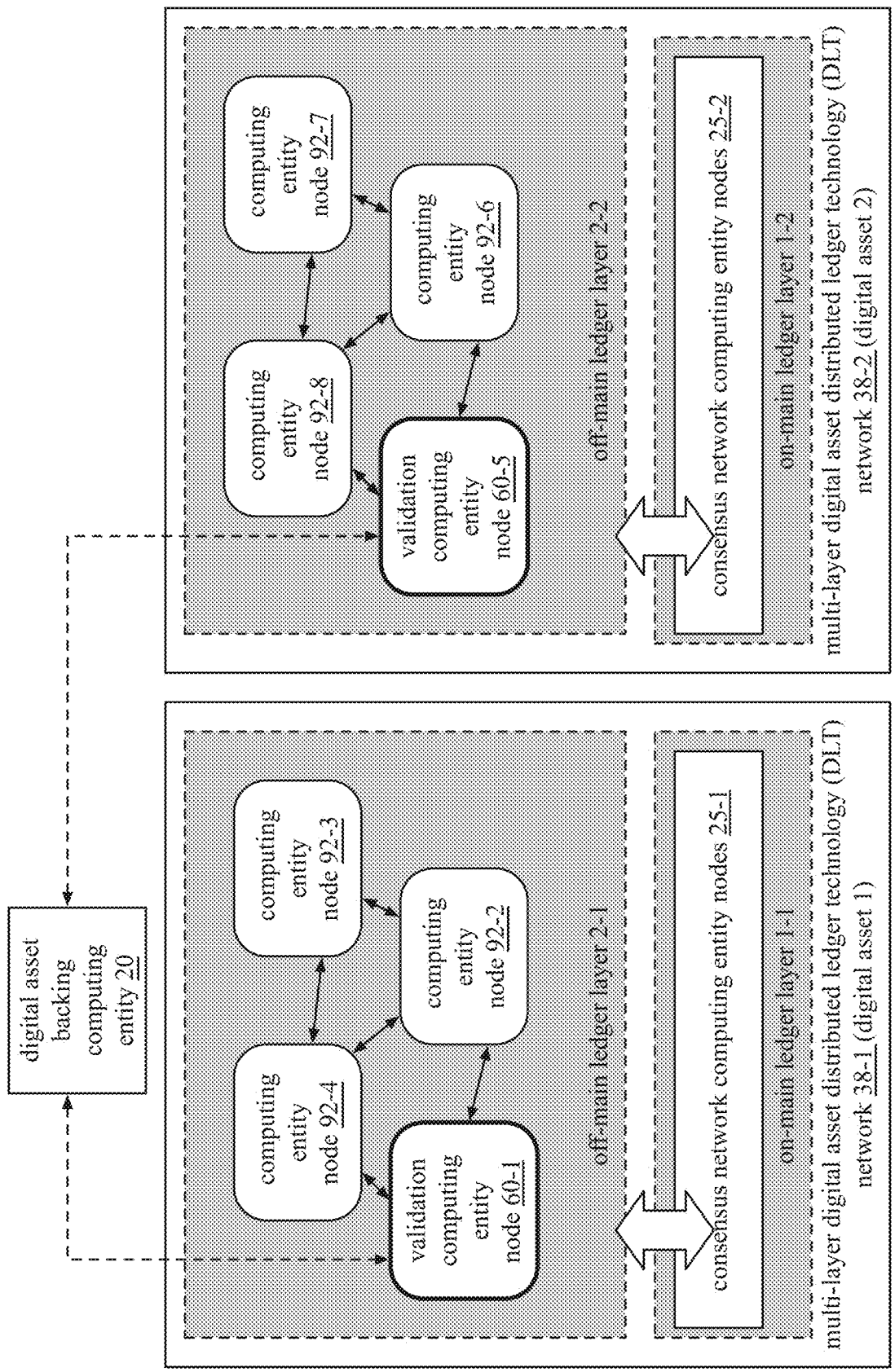
FIG. 19 is a schematic block diagram of an embodiment of a portion of a digital asset-based interaction system.

FIG. 19 is a schematic block diagram of an embodiment of a portion of a digital asset-based interaction system that includes a first multi-layer digital asset distributed ledger technology (DLT) network 38-1, a second multi-layer digital asset DLT network 38-2, and a digital asset backing computing entity 20. FIG. 19 continues the example of FIGS. 17-18 and shows the first multi-layer digital asset DLT network 38-1 second multi-layer digital asset DLT network 38-2 in more detail.

The first multi-layer digital asset DLT network 38-1 is associated with a first digital asset and the second multi-layer digital asset DLT network 38-2 is associated with a second digital asset. In this example, the first multi-layer digital asset DLT network 38-1 includes an on-main ledger layer 1-1 and an off-main ledger layer 2-1. The on-main ledger layer 1-1 includes a plurality of consensus network computing entity nodes 25-1 that perform a validation procedure to record transactions to a distributed ledger. The off-main ledger layer 2-1 includes a plurality of computing entity nodes 92-2 through 92-4 where at least one computing entity node is a validation computing entity node 60-1. The on-main ledger layer 1-1 is operable to offload the verification of transactions to the off-main ledger layer 2-1. The validation computing entity node 60-1 is operable to perform a validation procedure to verify transactions off the main ledger layer. The digital asset backing computing entity 20 is operable to lock an amount of first system digital assets in an account associated with the validation computing entity node 60-1 to back verification of offloaded transactions.

The second multi-layer digital asset DLT network 38-2 includes an on-main ledger layer 1-2 and an off-main ledger layer 2-2. The on-main ledger layer 1-2 includes a plurality of consensus network computing entity nodes 25-2 that perform a validation procedure to record transactions to a distributed ledger. The off-main ledger layer 2-2 includes a plurality of computing entity nodes 92-6 through 92-8 where at least one computing entity node is a validation computing entity node 60-5. The on-main ledger layer 1-2 is operable to offload the verification of transactions to the off-main ledger layer 2-2. The validation computing entity node 60-5 is operable to perform a validation procedure to verify transactions off the main ledger layer. The digital asset backing computing entity 20 is operable to lock an amount of second system digital assets in an account associated with the validation computing entity node 60r-2 to back verification of offloaded transactions.

Figure 20:
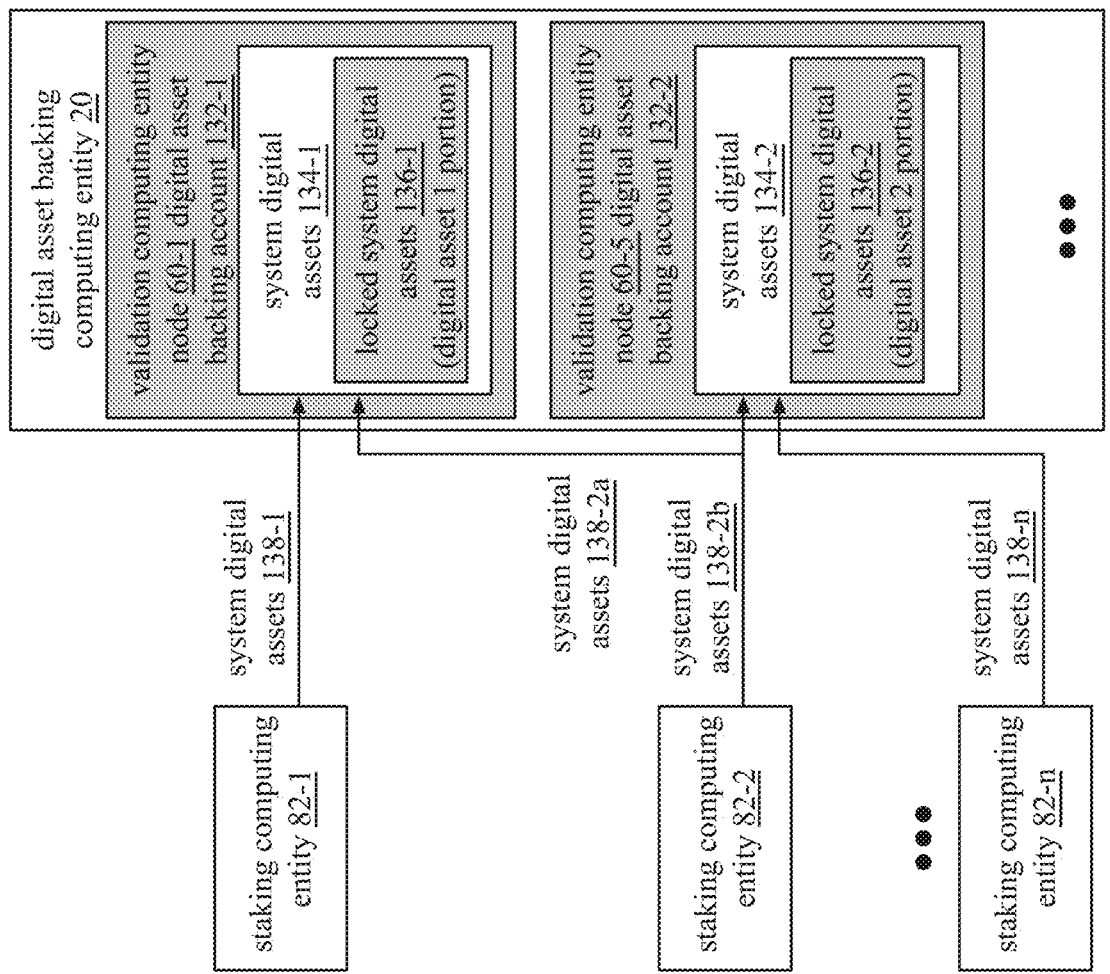
FIG. 20 is a schematic block diagram of an embodiment of staking computing entities and a digital asset backing computing entity of a digital asset-based interaction system.

FIG. 20 is a schematic block diagram of an embodiment of staking computing entities 82-1 through 82-n and a digital asset backing computing entity 20 of a digital asset-based interaction system. The staking computing entities 82-1 through 82-n may include a digital asset management computing entity and/or any computing entity such as a user computing device. To become staking entities of the digital asset-based interaction system, a computing entity deposits system digital assets 138-1 through 138-n in an associated digital asset backing account of the digital asset backing computing entity 20 to back digital asset-based interactions of the digital asset-based interaction system.

FIG. 20 continues the example of FIG. 19 where the digital asset backing computing entity 20 includes a validation computing entity node 60-1 digital asset backing account 132-1 and a validation computing entity node 60-5 digital asset backing account 132-2. In this example, the staking computing entity 82-1 deposits system digital assets 138-1 into the validation computing entity node 60-1 digital asset backing account 132-1 to back interactions associated with the validation computing entity node 60-1.

The staking computing entity 82-2 deposits system digital assets 138-2a into the validation computing entity node 60-1 digital asset backing account 132-1 to back interactions associated with the validation computing entity node 60-1 and deposits system digital assets 138-2b into the validation computing entity node 60-5 digital asset backing account 132-2 to back interactions associated with the validation computing entity node 60-5. The staking computing entity 82-n deposits system digital assets 138-n into the validation computing entity node 60-5 digital asset backing account 132-2 to back interactions associated with the validation computing entity node 60-5.

The validation computing entity node 60-1 digital asset backing account 132-1 stores system digital assets 134-1 to back interactions associated with the validation computing entity node 60-1. The validation computing entity node 60-1 is associated with an off-main ledger layer of a multi-layer digital asset distributed ledger technology (DLT) network associated with a first digital asset (digital asset 1). Based on the digital asset-based interaction discussed with reference to FIGS. 18-19, a portion of the system digital assets 134-1 are locked (e.g., locked system digital assets 136-1) to back the digital asset 1 portion of the digital asset-based interaction.

The validation computing entity node 60-5 digital asset backing account 132-2 stores system digital assets 134-2 to back interactions associated with the validation computing entity node 60-5. The validation computing entity node 60-5 is associated with an off-main ledger layer of a multi-layer digital asset DLT network associated with a second digital asset (digital asset 2). Based on the digital asset-based interaction discussed with reference to FIGS. 18-19, a portion of the system digital assets 134-2 are locked (e.g., locked system digital assets 136-2) to back the digital asset 2 portion of the digital asset-based interaction.

Figure 21:
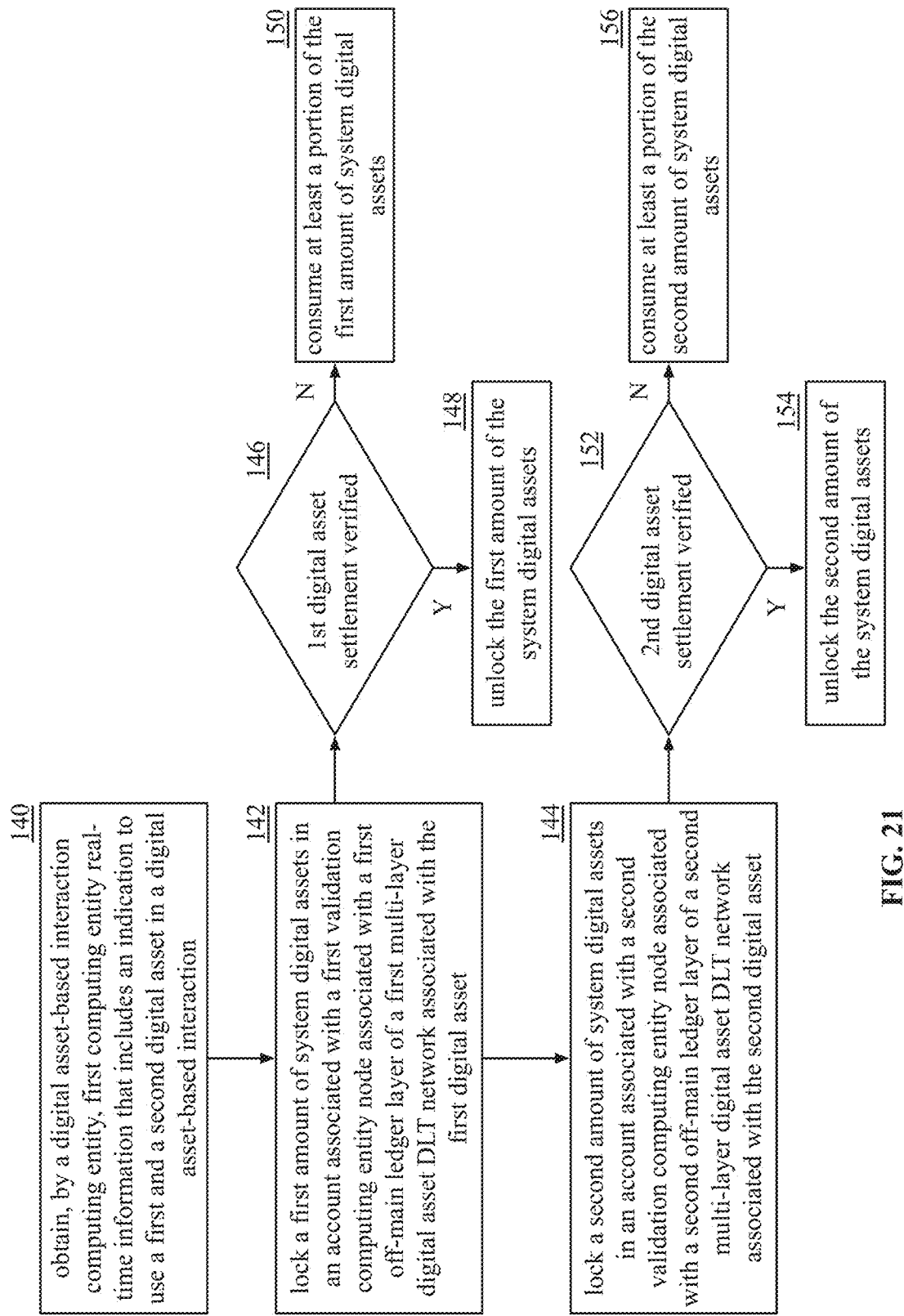
FIG. 21 is a flowchart of an example of a method of locking system digital assets associated with multiple validation computing entity nodes for a digital asset-based interaction.

FIG. 21 is a flowchart of an example of a method of locking system digital assets associated with multiple validation computing entity nodes for a digital asset-based interaction. The method begins with step 140 where a digital asset-based interaction computing entity of a digital asset-based interaction system obtains first computing entity real-time information from a first computing entity to facilitate a digital asset based-interaction between the first computing entity and a second computing entity. The first computing entity real-time information includes an indication that the first computing entity provides a first digital asset and a second digital asset in the digital asset-based interaction. The second computing entity accepts assets in a desired asset format.

The method continues with step 142 where the digital asset backing computing entity locks a first amount of system digital assets in an account associated with at least one first validation computing entity node of a plurality of first computing entity nodes of the digital asset-based interaction system. The plurality of first computing entity nodes is associated with a first off-main ledger layer of a first multi-layer digital asset distributed ledger technology (DLT) network associated with the first digital asset.

The at least one first validation computing entity node is operable to verify the obtaining a first amount of the first digital assets from the first computing entity by implementing an off-ledger validation procedure. The off-ledger procedure includes one or more of a consensus methods, a secure multi-signature communication, and a validation function. The first on-main ledger layer offloads verification of obtaining a first amount of the first digital asset to the at least one first validation computing entity node. A plurality of consensus network computing entity nodes of the first on-main ledger layer is operable to settle the offloaded verification of obtaining the first amount of the first digital assets by implementing an on-ledger validation procedure. The on-ledger validation procedure includes a consensus method.

The plurality of consensus network computing entity nodes is operable to settle the offloaded verification during a settlement time-period. The settlement time-period includes one or more of a dispute resolution time-period, a default time-period, a predetermined time-period, a time-period to reach a predetermined number of digital asset-based interactions, a time-period based on an amount of one or more digital asset-based interactions, a time-period based on a request by the digital asset-based interaction computing entity, and a time-period based on a request by the first computing entity.

The method continues with step 144 where the digital asset backing computing entity locks a second amount of system digital assets in an account associated with at least one second validation computing entity node of a plurality of second computing entity nodes of the digital asset-based interaction system. The plurality of second computing entity nodes is associated with a second off-main ledger layer of a second multi-layer digital asset DLT network associated with the second digital asset.

The at least one second validation computing entity node is operable to verify the obtaining a second amount of the second digital assets from the first computing entity by implementing an off-ledger validation procedure. The second on-main ledger layer offloads verification of obtaining a second amount of the second digital asset to the at least one second validation computing entity node. A plurality of consensus network computing entity nodes of the first on-main ledger layer is operable to settle the offloaded verification of obtaining the second amount of the second digital assets by implementing an on-ledger validation procedure.

When the settlement of the offloaded verification of the first amount of first digital assets is verified at step 146, the method continues with step 148 where the digital asset backing computing entity unlocks at least a portion of the first amount of system digital assets. The settlement verification includes comparing on-main ledger settlement information with an internal accounting of digital asset-based interaction information maintained by the digital asset backing computing entity. When the internal accounting compares favorably to the on-main ledger settlement information the settlement of the offloaded verification of the first amount of first digital assets is verified. For example, when an internal accounting balance (or a function performed on a proof of balance) substantially matches the balance (or proof of balance) indicated in the settlement information, the internal accounting compares favorably to the on-main ledger settlement information.

When the internal accounting compares unfavorably to the on-main ledger settlement information the settlement of the offloaded verification of the first amount of first digital assets is not verified. For example, when an internal accounting balance (or a function performed on a proof of balance) does not substantially match the balance (or proof of balance) indicated in the settlement information, the internal accounting compares unfavorably to the on-main ledger settlement information.

When the settlement of the offloaded verification of the first amount of first digital assets is not verified at step 146, the method continues with step 148 where the digital asset backing computing entity consumes at least a portion of the first amount of system digital assets. Consuming the at least a portion of the first amount of system digital assets means that the at least a portion of first amount of system digital assets is transferred (e.g., via an on-chain transaction) from an address associated with a staking computing entity to an address associated with the digital asset-based interaction computing entity 16.

When the settlement of the offloaded verification of the second amount of second digital assets is verified at step 152, the method continues with step 154 were the digital asset backing computing entity unlocks at least a portion of the second amount of system digital assets. The settlement verification includes comparing on-main ledger settlement information with an internal accounting of digital asset-based interaction information maintained by the digital asset backing computing entity.

When the internal accounting compares favorably to the on-main ledger settlement information the settlement of the offloaded verification of the second amount of second digital assets is verified. For example, when an internal accounting balance (or a function performed on a proof of balance) substantially matches the balance (or proof of balance) indicated in the settlement information, the internal accounting compares favorably to the on-main ledger settlement information. When the internal accounting compares unfavorably to the on-main ledger settlement information the settlement of the offloaded verification of the second amount of second digital assets is not verified. For example, when an internal accounting balance (or a function performed on a proof of balance) does not substantially match the balance (or proof of balance) indicated in the settlement information, the internal accounting compares unfavorably to the on-main ledger settlement information.

When the settlement of the offloaded verification of the second amount of second digital assets is not verified at step 152, the method continues with step 154 where the digital asset backing computing entity consumes at least a portion of the second amount of system digital assets. Consuming the at least a portion of the second amount of system digital assets means that the at least a portion of second amount of system digital assets is transferred (e.g., via an on-chain transaction) from an address associated with a staking computing entity to an address associated with the digital asset-based interaction computing entity 16.

Figure 22:
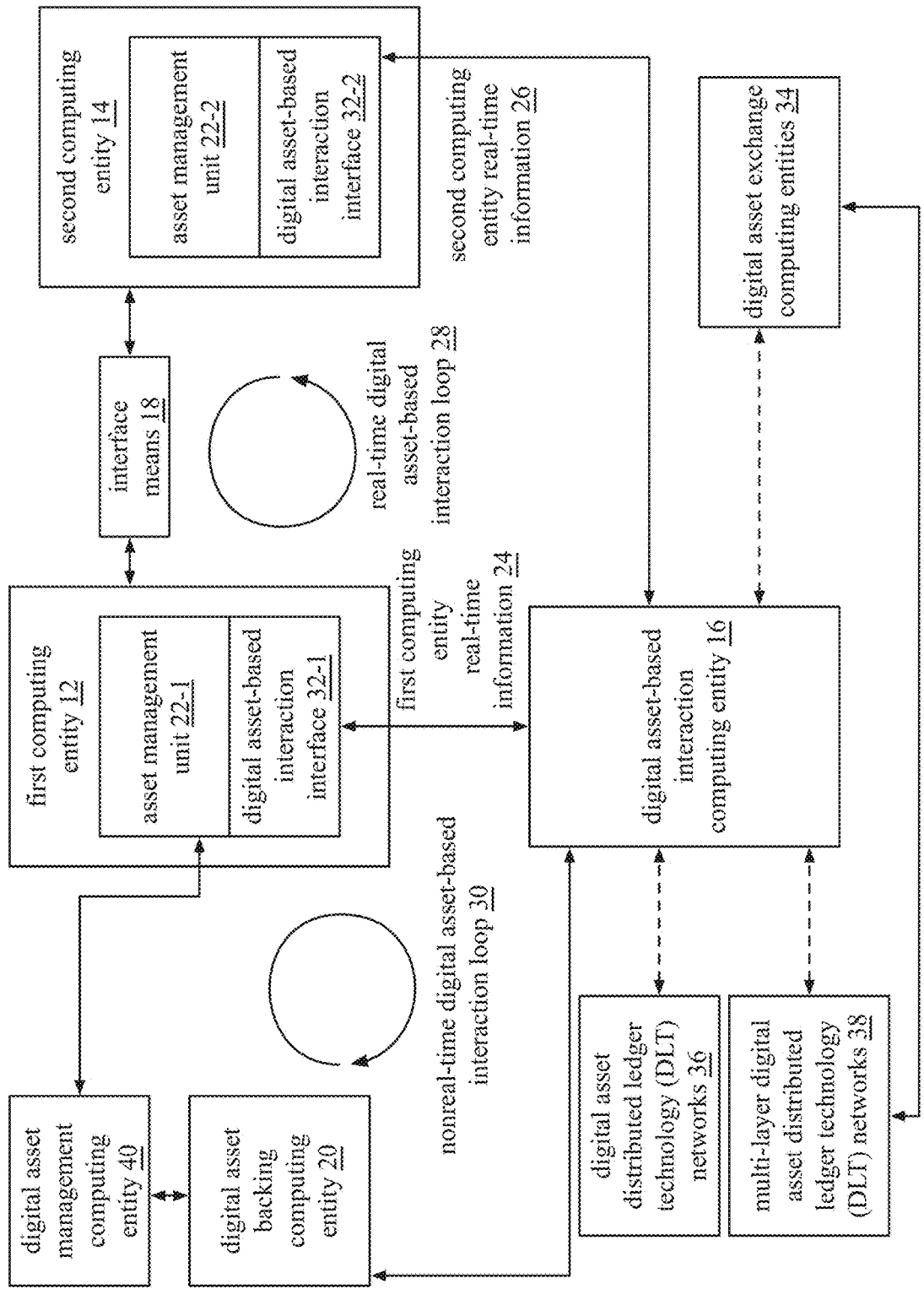
FIG. 22 is a schematic block diagram of an embodiment of a digital asset-based interaction system.

FIG. 22 is a schematic block diagram of an embodiment of a digital asset-based interaction system 10 that includes a first computing entity 12, a second computing entity 14, a digital asset-based interaction computing entity 16, an interface means 18, a digital asset backing computing entity 20, a digital asset management computing entity 40, one or more distributed ledger technology (DLT) networks 36, one or more multi-layer digital asset DLT networks 38, and one or more digital asset exchange computing entities 34. The digital asset-based interaction system 10 of FIG. 22 operates similarly to the digital asset-based interaction system 10 of FIG. 1 except that the one or more digital asset exchange computing entities 34 are associated with the one or more multi-layer digital asset DLT networks 38.

The one or more digital asset exchange computing entities 34 are associated with the one or more multi-layer digital asset DLT networks 38 to expedite the exchange process and lower fees. In an example, one or more digital asset exchange computing entities 34 receive a digital asset for a digital asset-based interaction from the digital asset-based interaction computing entity 16 for exchange to a desired asset format (e.g., the asset format desired by the second computing entity 14). When the digital asset is associated with a multi-layer digital asset DLT network 38, the one or more one or more digital asset exchange computing entities 34 connect to the multi-layer digital asset DLT network 38 to exchange the digital assets (e.g., exchange the digital assets for the assets in the desired asset format, sell the digital assets then purchase the assets in the desired asset format, etc.). An on-main ledger layer of the multi-layer digital asset DLT network 38 offloads verification of the exchange of the digital asset to an off-main ledger layer of the multi-layer digital asset DLT network 38. An exchange validation computing entity node of the off-main ledger layer performs a validation procedure to verify trading (i.e., selling) the digital asset for exchange.

The digital asset backing computing entity 20 is operable to lock system digital assets in an account associated with an exchange validation computing entity node of the off-main ledger layer to back off-main ledger verifications and ensure they are recorded (e.g., settled) to the on-main ledger layer. Similar to the timing issues with obtaining digital assets, exchanges of digital assets take time to verify via the underlying DLTs of the digital assets involved. Further, when a multi-layer digital asset DLT network is involved in the exchange, the offloading of verifications to an off-main ledger layer presents new issues such as failure to properly settle on the main ledger layer. Backing an exchange validation computing entity node that performs the off-main ledger validation procedure to verify the exchange, ensures that any issues that may occur during the exchange process will be covered via system digital assets.

Figure 23:
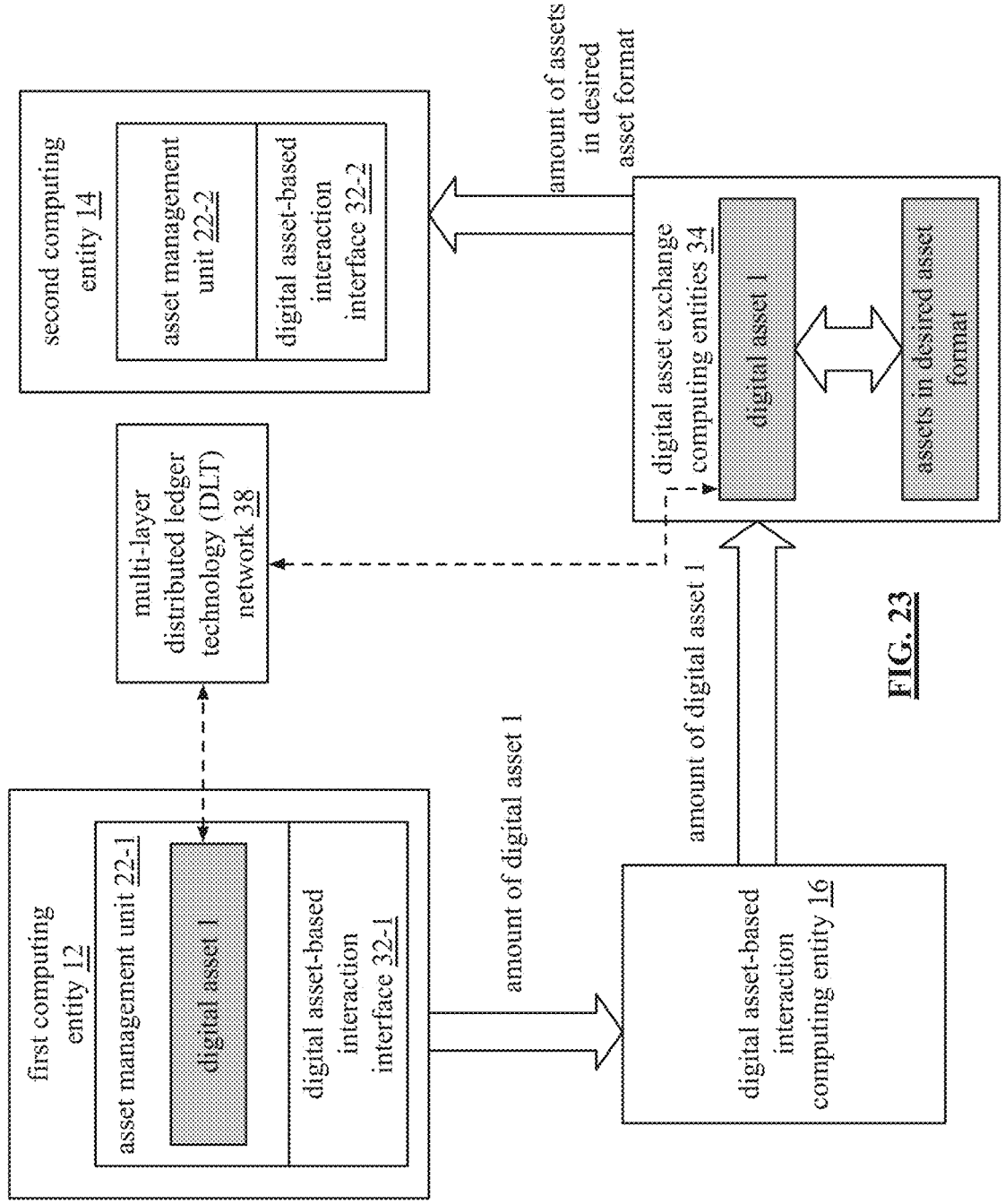
FIG. 23 is a schematic block diagram of an embodiment of a portion of a digital asset-based interaction system.

FIG. 23 is a schematic block diagram of an embodiment of a portion of a digital asset-based interaction system that includes a first computing entity 12, a second computing entity 14, a digital asset-based interaction computing entity 16, a multi-layer digital asset distributed ledger technology (DLT) network 38 associated with a first digital asset (digital asset 1), and one or more digital asset exchange computing entities 34. The first computing entity 12, the second computing entity 14, and the digital asset-based interaction computing entity 16 of FIG. 23 operate similarly to the first computing entity 12, the second computing entity 14, and the digital asset-based interaction computing entity 16 of previous Figures. The first computing entity 12 and the second computing entity 14 include asset management units 22-1 and 22-2 respectively. The asset management unit 22-1 includes a digital asset-based interaction interface 32-1 associated with the digital asset-based interaction computing entity 16 and the asset management unit 22-2 includes a digital asset-based interaction interface 32-2 associated with the digital asset-based interaction computing entity 16.

The asset management unit 22-1 stores a digital asset 1 (first digital asset) associated with the multi-layer digital asset DLT network 38. The one or more digital asset exchange computing entities 34 are operable to interface with the multi-layer digital asset DLT network 38 to conduct exchanges involving the digital asset 1. The multi-layer digital asset DLT network 38 includes an on-main ledger layer and at least one off-main ledger layer where the on-main ledger layer offloads verification of transactions to the at least one off-main ledger layer.

In this example, the first computing entity 12 has initiated a digital asset-based interaction and sent first computing entity real-time information 24 to the digital asset-based interaction computing entity 16 regarding a digital asset-based interaction. The first computing entity real-time information 24 includes at least an identifier (e.g., a user ID) and an indication of a type of digital asset the user of the first computing entity wishes to use in a digital asset-based interaction with a second computing entity 14. For example, the first computing entity real-time information 24 includes an indication that the first computing entity 12 wishes to use the digital asset 1 in the digital asset-based interaction.

The first computing entity 12 sends the amount of digital asset 1 to the digital asset-based interaction computing entity 16 for the digital asset-based interaction. The digital asset-based interaction computing entity 16 sends the amount of digital asset 1 to the one or more digital asset exchange computing entities 34 to exchange the amount of digital asset 1 to a substantially equivalent amount of assets in a desired asset format. The one or more digital asset exchange computing entities 34 connect to the multi-layer digital asset DLT network 38 to offload verification of the exchange to the at least one off-main ledger layer.

The one or more digital asset exchange computing entities 34 may connect to a DLT network associated with the desired asset format, a multi-layer digital asset DLT network associated with the desired asset format, or an entity associated with the desired asset format to obtain and/or verify receipt of a substantially equivalent amount of assets in the desired asset format. The one or more digital asset exchange computing entities 34 send the substantially equivalent amount of assets in the desired asset format to the second computing entity 14.

Figure 24:
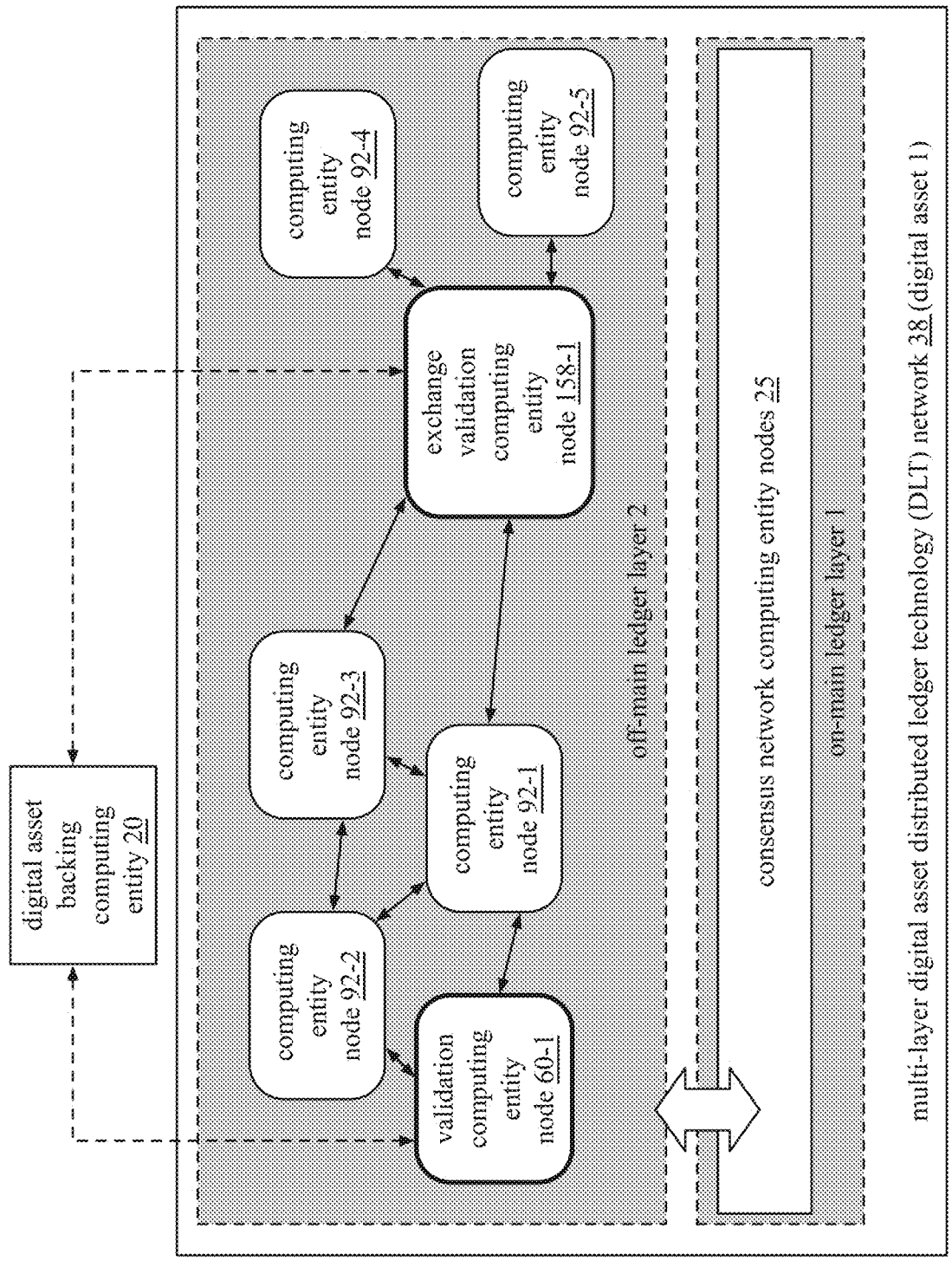
FIG. 24 is a schematic block diagram of an embodiment of a portion of a digital asset-based interaction system.

FIG. 24 is a schematic block diagram of an embodiment of a portion of a digital asset-based interaction system that includes a multi-layer digital asset distributed ledger technology (DLT) network 38 and a digital asset backing computing entity 20. FIG. 24 continues the example of FIGS. 22-23 and shows the multi-layer digital asset DLT network 38 in more detail.

The multi-layer digital asset DLT network 38 is associated with a digital asset (e.g., the digital asset 1). In this example, the multi-layer digital asset DLT network 38 includes an on-main ledger layer 1 and an off-main ledger layer 2. The on-main ledger layer 1 includes a plurality of consensus network computing entity nodes 25 that perform a validation procedure to record transactions to a distributed ledger. The off-main ledger layer 2 includes a plurality of computing entity nodes 92-1 through 92-5 where at least one computing entity node is a validation computing entity node 60-1 and at least one computing entity node is an exchange validation computing entity node 158-1. The validation computing entity node 60-1 and the exchange validation computing entity node 158-1 may be the same validation computing entity node. The on-main ledger layer 1 is operable to offload the verification of transactions to the off-main ledger layer 2. The validation computing entity node 60-1 and the exchange validation computing entity node 158-1 are operable to perform validation procedures to verify transactions off the main ledger layer.

The validation computing entity node 60-1 performs a validation procedure to verify that the digital asset is sent from the first computing device to the digital asset-based interaction computing entity. The exchange validation computing entity node 158-1 is operable to perform a validation procedure to verify trading (or selling) the digital asset for exchange. The digital asset backing computing entity 20 is operable to lock an amount of first system digital assets in an account associated with the validation computing entity node 60-1 to back verification of offloaded transactions associated with obtaining the digital assets. The digital asset backing computing entity 20 is further operable to lock an amount of second system digital assets in an account associated with the exchange validation computing entity node 158-1 to back verification of offloaded transactions associated with the exchange of the digital assets.

Figure 25:
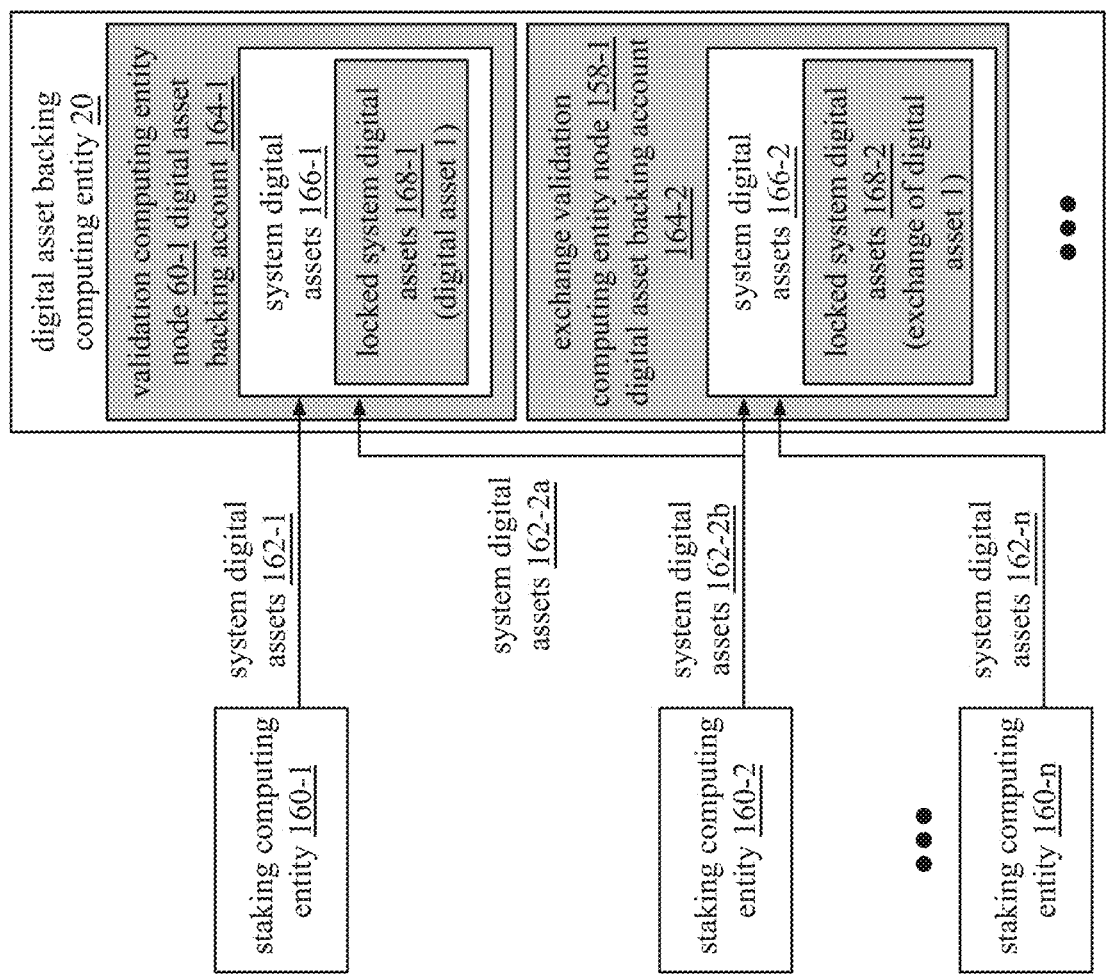
FIG. 25 is a schematic block diagram of an embodiment of staking computing entities and a digital asset backing computing entity of a digital asset-based interaction system.

FIG. 25 is a schematic block diagram of an embodiment of staking computing entities 160-1 through 160-n and a digital asset backing computing entity 20 of a digital asset-based interaction system. The staking computing entities 160-1 through 160-n may include a digital asset management computing entity, one or more exchange computing entities, and/or any computing entity such as a user computing device. To become staking entities of the digital asset-based interaction system, a computing entity deposits system digital assets 162-1 through 162-n in an associated digital asset backing account of the digital asset backing computing entity 20 to back digital asset-based interactions of the digital asset-based interaction system.

FIG. 25 continues the example of FIG. 24 where the digital asset backing computing entity 20 includes a validation computing entity node 60-1 digital asset backing account 164-1 and an exchange validation computing entity node 158-1 digital asset backing account 164-2. In this example, the staking computing entity 160-1 deposits system digital assets 162-1 into the validation computing entity node 60-1 digital asset backing account 164-1 to back interactions associated with the validation computing entity node 60-1.

The staking computing entity 160-2 deposits system digital assets 162-2a into the validation computing entity node 60-1 digital asset backing account 164-1 to back interactions associated with the validation computing entity node 60-1 and deposits system digital assets 162-2b into the exchange validation computing entity node 158-1 digital asset backing account 164-2 to back interactions associated with the exchange validation computing entity node 158-1. The staking computing entity 160-n deposits system digital assets 162-n into the exchange validation computing entity node 158-1 digital asset backing account 164-2 to back interactions associated with the exchange validation computing entity node 158-1.

The validation computing entity node 60-1 digital asset backing account 164-1 stores system digital assets 166-1 to back interactions associated with the validation computing entity node 60-1. The validation computing entity node 60-1 is associated with an off-main ledger layer of a multi-layer digital asset distributed ledger technology (DLT) network associated with a first digital asset (digital asset 1). Based on the digital asset-based interaction discussed with reference to FIGS. 23-24, a portion of the system digital assets 166-1 are locked (e.g., locked system digital assets 168-1) to back the obtaining of the digital asset 1 from the first computing entity.

The exchange validation computing entity node 158-1 digital asset backing account 164-2 stores system digital assets 166-2 to back interactions associated with the exchange validation computing entity node 158-1. The exchange validation computing entity node 158-1 is associated with an off-main ledger layer of the multi-layer digital asset distributed ledger technology (DLT) network associated with the first digital asset (digital asset 1). Based on the digital asset-based interaction discussed with reference to FIGS. 23-24, a portion of the system digital assets 166-2 is locked (e.g., locked system digital assets 168-2) to back the exchange of the digital asset 1 to the assets in the desired asset format.

Figure 26:
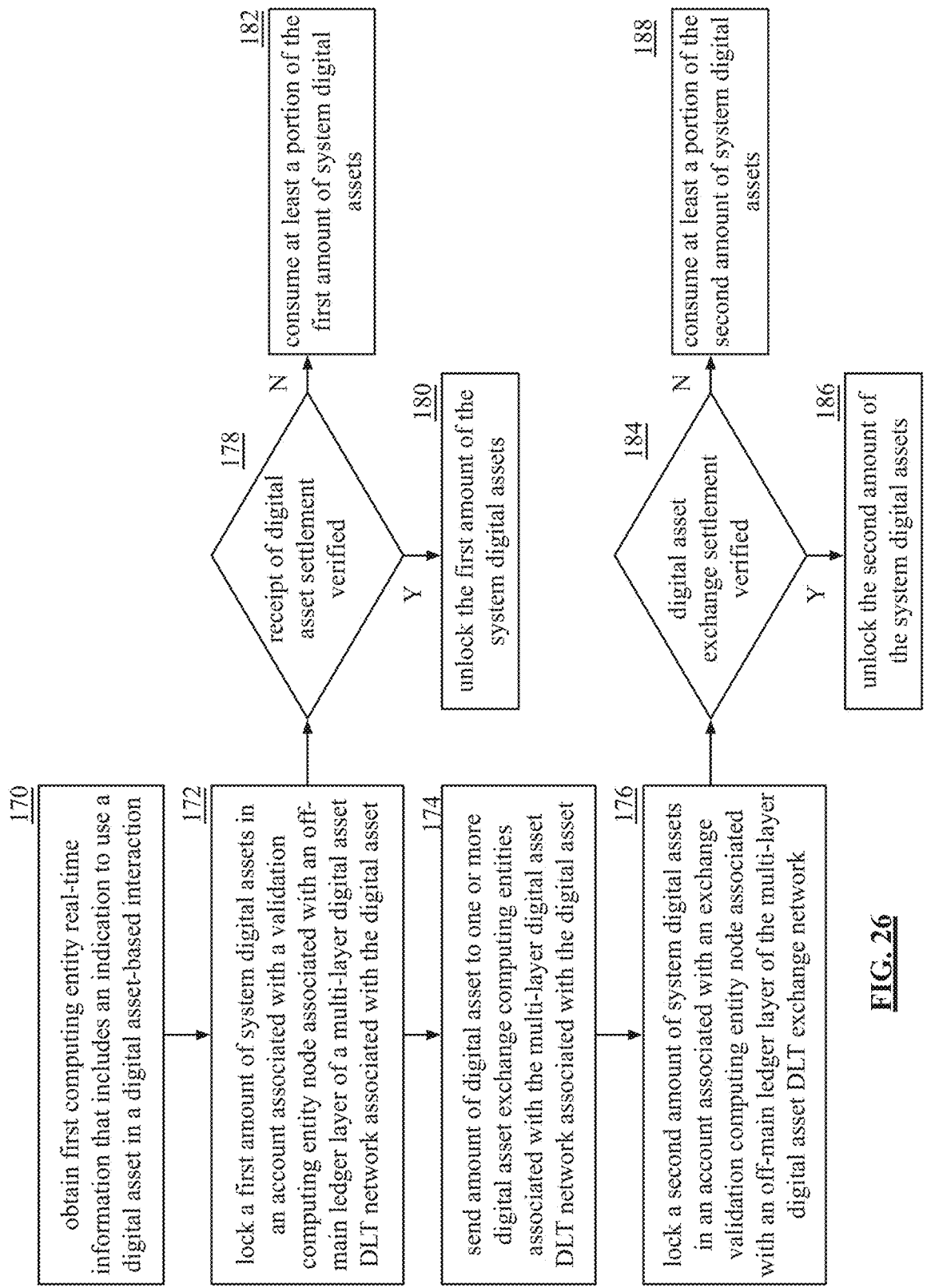
FIG. 26 is a flowchart of an example of a method of locking system digital assets associated with a validation computing entity node and an exchange validation computing entity node for a digital asset-based interaction.

FIG. 26 is a flowchart of an example of a method of locking system digital assets associated with a validation computing entity node and an exchange validation computing entity node for a digital asset-based interaction. The method begins with step 170 where a digital asset-based interaction computing entity of a digital asset-based interaction system obtains first computing entity real-time information from a first computing entity to facilitate a digital asset based-interaction between the first computing entity and a second computing entity. The first computing entity real-time information includes an indication that the first computing entity provides a digital asset in the digital asset-based interaction. The second computing entity accepts assets in a desired asset format.

The method continues with step 172 where the digital asset backing computing entity locks a first amount of system digital assets in an account associated with at least one validation computing entity node of a plurality of computing entity nodes of the digital asset-based interaction system. The plurality of computing entity nodes is associated with an off-main ledger layer of a multi-layer digital asset distributed ledger technology (DLT) network associated with the digital asset.

The at least one validation computing entity node is operable to verify the obtaining an amount of the digital asset from the first computing entity by implementing an off-ledger validation procedure. The off-ledger procedure includes one or more of a consensus method, a secure multi-signature communication, and a validation function. The on-main ledger layer offloads verification of obtaining an amount of the digital asset to the at least one validation computing entity node. A plurality of consensus network computing entity nodes of the on-main ledger layer is operable to settle the offloaded verification of obtaining the amount of the digital assets by implementing an on-ledger validation procedure. The on-ledger validation procedure includes a consensus method.

The plurality of consensus network computing entity nodes is operable to settle the offloaded verification during a settlement time-period. The settlement time-period includes one or more of a dispute resolution time-period, a default time-period, a predetermined time-period, a time-period to reach a predetermined number of digital asset-based interactions, a time-period based on an amount of one or more digital asset-based interactions, a time-period based on a request by the digital asset-based interaction computing entity, and a time-period based on a request by the first computing entity.

The method continues with step 174 where the digital asset-based interaction computing entity sends the amount of the digital assets to one or more digital asset exchange computing entities to exchange the amount of the digital assets to a substantially equivalent amount of assets in a desired asset format.

The method continues with step 176 where the digital asset backing computing entity locks a second amount of system digital assets in an account associated with at least one exchange validation computing entity node of the plurality of computing entity nodes of the digital asset-based interaction system. The plurality of computing entity nodes is associated with the off-main ledger layer of the multi-layer digital asset DLT network associated with the digital asset.

The at least one exchange validation computing entity node is operable to verify the exchange of the amount of the digital asset to the substantially equivalent amount of assets in the desired asset format. The on-main ledger layer offloads verification of the exchange of the amount of the first digital asset to the substantially equivalent amount of assets in the desired asset format to the at least one exchange validation computing entity node. A plurality of consensus network computing entity nodes of the on-main ledger layer is operable to settle the offloaded verification of at least one exchange validation computing entity node by implementing an on-ledger validation procedure.

When the settlement of the offloaded verification of obtaining the amount of digital assets is verified at step 178, the method continues with step 180 where the digital asset backing computing entity unlocks at least a portion of the first amount of system digital assets. The settlement verification includes comparing on-main ledger settlement information with an internal accounting of digital asset-based interaction information maintained by the digital asset backing computing entity. When the internal accounting compares favorably to the on-main ledger settlement information the settlement of the offloaded verification of the amount of digital assets is verified. For example, when an internal accounting balance (or a function performed on a proof of balance) substantially matches the balance (or proof of balance) indicated in the settlement information, the internal accounting compares favorably to the on-main ledger settlement information.

When the internal accounting compares unfavorably to the on-main ledger settlement information the settlement of the offloaded verification of the amount of digital assets is not verified. For example, when an internal accounting balance (or a function performed on a proof of balance) does not substantially match the balance (or proof of balance) indicated in the settlement information, the internal accounting compares unfavorably to the on-main ledger settlement information.

When the settlement of the offloaded verification of the obtaining the amount of digital assets is not verified at step 178, the method continues with step 182 where the digital asset backing computing entity consumes at least a portion of the first amount of system digital assets. Consuming the at least a portion of the first amount of system digital assets means that the at least a portion of first amount of system digital assets is transferred (e.g., via an on-chain transaction) from an address associated with a staking computing entity to an address associated with the digital asset-based interaction computing entity 16.

When the settlement of the offloaded verification of the exchange of the amount of digital assets is verified at step 184, the method continues with step 186 were the digital asset backing computing entity unlocks at least a portion of the second amount of system digital assets. The settlement verification includes comparing on-main ledger settlement information with an internal accounting of digital asset-based interaction information maintained by the digital asset backing computing entity.

When the internal accounting compares favorably to the on-main ledger settlement information the settlement of the offloaded verification of the exchange of the amount of digital assets is verified. For example, when an internal accounting balance (or a function performed on a proof of balance) substantially matches the balance (or proof of balance) indicated in the settlement information, the internal accounting compares favorably to the on-main ledger settlement information (e.g., a second computing entity balance should indicate a balance increase of the amount of assets in the desired asset format and the digital asset-based interaction computing entity balance should indicate a decrease in the amount of the digital asset). When the internal accounting compares unfavorably to the on-main ledger settlement information the settlement of the offloaded verification of the exchange of the amount of digital assets is not verified. For example, when an internal accounting balance (or a function performed on a proof of balance) does not substantially match the balance (or proof of balance) indicated in the settlement information, the internal accounting compares unfavorably to the on-main ledger settlement information.

When the settlement of the offloaded verification of the exchange of the amount of digital assets is not verified at step 184, the method continues with step 188 where the digital asset backing computing entity consumes at least a portion of the second amount of system digital assets. Consuming the at least a portion of the second amount of system digital assets means that the at least a portion of second amount of system digital assets is transferred (e.g., via an on-chain transaction) from an address associated with a staking computing entity to an address associated with the digital asset-based interaction computing entity 16.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A digital asset-based interaction system comprises:
   a digital asset-based interaction computing entity operable to facilitate a digital asset based-interaction between a first computing entity and a second computing entity, wherein the digital asset-based interaction involves the first computing entity providing an amount of a digital asset and the second computing entity accepting assets in a desired asset format;
   at least one validation computing entity node of a plurality of computing nodes associated with an off-main ledger layer of a multi-layer digital asset distributed ledger technology network associated with the digital asset, wherein the at least one validation computing entity node is operable to verify the obtaining the amount of the digital asset from the first computing entity by implementing an off-ledger validation procedure, wherein an on-main ledger layer of the multi-layer digital asset distributed ledger technology network is operable to offload the verification of obtaining the amount of the digital asset to the off-main ledger layer, and wherein a plurality of consensus network computing entity nodes of the on-main ledger layer is operable to settle the offloaded verification of obtaining the amount of the digital asset by implementing an on-ledger validation procedure; and
   a digital asset backing computing entity operable to lock an amount of system digital assets in an account associated with the at least one validation computing entity node to back the offloaded verification until the plurality of consensus network computing entity nodes settle the offloaded verification.

2. The digital asset-based interaction system of claim 1, wherein the digital asset-based interaction computing entity is operable to facilitate the digital asset-based interaction by:
   receiving first and second computing entity information regarding the digital asset-based interaction from one or more of the first and second computing entities;
   instructing the digital asset backing computing entity to lock the amount of the system digital assets to back the offloaded verification;
   obtaining the amount of the digital asset from the first computing entity;
   connecting to one or more digital asset exchange computing entities to exchange the amount of digital asset to a substantially equivalent amount of the assets in the desired asset format;
   providing the substantially equivalent amount of the assets in the desired asset format to the second computing entity;
   connecting to the plurality of consensus network computing entity nodes to verify the settlement of the offloaded verification; and
   when the settlement of the offloaded verification is verified:
      instructing the digital asset backing computing entity to unlock at least a portion of the amount of the system digital assets; and
   when the settlement of the offloaded verification is not verified:
      instructing the digital asset backing computing entity to consume at least a portion of the amount of the system digital assets.

3. The digital asset-based interaction system of claim 1 further comprises:
   one or more staking computing entities, wherein the one or more staking computing entities are operable to deposit system digital assets in the account associated with the at least one validation computing entity node.

4. The digital asset-based interaction system of claim 1, wherein a validation computing entity node of the at least one validation computing entity node is associated with the digital asset-based interaction computing entity.

5. The digital asset-based interaction system of claim 1, wherein the off-ledger validation procedure includes one or more of:
   a consensus method, wherein each computing entity node of the plurality of computing entity nodes executes the consensus method to validate and broadcast transactions to an off-main ledger distributed ledger of the off-main ledger layer, wherein the off-main ledger distributed ledger is stored by each computing entity node;
   a secure multi-signature communication between two or more computing entity nodes of the plurality of computing entity nodes; and
   a validation function.

6. The digital asset-based interaction system of claim 1, wherein the on-main ledger layer is a main blockchain, and wherein the off-main ledger layer is one or more of:
   a sidechain;
   a nested blockchain; and
   a state channels layer.

7. The digital asset-based interaction system of claim 1, wherein the on-ledger validation procedure includes a consensus method, wherein the plurality of consensus computing entity nodes executes the consensus method to validate and broadcast transactions to a main distributed ledger stored by each consensus network computing entity node of the plurality of consensus network computing entity nodes.

8. The digital asset-based interaction system of claim 1, wherein the plurality of consensus network computing entity nodes is operable to settle the offloaded verification during a settlement time-period, wherein the settlement time-period includes one or more of:
   a dispute resolution time-period;
   a default time-period;
   a predetermined time-period;
   a time-period to reach a predetermined number of digital asset-based interactions;

a time-period based on an amount of one or more digital asset-based interactions;
a time-period based on a request by the digital asset-based interaction computing entity; and
a time-period based on a request by the first computing entity.

9. The digital asset-based interaction system of claim 1 further comprises:
the digital asset-based interaction computing entity is further operable to facilitate a second digital asset based-interaction between the first computing entity and a third computing entity, wherein the second digital asset based-interaction involves the first computing entity providing a second amount of the digital asset and the third computing entity accepting second assets in a second desired asset format;
the at least one validation computing entity node is further operable to verify the obtaining the second amount of the digital asset from the first computing entity, wherein the on-main ledger layer is operable to offload the verification of obtaining the second amount of the digital asset to the off-main ledger layer, and wherein the plurality of consensus network computing entity nodes of the on-main ledger layer is operable to settle the offloaded verification of obtaining the second amount of the digital asset; and
the digital asset backing computing entity is further operable to lock a second amount of system digital assets in the account associated with the at least one validation computing entity node to back the offloaded verification of obtaining the second amount of the digital asset until the plurality of consensus network computing entity nodes settle the offloaded verification of obtaining the second amount of the digital asset.

10. The digital asset-based interaction system of claim 9, wherein the digital asset-based interaction computing entity is operable to:
when the settlement of the offloaded verification of obtaining the amount of the digital asset is verified:
instructing the digital asset backing computing entity to unlock the amount of the system digital assets; and
when the settlement of the offloaded verification of obtaining the second amount of the digital asset is verified:
instructing the digital asset backing computing entity to unlock the second amount of system digital assets.

11. The digital asset-based interaction system of claim 9, wherein the digital asset-based interaction computing entity, is operable to:
when the settlement of the offloaded verification of obtaining the amount of the digital asset is not verified:
instructing the digital asset backing computing entity to consume the amount of the system digital assets; and
when the settlement of the offloaded verification of obtaining the second amount of the digital asset is not verified:
instructing the digital asset backing computing entity to consume the second amount of system digital assets.

12. A method comprises:
facilitating, by a digital asset-based interaction computing entity of a digital asset-based interaction system, a digital asset-based interaction between a first computing entity and a second computing entity, wherein the digital asset based-interaction involves the first computing entity providing an amount of a digital asset and the second computing entity accepting assets in a desired asset format;
verifying, by at least one validation computing entity node of a plurality of computing nodes of the digital asset-based interaction system, the obtaining the amount of the digital asset from the first computing entity by implementing an off-ledger validation procedure, wherein the plurality of computing nodes is associated with an off-main ledger layer of a multi-layer digital asset distributed ledger technology network associated with the digital asset, wherein an on-main ledger layer of the multi-layer digital asset distributed ledger technology network is operable to offload the verification of obtaining the amount of the digital asset to the off-main ledger layer, and wherein a plurality of consensus network computing entity nodes of the on-main ledger layer is operable to settle the offloaded verification of obtaining the amount of the digital asset by implementing an on-ledger validation procedure; and
locking, by a digital asset backing computing entity the digital asset-based interaction system, an amount of system digital assets in an account associated with the at least one validation computing entity node to back the offloaded verification until the plurality of consensus network computing entity nodes settle the offloaded verification.

13. The method of claim 12, wherein the facilitating the digital asset-based interaction includes:
receiving, by the digital asset-based interaction computing entity, first and second computing entity information regarding the digital asset-based interaction from one or more of the first and second computing entities;
instructing, by the digital asset-based interaction computing entity, the digital asset backing computing entity to lock the amount of the system digital assets to back the offloaded verification;
obtaining, by the digital asset-based interaction computing entity, the amount of the digital asset from the first computing entity;
connecting, by the digital asset-based interaction computing entity, to one or more digital asset exchange computing entities to exchange the amount of the digital asset to a substantially equivalent amount of the assets in the desired asset format;
providing, by the digital asset-based interaction computing entity, the substantially equivalent amount of the assets in the desired asset format to the second computing entity;
connecting, by the digital asset-based interaction computing entity, to the plurality of consensus network computing entity nodes to verify the settlement of the offloaded verification; and
when the settlement of the offloaded verification is verified:
instructing, by the digital asset-based interaction computing entity, the digital asset backing computing entity to unlock at least a portion of the amount of the system digital assets; and
when the settlement of the offloaded verification is not verified:
instructing, by the digital asset-based interaction computing entity, the digital asset backing computing entity to consume at least a portion of the amount of the system digital assets.

14. The method of claim 12 further comprises:
depositing, by one or more staking computing entities of the digital asset-based interaction system, system digital assets in the account associated with the at least one validation computing entity node.

15. The method of claim 12, wherein a validation computing entity node of the at least one validation computing entity node is associated with the digital asset-based interaction computing entity.

16. The method of claim 12, wherein the off-ledger validation procedure includes one or more of:
    a consensus method, wherein each computing entity node of the plurality of computing entity nodes executes the consensus method to validate and broadcast transactions to an off-main ledger distributed ledger of the off-main ledger layer, wherein the off-main ledger distributed ledger is stored by each computing entity node;
    a secure multi-signature communication between two or more computing entity nodes of the plurality of computing entity nodes; and
    a validation function.

17. The method of claim 12, wherein the on-main ledger layer is a main blockchain, and wherein the off-main ledger layer is one or more of:
    a sidechain;
    a nested blockchain; and
    a state channels layer.

18. The method of claim 12, wherein the on-ledger validation procedure includes a consensus method, wherein the plurality of consensus computing entity nodes executes the consensus method to validate and broadcast transactions to a main distributed ledger stored by each consensus network computing entity node of the plurality of consensus network computing entity nodes.

19. The method of claim 12, wherein the settlement of the offloaded verification occurs during a settlement time-period, wherein the settlement time-period includes one or more of:
    a dispute resolution time-period;
    a default time-period;
    a predetermined time-period;
    a time-period to reach a predetermined number of digital asset-based interactions;
    a time-period based on an amount of one or more digital asset-based interactions;
    a time-period based on a request by the digital asset-based interaction computing entity; and
    a time-period based on a request by the first computing entity.

20. The method of claim 12 further comprises:
    facilitating, by the digital asset-based interaction computing entity, a second digital asset based-interaction between the first computing entity and a third computing entity, wherein the second digital asset based-interaction involves the first computing entity providing a second amount of the digital asset and the third computing entity accepting second assets in a second desired asset format;
    verifying, by the at least one validation computing entity node, the obtaining the second amount of the digital asset from the first computing entity, wherein the on-main ledger layer is operable to offload the verification of obtaining the second amount of the digital asset to the off-main ledger layer, and wherein the plurality of consensus network computing entity nodes of the on-main ledger layer is operable to settle the offloaded verification of obtaining the second amount of the digital asset; and
    locking, by the digital asset backing computing entity, a second amount of system digital assets in the account associated with the at least one validation computing entity node to back the offloaded verification of obtaining the second amount of the digital asset until the plurality of consensus network computing entity nodes settle the offloaded verification of obtaining the second amount of the digital asset.

21. The method of claim 20 further comprises:
    when the settlement of the offloaded verification of obtaining the amount of the digital asset is verified:
        instructing, by the digital asset-based interaction computing entity, the digital asset backing computing entity to unlock the amount of the system digital assets; and
    when the settlement of the offloaded verification of obtaining the second amount of the digital asset is verified:
        instructing, by the digital asset-based interaction computing entity, the digital asset backing computing entity to unlock the second amount of system digital assets.

22. The method of claim 20 further comprises:
    when the settlement of the offloaded verification of obtaining the amount of the digital asset is not verified:
        instructing, by the digital asset-based interaction computing entity, the digital asset backing computing entity to consume the amount of the system digital assets; and
    when the settlement of the offloaded verification of obtaining the second amount of the digital asset is not verified:
        instructing, by the digital asset-based interaction computing entity, the digital asset backing computing entity to consume the second amount of system digital assets.

* * * * *